(12) United States Patent
Nammoto et al.

(10) Patent No.: US 9,211,642 B2
(45) Date of Patent: *Dec. 15, 2015

(54) ROBOT APPARATUS, ASSEMBLING METHOD, AND RECORDING MEDIUM

(71) Applicant: Seiko Epson Corporation, Tokyo (JP)

(72) Inventors: Takashi Nammoto, Sendai (JP); Kazuhiro Kosuge, Sendai (JP); Kentaro Kamei, Sendai (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,723

(22) Filed: Jan. 12, 2015

(65) Prior Publication Data

US 2015/0127152 A1 May 7, 2015

Related U.S. Application Data

(63) Continuation of application No. 13/755,453, filed on Jan. 31, 2013, now Pat. No. 8,965,581.

(30) Foreign Application Priority Data

Feb. 1, 2012 (JP) ................................. 2012-020321

(51) Int. Cl.
*G05B 19/00* (2006.01)
*B25J 9/16* (2006.01)
*B25J 13/08* (2006.01)

(52) U.S. Cl.
CPC .............. *B25J 9/1633* (2013.01); *B25J 9/1612* (2013.01); *B25J 9/1687* (2013.01); *B25J 13/085* (2013.01);

(Continued)

(58) Field of Classification Search
CPC ............. B25J 9/1633; B01L 2200/027; B01L 2200/10; B01L 2200/148; B60L 2200/147
USPC ........ 700/258, 259, 260; 318/568.12; 356/73, 356/328
See application file for complete search history.

(56) References Cited

U.S. PATENT DOCUMENTS 7,395,606 B2 * 7/2008 Crampton ....................... 33/503
7,508,155 B2 3/2009 Sato et al.
(Continued)

FOREIGN PATENT DOCUMENTS

JP        07-241733      9/1995
JP        2012-223829 A  11/2012

OTHER PUBLICATIONS

Suwanratchatamanee et al., Human-machine interaction through object using robot arm with tactile sensors, 2008, IEEE, p. 683-688.*

(Continued)

*Primary Examiner* — McDieunel Marc
(74) *Attorney, Agent, or Firm* — Harness, Dickey & Pierce, P.L.C.

(57) ABSTRACT

A robot apparatus includes a gripping unit configured to grip a first component, a force sensor configured to detect, as detection values, a force and a moment acting on the gripping unit, a storing unit having stored therein contact states of the first component and a second component and transition information in association with each other, a selecting unit configured to discriminate, on the basis of the detection values, a contact state of the first component and the second component and select, on the basis of a result of the discrimination, the transition state stored in the storing unit, and a control unit configured to control the gripping unit on the basis of the transition information selected by the selecting unit.

14 Claims, 28 Drawing Sheets

(52) U.S. Cl.
CPC ...... *G05B 2219/40032* (2013.01); *Y10S 901/09* (2013.01); *Y10S 901/31* (2013.01); *Y10S 901/46* (2013.01)

(56) References Cited

U.S. PATENT DOCUMENTS

| | | | |
|---|---|---|---|
| 7,591,078 B2* | 9/2009 | Crampton | 33/503 |
| 8,577,500 B2* | 11/2013 | Yamaguchi et al. | 700/259 |
| 8,588,980 B2 | 11/2013 | Murayama et al. | |
| 8,965,581 B2* | 2/2015 | Nammoto et al. | 700/259 |
| 2007/0210740 A1 | 9/2007 | Sato et al. | |
| 2011/0040411 A1 | 2/2011 | Murayama et al. | |
| 2011/0288667 A1 | 11/2011 | Noda et al. | |
| 2012/0191245 A1 | 7/2012 | Fudaba et al. | |
| 2012/0209429 A1* | 8/2012 | Yamaguchi et al. | 700/259 |

OTHER PUBLICATIONS

Nakanishi et al., Achievement of Complex Contact Motion with Environments by Musculoskeletal Humanoid using Humanlike Shock Absorption Strategy, 2010, IEEE, p. 1815-1820.*

Gupta et al., Wireless Master-Slave Embedded Controller for a Teleoperated Anthropomorphic Robotic Arm with Gripping Force Sensing, 2006, IEEE, p. 1-6.*

Caldwell et al., Multi-armed Dexterous Manipulator Operation using Glove/Exoskeleton Control and Sensory Feedback, 1995, IEEE, p. 567-572.*

* cited by examiner

|    | fx | fy | fz | nx | ny | nz |
|----|----|----|----|----|----|----|
| p1 | 0  | 0  | 1  | -1 | 0  | 0  |
| p2 | 0  | 1  | 1  | -1 | 0  | 0  |
| p3 | 0  | -1 | 1  | 1  | 0  | 0  |
| p4 | 0  | 1  | 1  | -1 | 0  | 0  |
| p5 | 0  | -1 | 1  | 1  | 0  | 0  |
| p6 | 0  | 0  | 1  | 1  | 0  | 0  |
| p7 | 0  | 1  | 1  | -1 | 0  | 0  |
| p8 | 0  | -1 | 1  | 1  | 0  | 0  |

FIG. 6

|     | fx | fy | fz | nx | ny | nz |
|-----|----|----|----|----|----|----|
| s2  | 0  | 0  | 1  | 0  | 0  | 0  |
| s3  | 0  | 1  | 0  | 0  | 0  | 0  |
| s4  | 0  | 0  | 1  | -1 | 0  | 0  |
| s6  | 0  | 0  | 1  | 1  | 0  | 0  |
| s7  | 0  | 0  | 1  | -1 | 0  | 0  |
| s8  | 0  | 0  | 1  | 0  | 0  | 0  |
| s9  | 0  | -1 | 0  | 0  | 0  | 0  |
| s10 | 0  | 0  | 1  | 1  | 0  | 0  |
| s13 | 0  | 1  | 1  | 0  | 0  | 0  |
| s14 | 0  | -1 | 1  | 0  | 0  | 0  |

FIG. 7

|    | fx | fy | fz | nx | ny | nz |
|----|----|----|----|----|----|----|
| p1 | 1  | 1  | 1  | -1 | 0  | 0  |
| p2 | 1  | 1  | 0  | -1 | 0  | 0  |
| p3 | 0  | 0  | 1  | 1  | 0  | 0  |
| p4 | 0  | 0  | 1  | -1 | 0  | 0  |
| p5 | -1 | -1 | 0  | 1  | 0  | 0  |
| p6 | -1 | -1 | 1  | 1  | 0  | 0  |
| p7 | 1  | 1  | 0  | -1 | 0  | 0  |
| p8 | -1 | -1 | 0  | 1  | 0  | 0  |

FIG. 8

| STATE TRANSITION | $\theta_x$[deg] | $\theta_y$[deg] | $\theta_z$[deg] | $f_x$[N] | $f_y$[N] | $f_z$[N] |
|---|---|---|---|---|---|---|
| p1→s7 | − | 0 | 0 | 0 | 0 | 0 |
| p2→s2 | + | 0 | 0 | 0 | 0 | 0 |
| p2→s3 | − | 0 | 0 | 0 | − | 0 |
| p2→s4 | 0 | 0 | 0 | 0 | 0 | − |
| p3→s2 | + | 0 | 0 | 0 | 0 | 0 |
| p4→s8 | − | 0 | 0 | 0 | 0 | 0 |
| p5→s8 | − | 0 | 0 | 0 | 0 | 0 |
| p5→s9 | + | 0 | 0 | 0 | + | 0 |
| p5→s10 | 0 | 0 | 0 | 0 | 0 | − |
| p6→s6 | + | 0 | 0 | 0 | 0 | 0 |
| s6→p3 | + | 0 | 0 | 0 | 0 | 0 |
| s7→p4 | − | 0 | 0 | 0 | 0 | 0 |
| s2→p7 | − | 0 | 0 | 0 | 0 | − |
| s4→p7 | − | 0 | 0 | 0 | 0 | 0 |
| p7→s3 | − | 0 | 0 | 0 | − | 0 |
| s3→s13 | 0 | 0 | 0 | 0 | − | − |
| s8→p8 | + | 0 | 0 | 0 | 0 | − |
| s10→p8 | + | 0 | 0 | 0 | 0 | 0 |
| p8→s9 | + | 0 | 0 | 0 | + | 0 |
| s9→s14 | 0 | 0 | 0 | 0 | + | − |

FIG. 9

|      | $^o f_x$ | $^o f_y$ | $^o f_z$ | $^{obj} n_x$ | $^{obj} n_y$ | $^{obj} n_z$ |
|------|---|---|---|---|---|---|
| p101 | 0 | 1 | 1 | -1 | 0 | -1 |
| p102 | 0 | 1 | 1 | -1 | 0 | 1 |
| p103 | 0 | 1 | 1 | -1 | 1 | 0 |
| p104 | 0 | 1 | 1 | -1 | -1 | 0 |
| p105 | 0 | -1 | 1 | 1 | 0 | 1 |
| p106 | 0 | -1 | 1 | 1 | 0 | -1 |
| p107 | 0 | -1 | 1 | 1 | 1 | 0 |
| p108 | 0 | -1 | 1 | 1 | 0 | 0 |

FIG.15

|       | $^o f_x$ | $^o f_y$ | $^o f_z$ | $^o n_x$ | $^o n_y$ | $^o n_z$ |
|-------|---|---|---|---|---|---|
| tp101 | 1 | 1 | 1 | -1 | 1 | 0 |
| tp102 | -1 | 1 | 1 | -1 | -1 | 0 |
| tp103 | 1 | 1 | 1 | 1 | 1 | 0 |
| tp104 | -1 | 1 | 1 | 1 | -1 | 0 |
| tp105 | 1 | -1 | 1 | 1 | 1 | 0 |
| tp106 | -1 | -1 | 1 | 1 | -1 | 0 |
| tp107 | 1 | -1 | 1 | 1 | 1 | 0 |
| tp108 | -1 | -1 | 1 | 1 | -1 | 0 |

FIG.16

|      | $^o f_x$ | $^o f_y$ | $^o f_z$ | $^o n_x$ | $^o n_y$ | $^o n_z$ |
|------|---|---|---|---|---|---|
| l101 | 1 | 1 | 1 | -1 | 0 | 0 |
| l102 | 0 | 1 | 1 | -1 | 0 | 0 |
| l103 | -1 | 1 | 1 | -1 | 0 | 0 |
| l104 | 0 | 1 | 1 | -1 | 0 | 0 |
| l105 | 0 | 1 | 1 | -1 | 0 | 0 |
| l106 | -1 | 1 | 1 | -1 | 0 | 0 |
| l107 | 1 | -1 | 1 | 1 | 0 | 0 |
| l108 | 0 | -1 | 1 | 1 | 0 | 0 |
| l109 | -1 | -1 | 1 | 1 | 0 | 0 |
| l110 | 1 | -1 | 1 | 1 | 0 | 0 |
| l111 | 0 | -1 | 1 | 1 | 0 | 0 |
| l112 | -1 | -1 | 1 | 1 | 0 | 0 |

FIG.17

|       | °fx | °fy | °fz | °nx | °ny | °nz |
|-------|-----|-----|-----|-----|-----|-----|
| s101  | 1   | 0   | 1   | -1  | 0   | 0   |
| s102  | 1   | 1   | 0   | 0   | 0   | 0   |
| s103  | 1   | 0   | 1   | 0   | 0   | 0   |
| s104  | 1   | 0   | 1   | 0   | 0   | 0   |
| s105  | 1   | -1  | 0   | 0   | 0   | 0   |
| s106  | 1   | 0   | 1   | 1   | 0   | 0   |
| s107  | 1   | 1   | 1   | -1  | 0   | 0   |
| s108  | 1   | -1  | 1   | 1   | 0   | 0   |
| s109  | 1   | 1   | 1   | 0   | 0   | 0   |
| s110  | 1   | -1  | 1   | 0   | 0   | 0   |

FIG.18

|              | $\theta_x$[deg] | $\theta_y$[deg] | $\theta_z$[deg] | fx[N] | fy[N] | fz[N] |
|--------------|-----|-----|-----|-----|-----|-----|
| p101→tp101   | 0   | 0   | 45  | 0   | 0   | 0   |
| p101→l102    | 0   | 0   | -45 | 0   | 0   | 0   |
| p102→tp102   | 0   | 0   | -45 | 0   | 0   | 0   |
| p102→l102    | 0   | 0   | 45  | 0   | 0   | 0   |
| p103→tp103   | 0   | 45  | 0   | 0   | 0   | 0   |
| p103→l105    | 0   | -45 | 0   | 0   | 0   | 0   |
| p104→tp104   | 0   | -45 | 0   | 0   | 0   | 0   |
| p104→l105    | 0   | 45  | 0   | 0   | 0   | 0   |
| p105→tp105   | 0   | 0   | -45 | 0   | 0   | 0   |
| p105→l108    | 0   | 0   | 45  | 0   | 0   | 0   |
| p106→tp106   | 0   | 0   | 45  | 0   | 0   | 0   |
| p106→l108    | 0   | 0   | -45 | 0   | 0   | 0   |
| p107→tp107   | 0   | -45 | 0   | 0   | 0   | 0   |
| p107→l111    | 0   | 45  | 0   | 0   | 0   | 0   |
| p108→tp108   | 0   | 45  | 0   | 0   | 0   | 0   |
| p108→tp111   | 0   | -45 | 0   | 0   | 0   | 0   |

FIG.19

|  | $\theta_x$[deg] | $\theta_y$[deg] | $\theta_z$[deg] | fx[N] | fy[N] | fz[N] |
|---|---|---|---|---|---|---|
| tp101→l101 | 0 | 0 | -45 | -1 | 0 | 0 |
| tp102→l103 | 0 | 0 | -45 | 1 | 0 | 0 |
| tp103→l104 | 0 | 45 | 0 | -1 | 0 | 0 |
| tp104→l106 | 0 | -45 | 0 | 1 | 0 | 0 |
| tp105→l107 | 0 | 0 | 45 | -1 | 0 | 0 |
| tp106→l109 | 0 | 0 | 45 | 1 | 0 | 0 |
| tp107→l110 | 0 | 45 | 0 | -1 | 0 | 0 |
| tp108→l112 | 0 | -45 | 0 | 1 | 0 | 0 |

FIG.20

|  | $\theta_x$[deg] | $\theta_y$[deg] | $\theta_z$[deg] | fx[N] | fy[N] | fz[N] |
|---|---|---|---|---|---|---|
| l102→l101 | 0 | 0 | 0 | -1 | 0 | 0 |
| l103→l101 | 0 | 0 | 0 | -1 | 0 | 0 |
| l105→l104 | 0 | 0 | 0 | -1 | 0 | 0 |
| l106→l104 | 0 | 0 | 0 | -1 | 0 | 0 |
| l108→l107 | 0 | 0 | 0 | -1 | 0 | 0 |
| l109→l107 | 0 | 0 | 0 | -1 | 0 | 0 |
| l111→l110 | 0 | 0 | 0 | -1 | 0 | 0 |
| l112→l110 | 0 | 0 | 0 | 1 | 0 | 0 |

FIG.21

|  | $\theta_x$[deg] | $\theta_y$[deg] | $\theta_z$[deg] | fx[N] | fy[N] | fz[N] |
|---|---|---|---|---|---|---|
| l101→s101 | 20 | 0 | 0 | 0 | 0 | 0 |
| l101→s102 | -20 | 0 | 0 | 0 | -1 | 0 |
| l101→s103 | 45 | 0 | 0 | 0 | 0 | 0 |
| l104→s104 | -45 | 0 | 0 | 0 | 0 | 0 |
| l107→s104 | -45 | 0 | 0 | 0 | 0 | 0 |
| l107→s105 | 20 | 0 | 0 | 0 | 1 | 0 |
| l107→s106 | -45 | 0 | 0 | 0 | 0 | 0 |
| l110→s103 | 45 | 0 | 0 | 0 | 0 | 0 |

FIG.22

|  | $\theta_x$[deg] | $\theta_y$[deg] | $\theta_z$[deg] | fx[N] | fy[N] | fz[N] |
|---|---|---|---|---|---|---|
| s101→s107 | 0 | 0 | 0 | 0 | 0 | 0 |
| s103→s107 | -45 | 0 | 0 | 0 | 0 | -1 |
| s104→s108 | 45 | 0 | 0 | 0 | 0 | -1 |
| s106→s108 | 0 | 0 | 0 | 0 | 0 | 0 |
| s107→s102 | -20 | 0 | 0 | 0 | -1 | 0 |
| s108→s105 | 20 | 0 | 0 | 0 | 1 | 0 |
| s102→s109 | 0 | 0 | 0 | 0 | 0 | 0 |
| s105→s110 | 0 | 0 | 0 | 0 | 0 | 0 |

FIG.23

|      | $^o f_x$ | $^o f_y$ | $^o f_z$ | $^{obj} n_x$ | $^{obj} n_y$ | $^{obj} n_z$ |
|------|---|---|---|---|---|---|
| p201 | 1 | 0 | 1 | 0 | 1 | 1 |
| p202 | 1 | 0 | 1 | 0 | 1 | -1 |

FIG.29

|       | $^o f_x$ | $^o f_y$ | $^o f_z$ | $^{obj} n_x$ | $^{obj} n_y$ | $^{obj} n_z$ |
|-------|---|---|---|---|---|---|
| tp201 | 1 | 1 | 1 | -1 | 0 | 0 |
| tp202 | 1 | 1 | 1 | 0 | 0 | -1 |
| tp204 | 1 | 1 | 1 | 0 | 1 | 0 |

FIG.30

|      | $^o f_x$ | $^o f_y$ | $^o f_z$ | $^o n_x$ | $^o n_y$ | $^o n_z$ |
|------|---|---|---|---|---|---|
| l201 | 1 | 1 | 1 | 0 | 1 | 0 |
| l202 | 1 | 1 | 1 | -1 | 1 | 0 |
| l203 | 1 | 1 | 1 | 1 | 0 | 0 |
| l208 | 1 | 1 | 1 | 0 | 1 | 0 |
| l209 | 1 | 1 | 1 | 1 | 0 | 0 |

FIG.31

|      | $^o f_x$ | $^o f_y$ | $^o f_z$ | $^o n_x$ | $^o n_y$ | $^o n_z$ |
|------|---|---|---|---|---|---|
| s201 | 1 | 0 | 1 | 0 | 0 | 0 |
| s202 | 0 | 1 | 1 | 0 | 0 | 0 |
| s203 | 1 | 1 | 0 | 0 | 0 | 0 |
| s204 | 1 | 1 | 1 | 0 | 0 | 0 |

FIG.32

|      | $^o f_x$ | $^o f_y$ | $^o f_z$ | $^{obj} n_x$ | $^{obj} n_y$ | $^{obj} n_z$ |
|------|---|---|---|---|---|---|
| p301 | 1 | 0 | 1 | -1 | 1 | 0 |

FIG.33

|  | $^o f_x$ | $^o f_y$ | $^o f_z$ | $^{obj}n_x$ | $^{obj}n_y$ | $^{obj}n_z$ |
|---|---|---|---|---|---|---|
| tp303 | 1 | 1 | 1 | 0 | 0 | 1 |
| tp304 | 1 | 1 | 1 | -1 | 0 | 0 |

FIG.34

|  | $^o f_x$ | $^o f_y$ | $^o f_z$ | $^o n_x$ | $^o n_y$ | $^o n_z$ |
|---|---|---|---|---|---|---|
| I301 | 1 | 1 | 1 | -1 | 1 | 0 |
| I302 | 1 | 1 | 1 | 0 | 1 | 0 |
| I308 | 1 | 1 | 1 | 0 | 1 | 0 |

FIG.35

|  | $^o f_x$ | $^o f_y$ | $^o f_z$ | $^o n_x$ | $^o n_y$ | $^o n_z$ |
|---|---|---|---|---|---|---|
| s301 | 0 | 1 | 1 | 0 | 0 | 0 |
| s304 | -1 | 1 | 0 | 0 | 0 | 0 |
| s306 | -1 | 1 | 1 | 0 | 0 | 0 |

FIG.36

|  | $^o f_x$ | $^o f_y$ | $^o f_z$ | $^{obj}n_x$ | $^{obj}n_y$ | $^{obj}n_z$ |
|---|---|---|---|---|---|---|
| p401 | 1 | 0 | 1 | 1 | 1 | -1 |

FIG.37

|  | $^o f_x$ | $^o f_y$ | $^o f_z$ | $^{obj}n_x$ | $^{obj}n_y$ | $^{obj}n_z$ |
|---|---|---|---|---|---|---|
| tp401 | 1 | 1 | 1 | 0 | -1 | 0 |
| tp402 | 1 | 1 | 1 | 1 | -1 | 0 |

FIG.38

|  | $^o f_x$ | $^o f_y$ | $^o f_z$ | $^o n_x$ | $^o n_y$ | $^o n_z$ |
|---|---|---|---|---|---|---|
| I401 | 1 | -1 | 1 | 0 | -1 | 0 |
| I408 | -1 | -1 | 1 | 0 | -1 | 0 |

FIG.39

|      | $^o f_x$ | $^o f_y$ | $^o f_z$ | $^o n_x$ | $^o n_y$ | $^o n_z$ |
|------|---|----|---|---|---|---|
| s401 | 0 | -1 | 1 | 0 | 0 | 0 |
| s404 | -1 | -1 | 0 | 0 | 0 | 0 |
| s406 | -1 | -1 | 1 | 0 | 0 | 0 |

FIG.40

|      | $^o f_x$ | $^o f_y$ | $^o f_z$ | $^{obj} n_x$ | $^{obj} n_y$ | $^{obj} n_z$ |
|------|---|---|---|---|----|----|
| p501 | 1 | 0 | 1 | 0 | 1 | -1 |
| p502 | 1 | 0 | 1 | 0 | -1 | -1 |

FIG.41

|       | $^o f_x$ | $^o f_y$ | $^o f_z$ | $^{obj} n_x$ | $^{obj} n_y$ | $^{obj} n_z$ |
|-------|---|---|---|---|----|---|
| tp501 | 1 | 1 | 1 | 0 | -1 | 0 |
| tp504 | 1 | 1 | 1 | 1 | 1 | 0 |
| tp505 | 1 | 1 | 1 | 1 | 1 | 0 |

FIG.42

|      | $^o f_x$ | $^o f_y$ | $^o f_z$ | $^o n_x$ | $^o n_y$ | $^o n_z$ |
|------|---|----|---|---|---|---|
| l503 | 1 | 1 | 1 | 1 | 0 | 0 |
| l504 | 1 | 1 | 1 | 1 | 1 | 0 |
| l508 | 1 | -1 | 1 | 1 | 0 | 0 |

FIG.43

|      | $^o f_x$ | $^o f_y$ | $^o f_z$ | $^o n_x$ | $^o n_y$ | $^o n_z$ |
|------|---|---|---|---|---|---|
| s501 | 1 | 0 | 1 | 0 | 0 | 0 |
| s503 | 1 | 1 | 0 | 0 | 0 | 0 |
| s504 | 1 | 1 | 1 | 0 | 0 | 0 |

FIG.44

|  | θx[deg] | θy[deg] | θz[deg] | fx[N] | fy[N] | fz[N] |
|---|---|---|---|---|---|---|
| p201→tp201 | 0 | 0 | 0 | 0 | -1 | 0 |
| p202→tp202 | 0 | 0 | 0 | 0 | -1 | 0 |
| p204→tp204 | 0 | 0 | 0 | 0 | 1 | 0 |

FIG.45

|  | θx[deg] | θy[deg] | θz[deg] | fx[N] | fy[N] | fz[N] |
|---|---|---|---|---|---|---|
| tp201→l201 | 0 | 0 | -45 | -1 | -1 | 0 |
| tp202→l202 | 0 | 0 | -45 | 0 | -1 | 0 |
| tp204→l203 | 0 | 0 | -45 | -1 | -1 | 0 |

FIG.46

|  | θx[deg] | θy[deg] | θz[deg] | fx[N] | fy[N] | fz[N] |
|---|---|---|---|---|---|---|
| l201→s201 | 0 | 0 | -45 | -1 | -1 | 0 |
| l202→l201 | 0 | 0 | -45 | 0 | -1 | 0 |
| l203→s202 | 0 | 0 | -45 | -1 | -1 | 0 |
| l208→s203 | 0 | 45 | 0 | -1 | -1 | 0 |
| l209→s203 | -45 | 0 | 0 | -1 | -1 | 0 |

FIG.47

|  | θx[deg] | θy[deg] | θz[deg] | fx[N] | fy[N] | fz[N] |
|---|---|---|---|---|---|---|
| s201→l208 | 0 | 0 | -45 | -1 | -1 | 0 |
| s202→l209 | 0 | 0 | -45 | 0 | -1 | 0 |
| s203→l204 | 0 | 0 | 0 | 0 | 0 | 0 |

FIG.48

|  | θx[deg] | θy[deg] | θz[deg] | fx[N] | fy[N] | fz[N] |
|---|---|---|---|---|---|---|
| p301→tp303 | 0 | 0 | 0 | 0 | -1 | 0 |
| p301→tp304 | 0 | 0 | 0 | 0 | -1 | 0 |

FIG.49

|  | θx[deg] | θy[deg] | θz[deg] | fx[N] | fy[N] | fz[N] |
|---|---|---|---|---|---|---|
| tp303→l301 | 0 | 0 | -45 | 0 | -1 | 0 |
| tp304→l302 | 0 | 0 | 45 | 0 | -1 | 0 |

FIG.50

|  | θx[deg] | θy[deg] | θz[deg] | fx[N] | fy[N] | fz[N] |
|---|---|---|---|---|---|---|
| l301→l302 | 0 | 0 | -45 | 0 | -1 | 0 |
| l302→s301 | 0 | 0 | 0 | 0 | -1 | -1 |
| l308→s304 | 0 | -45 | 0 | 1 | -1 | 0 |

FIG.51

|  | θx[deg] | θy[deg] | θz[deg] | fx[N] | fy[N] | fz[N] |
|---|---|---|---|---|---|---|
| s301→l308 | 0 | 45 | 0 | 1 | -1 | 0 |
| l308→s304 | 0 | -45 | 0 | 1 | -1 | 0 |
| s304→s306 | 0 | 45 | 0 | 1 | 1 | 0 |

FIG.52

|  | θx[deg] | θy[deg] | θz[deg] | fx[N] | fy[N] | fz[N] |
|---|---|---|---|---|---|---|
| p401→tp401 | 0 | 0 | 0 | 0 | -1 | 0 |
| p401→tp402 | 0 | 0 | 0 | 0 | -1 | 0 |

FIG.53

|  | θx[deg] | θy[deg] | θz[deg] | fx[N] | fy[N] | fz[N] |
|---|---|---|---|---|---|---|
| tp401→tp402 | 0 | 0 | -45 | 0 | 0 | 0 |
| tp402→l401 | 0 | 0 | 45 | 0 | 1 | 0 |

FIG.54

|  | θx[deg] | θy[deg] | θz[deg] | fx[N] | fy[N] | fz[N] |
|---|---|---|---|---|---|---|
| l401→s401 | 0 | 45 | 0 | 0 | 1 | 0 |
| l408→s404 | 0 | -45 | 0 | 1 | 1 | 0 |

FIG.55

|  | $\theta_x$[deg] | $\theta_y$[deg] | $\theta_z$[deg] | fx[N] | fy[N] | fz[N] |
|---|---|---|---|---|---|---|
| s401→l408 | 0 | −45 | 0 | 1 | 1 | 0 |
| s404→s406 | 0 | 0 | 0 | 0 | 0 | −1 |

FIG.56

|  | $\theta_x$[deg] | $\theta_y$[deg] | $\theta_z$[deg] | fx[N] | fy[N] | fz[N] |
|---|---|---|---|---|---|---|
| p501→tp501 | 0 | 0 | 0 | 0 | −1 | 0 |
| p502→tp504 | 0 | 0 | 0 | 0 | −1 | 0 |
| p502→tp505 | 0 | 0 | 0 | 0 | −1 | 0 |

FIG.57

|  | $\theta_x$[deg] | $\theta_y$[deg] | $\theta_z$[deg] | fx[N] | fy[N] | fz[N] |
|---|---|---|---|---|---|---|
| tp501→l503 | 0 | 45 | 45 | −1 | −1 | 0 |
| tp504→l503 | 0 | 0 | 45 | −1 | −1 | 0 |
| tp505→l504 | 0 | 0 | 45 | 0 | 0 | 0 |

FIG.58

|  | $\theta_x$[deg] | $\theta_y$[deg] | $\theta_z$[deg] | fx[N] | fy[N] | fz[N] |
|---|---|---|---|---|---|---|
| l503→s501 | −45 | 0 | 0 | −1 | −1 | 0 |
| l504→l503 | 0 | 0 | 45 | −1 | −1 | 0 |
| l508→s503 | 45 | 0 | 0 | −1 | 1 | 0 |

FIG.59

|  | $\theta_x$[deg] | $\theta_y$[deg] | $\theta_z$[deg] | fx[N] | fy[N] | fz[N] |
|---|---|---|---|---|---|---|
| s501→l508 | 45 | 0 | 0 | −1 | 1 | −1 |
| s503→l504 | 0 | 0 | 0 | 0 | 0 | −1 |

FIG.60

ROBOT APPARATUS, ASSEMBLING METHOD, AND RECORDING MEDIUM

CROSS-REFERENCE TO RELATED APPLICATIONS

This is a continuation patent application of U.S. application Ser. No. 13/755,453 filed Jan. 31, 2013 which claims priority to Japanese Patent Application No. 2012-020321 filed Feb. 1, 2012 all of which are expressly incorporated by reference herein.

BACKGROUND

1. Technical Field

The present invention relates to a robot apparatus, an assembling method, and an assembling program.

2. Related Art

In a manufacturing process for an electronic apparatus, most of work in assembly is automated. In this automated manufacturing line, the assembly is performed using a robot. For example, a manufacturing apparatus for the robot is controlled to insert a second component into a first component.

JP-A-7-241733 (Patent Literature 1) is an example of related art.

However, in the technique disclosed in Patent Literature 1, when an object is fit in a hole-shaped part, contact surfaces of the object and the hole-shaped part are respectively chamfered. Therefore, in the technique disclosed in Patent Literature 1, when the fitting cannot be realized while being affected by a force and a moment caused by the contact, assembly work cannot be performed.

SUMMARY

An advantage of some aspects of the invention is to provide a robot apparatus, an assembling method, and an assembling program that can perform fitting of components even if contact surfaces are not chamfered.

[1] An aspect of the invention is directed to a robot apparatus including: a gripping unit configured to grip a first component; a force sensor configured to detect, as detection values, a force and a moment acting on the gripping unit; a storing unit having stored therein contact states of the first component and a second component and transition information in association with each other; a selecting unit configured to discriminate, on the basis of the detection values, a contact state of the first component and the second component and select, on the basis of a result of the discrimination, the transition state stored in the storing unit; and a control unit configured to control the gripping unit on the basis of the transition information selected by the selecting unit.

With such a configuration, the robot apparatus can determine a contact state of the first component and the second component on the basis of the detection values of the force sensor. The robot apparatus can transition, for each of the contact states of the first component and the second component, the contact state of the first component and the second component on the basis of transition information having the next target state stored therein. Therefore, the robot apparatus can perform fitting of the components even if contact surfaces are not chamfered.

[2] In the robot apparatus described above, the transition information may include information for sequentially transitioning the first component to set the first component in a first contact state with the second component, after the first contact state, set the first component in a second contact state with the second component, after the second contact state, set the first component in a third contact state with a surface of a hole of the second component, and, after the third contact state, attach the first component to the hole of the second component along a surface on which the hole of the second component is provided.

With such a configuration, the robot apparatus can control the first component to be fit in the hole of the second component using transition information corresponding to the contact state of the first component and the second component. Therefore, the robot apparatus can perform fitting of the components even if contact surfaces are not chamfered. For example, the first contact state is a state in which the first component and the second component are in point contact with each other, the second contact state is a state in which the first component and the second component are in point contact with each other at two or more points on a straight line, and the third contact state is a state in which the first component and the second component are in point contact with each other at two or more points on the same surface.

[3] In the robot apparatus described above, in the storing unit, a plurality of sets of first detection values, which are the detection values detected in advance, and the contact states may be stored in association with each other and a plurality of sets of the transition information and control values for controlling the gripping unit may be stored in association with each other. The control unit may select, on the basis of the transition information selected by the selecting unit, the control value stored in the storing unit and control the gripping unit using the selected control value.

[4] In the robot apparatus described above, the selecting unit may compare the detection values and the first detection values stored in the storing unit and discriminate the contact state of the first component and the second component on the basis of a result of the comparison.

With such a configuration, the robot apparatus can reduce a computation amount for discriminating the contact state of the first component and the second component.

[5] The robot apparatus described above may further include a discretizing unit configured to discretize the detection values. The discretizing unit may discretize the first detection values for each of the contact states of the first component and the second component in advance, cause the storing unit to store the first detection values as second detection values, which are detection values after the discretization, and output the detection values after the discretization obtained by discretizing the detection values to the selecting unit during control of the contact state of the first component and the second component. The selecting unit may compare the detection values after the discretization and the second detection values and discriminate the contact state of the first component and the second component.

[6] In the robot apparatus described above, the discretizing unit may ternarize the detection values in an object coordinate system with respect to the first component and ternarize the detection values in an absolute coordinate system with respect to the second component.

[7] In the robot apparatus described above, when there are a plurality of the second detection values coinciding with the detection values after the discretization, the selecting unit may compare the detection values and the first detection values and discriminate the contact state of the first component and the second component on the basis of a result of the component.

[8] In the robot apparatus described above, in the storing unit, third detection values, which are detection values after discretization of the first detection values in the absolute coordinate system, fourth detection values, which are detection values after discretization of the first detection values in the object coordinate system, the first detection values, a plurality of kinds of the transition information, and a plurality of the control values may be stored in association with one another for each of the contact states. In the absolute coordinate system, when the detection values after the discretization and the third detection values are compared, if there are a plurality of the third detection values coinciding with the detection values after the discretization, the selecting unit may compare the detection values after the discretization in the object coordinate system and the fourth detection values and discriminate the contact state of the first component and the second component on the basis of a result of the comparison.

[9] The robot apparatus described above may further include an image pickup apparatus configured to pick up an image of the contact state of the first component and the second component. The selecting unit may identify states of the first component and the second component on the basis of the image picked up by the image pickup apparatus.

[10] The robot apparatus described above may further include: a first arm to which the gripping unit is attached; a second arm to which the gripping unit or an image pickup apparatus is attached, the image pickup apparatus being configured to pick up an image of the contact state of the first component and the second component; a main body to which the first arm and the second arm are attached; and a conveying unit attached to the main body.

[11] Another aspect of the invention is directed to an assembling method in a robot apparatus including: allowing a selecting unit to discriminate, on the basis of detection values output by a force sensor detecting a force and a moment acting on a gripping unit configured to grip a first component, a contact state of the first component and the second component, and select, on the basis of a result of the discrimination, transition information stored in a storing unit in association with the contact state; and allowing a control unit to control the gripping unit on the basis of the selected transition information.

[12] Still another aspect of the invention is directed to an assembling program that causes a computer included in a robot apparatus to execute: a step of discriminating, on the basis of a detection values output by a force sensor detecting a force and a moment acting on a gripping unit configured to grip a first component, a contact state of the first component and the second component and selecting, on the basis of a result of the discrimination, transition information stored in a storing unit in association with the contact state; and a step of controlling the gripping unit on the basis of the selected transition information.

BRIEF DESCRIPTION OF THE DRAWINGS

The invention will be described with reference to the accompanying drawings, wherein like numbers reference like elements.

FIG. 6 is a diagram showing detection values after discretization of states p1 to p8 detected by the force sensor in an absolute coordinate system and stored in the table storing unit according to the first embodiment.

FIG. 7 is a diagram showing detection values after the discretization of states s2 to s14 detected by the force sensor in the absolute coordinate system or an object coordinate system and stored in the table storing unit according to the first embodiment.

FIG. 8 is a diagram showing detection values after the discretization of the states p1 to p8 detected by the force sensor in the object coordinate system and stored in the table storing unit according to the first embodiment.

FIG. 9 is a diagram for explaining command values stored in the table storing unit according to the first embodiment.

FIG. 15 is a diagram showing detection values after discretization of states p101 to p108 detected by a force sensor and stored in the table storing unit according to the second embodiment.

FIG. 16 is a diagram showing detection values after the discretization of states tp101 to tp108 detected by the force sensor in the absolute coordinate system and stored in the table storing unit according to the second embodiment.

FIG. 17 is a diagram showing detection values after the discretization of states 1101 to 1112 detected by the force sensor in the absolute coordinate system and stored in the table storing unit according to the second embodiment.

FIG. 18 is a diagram showing detection values after the discretization of states s101 to s110 detected by the force sensor in the absolute coordinate system and stored in the table storing unit according to the second embodiment.

FIG. 19 is a diagram for explaining command values for each of state transitions from the states p101 to p108 stored in the table storing unit according to the second embodiment.

FIG. 20 is a diagram for explaining command values for each of state transitions from the states tp101 to tp108 stored in the table storing unit according to the second embodiment.

FIG. 21 is a diagram for explaining command values for each of state transitions from the states 1102, 1103, 1105, 1106, 1108, 1109, 1111, and 1112 stored in the table storing unit according to the second embodiment.

FIG. 22 is a diagram for explaining command values for each of state transitions from the states 1101, 1104, 1107, and 1110 stored in the table storing unit according to the second embodiment.

FIG. 23 is a diagram for explaining command values for each of state transitions from the states s101, s102, s103, s104, s105, s106, s107, s108, and s109 stored in the table storing unit according to the second embodiment.

FIG. 29 is a diagram showing detection values after discretization of states p201 and p202 detected by a force sensor and stored in the table storing unit when an initial posture is the state in which the vertex E1 of the first component is put in the hole according to the third embodiment.

FIG. 30 is a diagram showing detection values after the discretization of states tp201 to tp204 detected by the force sensor and stored in the table storing unit when the initial posture is the state in which the vertex E1 of the first component is put in the hole according to the third embodiment.

FIG. 31 is a diagram showing detection values after the discretization of states 1201 to 1209 detected by the force sensor and stored in the table storing unit when the initial posture is the state in which the vertex E1 of the first component is put in the hole according to the third embodiment.

FIG. 32 is a diagram showing detection values after the discretization of states s201 to s204 detected by the force sensor and stored in the table storing unit when the initial posture is the state in which the vertex E1 of the first component is put in the hole according to the third embodiment.

FIG. 33 is a diagram showing detection values after the discretization of states p301 to p303 detected by the force sensor and stored in the table storing unit when the initial posture is the state in which the vertex F1 of the first component is put in the hole according to the third embodiment.

FIG. 34 is a diagram showing detection values after the discretization of states tp303 and tp304 detected by the force sensor and stored in the table storing unit when the initial posture is the state in which the vertex F1 of the first component is put in the hole according to the third embodiment.

FIG. 35 is a diagram showing detection values after the discretization of states 1301 to 1308 detected by the force sensor and stored in the table storing unit when the initial posture is the state in which the vertex F1 of the first component is put in the hole according to the third embodiment.

FIG. 36 is a diagram showing detection values after the discretization of a state s301 detected by the force sensor and stored in the table storing unit when the initial posture is the state in which the vertex F1 of the first component is put in the hole according to the third embodiment.

FIG. 37 is a diagram showing detection values after the discretization of states p401 to p403 detected by the force sensor and stored in the table storing unit when the initial posture is the state in which the vertex G1 of the first component is put in the hole according to the third embodiment.

FIG. 38 is a diagram showing detection values after the discretization of states tp401 and tp402 detected by the force sensor and stored in the table storing unit when the initial posture is the state in which the vertex G1 of the first component is put in the hole according to the third embodiment.

FIG. 39 is a diagram showing detection values after ternarization of states 1401 to 1408 detected by the force sensor and stored in the table storing unit when the initial posture is the state in which the vertex G1 of the first component is put in the hole according to the third embodiment.

FIG. 40 is a diagram showing detection values after the discretization of a state s401 detected by the force sensor and stored in the table storing unit when the initial posture is the state in which the vertex G1 of the first component is put in the hole according to the third embodiment.

FIG. 41 is a diagram showing detection values after the discretization of states p501 to p503 detected by the force sensor and stored in the table storing unit when the initial posture is the state in which the vertex H1 of the first component is put in the hole according to the third embodiment.

FIG. 42 is a diagram showing detection values after the discretization of states tp501 to tp505 detected by the force sensor and stored in the table storing unit when the initial posture is the state in which the vertex H1 of the first component is put in the hole according to the third embodiment.

FIG. 43 is a diagram showing detection values after the discretization of states 1503 to 1508 detected by the force sensor and stored in the table storing unit when the initial posture is the state in which the vertex H1 of the first component is put in the hole according to the third embodiment.

FIG. 44 is a diagram showing detection values after the discretization of a state s501 detected by the force sensor and stored in the table storing unit when the initial posture is the state in which the vertex H1 of the first component is put in the hole according to the third embodiment.

FIG. 45 is a diagram for explaining command values for each of state transitions from the states p201 and p202 stored in the table storing unit when the initial posture is the state in which the vertex E1 of the first component is put in the hole according to the third embodiment.

FIG. 46 is a diagram for explaining command values for each of state transitions from the states tp201, tp202, and tp 204 stored in the table storing unit when the initial posture is the state in which the vertex E1 of the first component is put in the hole according to the third embodiment.

FIG. 47 is a diagram for explaining command values for each of state transitions from the states 1201, 1202, 1204, 1208, and 1209 stored in the table storing unit when the initial posture is the state in which the vertex E1 of the first component is put in the hole according to the third embodiment.

FIG. 48 is a diagram for explaining command values for each of state transitions from the states s201 and s202 stored in the table storing unit when the initial posture is the state in which the vertex E1 of the first component is put in the hole according to the third embodiment.

FIG. 49 is a diagram for explaining command values for each of state transitions from the states p301, p302 and p303 stored in the table storing unit when the initial posture is the state in which the vertex F1 of the first component is put in the hole according to the third embodiment.

FIG. 50 is a diagram for explaining command values for each of state transitions from the states tp303 and tp304 stored in the table storing unit when the initial posture is the state in which the vertex F1 of the first component is put in the hole according to the third embodiment.

FIG. 51 is a diagram for explaining command values for each of state transitions from the states 1301, 1302, and 1308 stored in the table storing unit when the initial posture is the state in which the vertex F1 of the first component is put in the hole according to the third embodiment.

FIG. 52 is a diagram for explaining command values for each of state transitions from the states s301, s302, and s303 stored in the table storing unit when the initial posture is the state in which the vertex F1 of the first component is put in the hole according to the third embodiment.

FIG. 53 is a diagram for explaining command values for each of state transitions from the states p401 and p402 stored in the table storing unit when the initial posture is the state in which the vertex G1 of the first component is put in the hole according to the third embodiment.

FIG. 54 is a diagram for explaining command values for each of state transitions from the states tp401 and tp402 stored in the table storing unit when the initial posture is the state in which the vertex G1 of the first component is put in the hole according to the third embodiment.

FIG. 55 is a diagram for explaining command values for each of state transitions from the states 1401 and 1408 stored in the table storing unit when the initial posture is the state in which the vertex G1 of the first component is put in the hole according to the third embodiment.

FIG. 56 is a diagram for explaining command values for each of state transitions from the states s401 and s404 stored in the table storing unit when the initial posture is the state in which the vertex G1 of the first component is put in the hole according to the third embodiment.

FIG. 57 is a diagram for explaining command values for each of state transitions from the states p501 and p502 stored in the table storing unit when the initial posture is the state in which the vertex H1 of the first component is put in the hole according to the third embodiment.

FIG. 58 is a diagram for explaining command values for each of state transitions from the states tp501, tp504, and tp505 stored in the table storing unit when the initial posture is the state in which the vertex H1 of the first component is put in the hole according to the third embodiment.

FIG. 59 is a diagram for explaining command values for each of state transitions from the states 1503, 1504, and 1508 stored in the table storing unit when the initial posture is the state in which the vertex H1 of the first component is put in the hole according to the third embodiment.

FIG. 60 is a diagram for explaining command values for each of state transitions from the states s501 and s503 stored in the table storing unit when the initial posture is the state in which the vertex H1 of the first component is put in the hole according to the third embodiment.

DESCRIPTION OF EXEMPLARY EMBODIMENTS

Modes for carrying out the invention are explained in detail below with reference to the drawings.

First Embodiment

A robot apparatus according to a first embodiment discriminates, on the basis of detection values detected by a force sensor, a contact state of a first component and a second component to be fit in each other and controls the contact state of the first component and the second component on the basis of a result of the discrimination and state transitions stored in a storing unit.

The robot apparatus according to this embodiment changes the contact state of the first component and the second component to a first contact state, changes the contact state to a second contact state after the first contact state, and changes the contact state to a third contact state after the second contact state to fit in the first component and the second component each other. Further, in the third contact state, the robot apparatus sequentially transitions the first component to be attached to (fit in) a hole of the second component along a surface of the first component in contact with the hole of the second component.

Figure 1:
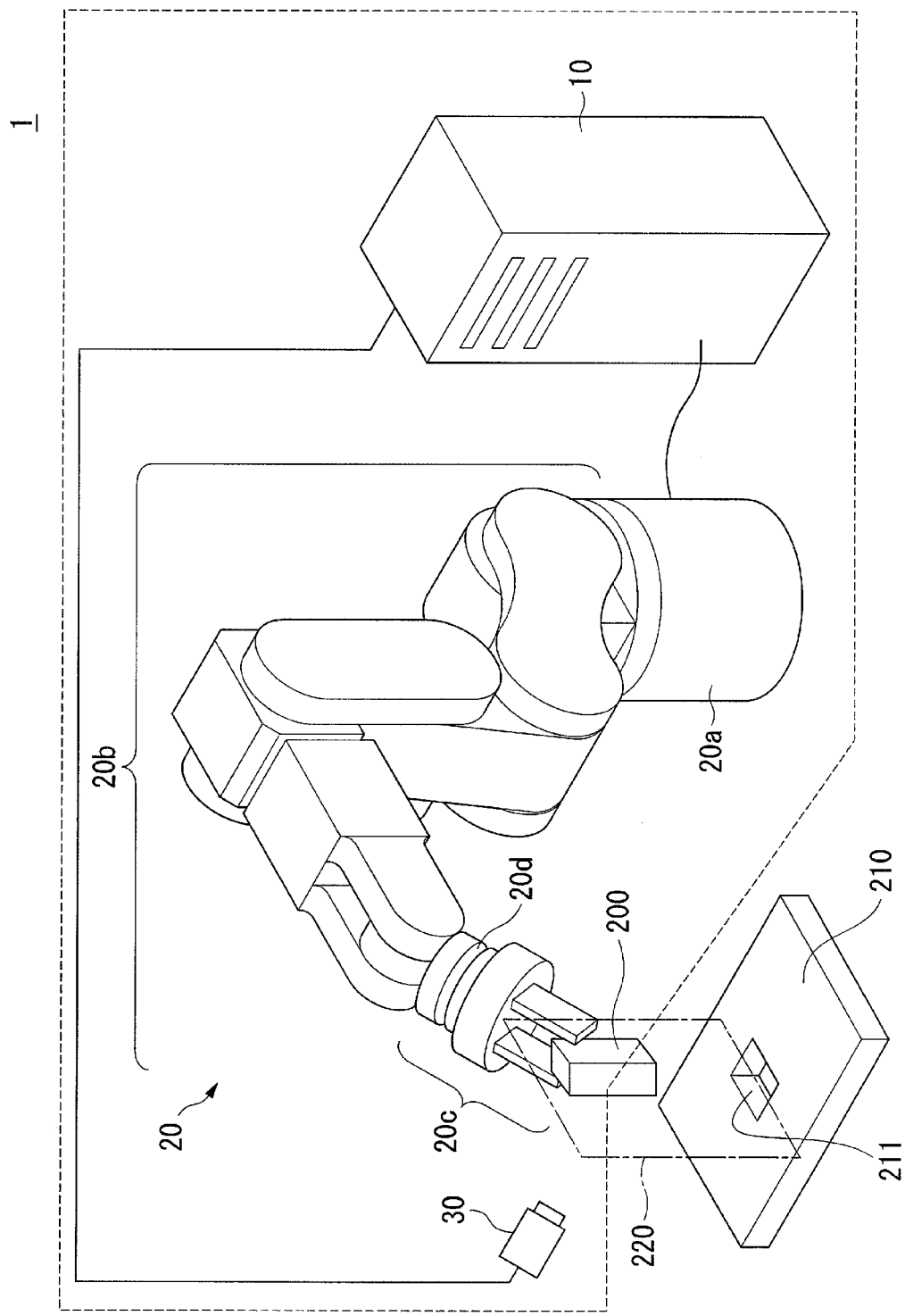
FIG. 1 is a schematic perspective view of a robot according to a first embodiment.

FIG. 1 is a schematic perspective view of a robot apparatus 1 according to this embodiment.

As shown in FIG. 1, the robot apparatus 1 includes a robot control apparatus 10 and a multi-joint robot 20.

Scales of components, structures, and the like in FIG. 1 are different from actual scales to clearly show the figure.

The robot control apparatus 10 controls the operation of the multi-joint robot 20.

The multi-joint robot 20 includes a supporting table 20a fixed on the ground, a manipulator unit 20b coupled to the supporting table 20a to be capable of turning and bending, a gripping unit 20c coupled to the manipulator unit 20b to be capable of pivoting and swinging, a force sensor 20d, and an image pickup apparatus 30.

The multi-joint robot 20 is, for example, a six-axis vertical multi-joint robot. The multi-joint robot 20 has a degree of freedom of six axes according to actions associated with the supporting table 20a, the manipulator unit 20b, and the gripping unit 20c. The multi-joint robot 20 can freely change the position and the direction of a component gripped or held by the griping unit 20c. In this embodiment, the gripping or holding is explained as "gripping". The multi-joint robot 20 moves any one of or a combination of the manipulator unit 20b and the gripping unit 20c according to the control by the robot control apparatus 10.

The force sensor 20d detects a force and a moment applied to the gripping unit 20c. The force sensor 20d is a six-axis force sensor when the degree of freedom of the multi-joint robot 20 is six axes.

The degree of freedom of the multi-joint robot 20 is not limited to the degree of freedom by the six axes. The supporting table 20a may be set in a place fixed with respect to the ground such as a floor, a wall, or a ceiling.

Reference numeral 200 denotes a first component (also referred to as "peg" or "stake") to be combined with a second component 210. The first component 200 is a rectangular parallelepiped or a cube.

The second component 210 has a hole 211 in which the first component 200 is fit. The hole 211 may or may not pierce through the second component 210.

As explained below, reference numeral 220 denotes a plane used when a contact state of the first component 200 and the second component 210 is represented in a two-dimension.

The contact state of the first component 200 and the second component 210 is a form of the first component 200 and the second component 210. The contact state is a state including a state in which the first component 200 and the second component 210 are in point contact with each other (a first contact state), a state in which the first component 200 and the second component 210 are in line contact with each other (a second contact state), a state in which the first component 200 and the second component 210 are in surface contact with each other (a third contact state), and a state in which the first component 200 is put in the hole 211. The state in which the first component 200 and the second component 210 are in line contact with each other is a state in which the first component 200 and the second component 210 are in point contact with each other at two or more points on a straight line. The state in which the first component 200 and the second component 210 are in surface contact with each other is a state in which the first component 200 and the second component 210 are in point contact with each other at two or more points on the same surface. The state in which the first component 200 and the second component 210 are in point contact with each other is, more specifically, for example, as explained below, a state in which a vertex of the first component 200 is in contact with a side or a surface of the second component 210 (the front surface of the second component 210, the sides of the hole 211, or the surfaces of the hole 211).

The image pickup apparatus 30 is set in, for example, a position where a fitting state of the first component 200 and the hole 211 of the second component 210 can be checked. The image pickup apparatus 30 is, for example, a CCD (Charge Coupled Device) camera. The image pickup apparatus 30 outputs picked-up image data to the robot control apparatus 10. The image data picked up by the image pickup apparatus 30 may be or may not be used for control in this embodiment.

Figure 2:
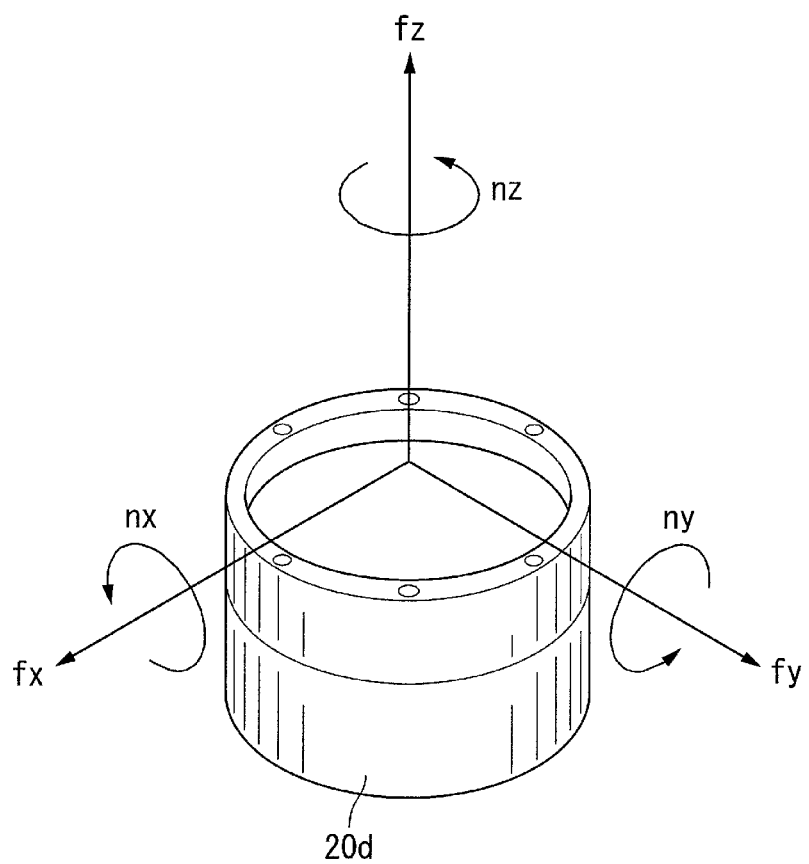
FIG. 2 is a diagram for explaining detection values of a force sensor according to the first embodiment.

FIG. 2 is a diagram for explaining detection values of the force sensor 20d according to this embodiment.

As shown in FIG. 2, detection values (fx, fy, fz, nx, ny, and nz) of the force sensor 20d include six values in total, i.e., forces concerning three orthogonal axes (fx, fy, and fz) and moments of the axes (nx, ny, and nz). For example, Fx represents a force in the x-axis direction and nx represents a moment in the x-axis direction. The force sensor is called inner force sensor as well.

Figure 3:
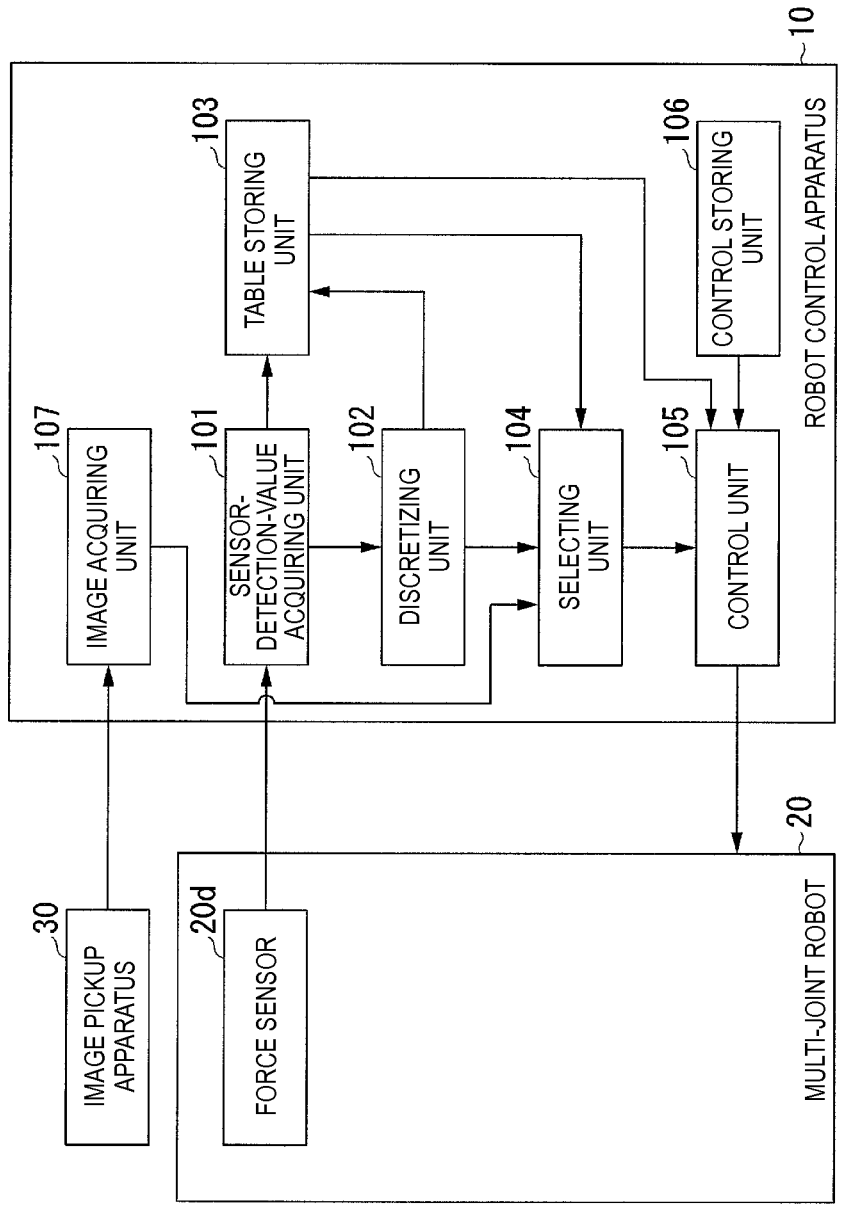
FIG. 3 is a block diagram representing a functional configuration of a robot control apparatus according to the first embodiment.

FIG. 3 is a block diagram showing a functional configuration of the robot control apparatus 10 according to this embodiment.

As shown in FIG. 3, the robot control apparatus 10 includes a sensor-detection-value acquiring unit 101, a discretizing unit 102, a table storing unit (a storing unit) 103, a selecting unit 104, a control unit 105, a control storing unit 106, and an image acquiring unit 107. As shown in FIG. 3, the robot control apparatus 10 is connected to the multi-joint robot 20.

The sensor-detection-value acquiring unit 101 acquires detection values output by the force sensor 20d and outputs the acquired detection values to the discretizing unit 102. The sensor-detection-value acquiring unit 101 acquires, during table creation, detection values detected in advance and causes the table storing unit 103 to store the acquired detection values (detection values before discretization, referred to as first detection values).

The discretizing unit 102 discretizes, during the table creation, the detection values before discretization output by the sensor-detection-value acquiring unit 101 and causes the table storing unit 103 to store the discretized detection values (the detection values after discretization, referred to as second detection values). For example, the discretizing unit 102 ternarizes a detection value into three values (−1, 0, and +1) to discretize the detection value. The discretizing unit 102 causes the table storing unit 103 to store the detection values after the discretization concerning an absolute coordinate system and an object coordinate system. During the table creation, the discretizing unit 102 determines a value to be discretized according to whether an output of the force sensor 20d is large or small with respect to a predetermined threshold taking into account, for example, the rigidity of an object to be fit, a pressing force applied to the object, and the position of a compliance center.

The discretizing unit 102 outputs, during assembly processing, the detection values after discretization to the selecting unit 104. The detection values after discretization in the absolute coordinate system are referred to as third detection values and the detection values after discretization in the object coordinate system are referred to as forth detection values. The third detection values and the fourth detection values are collectively referred to as second detection values as well.

In the table storing unit 103, combinations of the first detection values, the third detection values, the fourth detection values, and contact states associated with one another are stored in a table format. In the table storing unit 103, as explained below, transition information for transition from the present contact state to the next target state is stored in association with the contact states. In the table storing unit 103, as explained below, command values for transition from the state to the next target state are stored in association with the contact states.

During the assembly processing (during control), the selecting unit 104 compares the detection values after discretization output by the discretizing unit 102 and the second detection values stored in the table storing unit 103. The selecting unit 104 discriminates a contact state of the first component 200 and the second component 210 on the basis of a result of the comparison and selects, on the basis of a result of the discrimination, transition information for transition from the present contact state to the next target state out of the transition information stored in the table storing unit 103 in advance. The selecting unit 104 outputs the selected transition information to the control unit 105.

When discriminating a contact state using image data picked up by the image pickup apparatus 30 as well, the selecting unit 104 discriminates a contact state of the first component 200 and the second component 210 using image data output by the image acquiring unit 107 as well. The selecting unit 104 discriminates the contact state of the first component 200 and the second component 210 on the basis of the image data using a well-known image recognition technique.

The control unit 105 reads out, on the basis of the transition information output by the selecting unit 104, command values for transition from the contact states to the next target states (hereinafter referred to as command values) stored in the table storing unit 103. The control unit 105 controls the manipulator unit 20b or the gripping unit 20c of the multi-joint robot 20 on the basis of the read-out command values for transition from the contact states to the next target states.

In the control storing unit 106, a control program, control values, and the like for the multi-joint robot 20 are stored.

The image acquiring unit 107 acquires image data picked up by the image pickup apparatus 30 and outputs the acquired image data to the selecting unit 104.

As explained above, the robot apparatus 1 according to this embodiment includes the gripping unit 20c configured to grip the first component 200, the force sensor 20d configured to detect, as detection values, a force and a moment acting on the gripping unit 20c, the storing unit (the table storing unit 103) having stored therein contact states of contact of the first component 200 and the second component 210 and transition information in association with each other, the selecting unit 104 configured to discriminate a contact state of the first component 200 and the second component 210 on the basis of the detection values and select, on the basis of a result of the discrimination, transition information stored in the storing unit (the table storing unit 103), and the control unit 105 configured to control the griping unit 20c on the basis of the transition information selected by the selecting unit 104.

With such a configuration, the robot apparatus 1 can determine a contact state of the first component 200 and a second component 210 on the basis of the detection values of the force sensor 20d. Further, the robot apparatus 1 can transition, for each of the contact states of the first component 200 and the second component 210, the contact state of the first component 200 and the second component 210 on the basis of transition information having the next target state stored therein.

The absolute coordinate system and the object coordinate system are explained.

Figure 4:
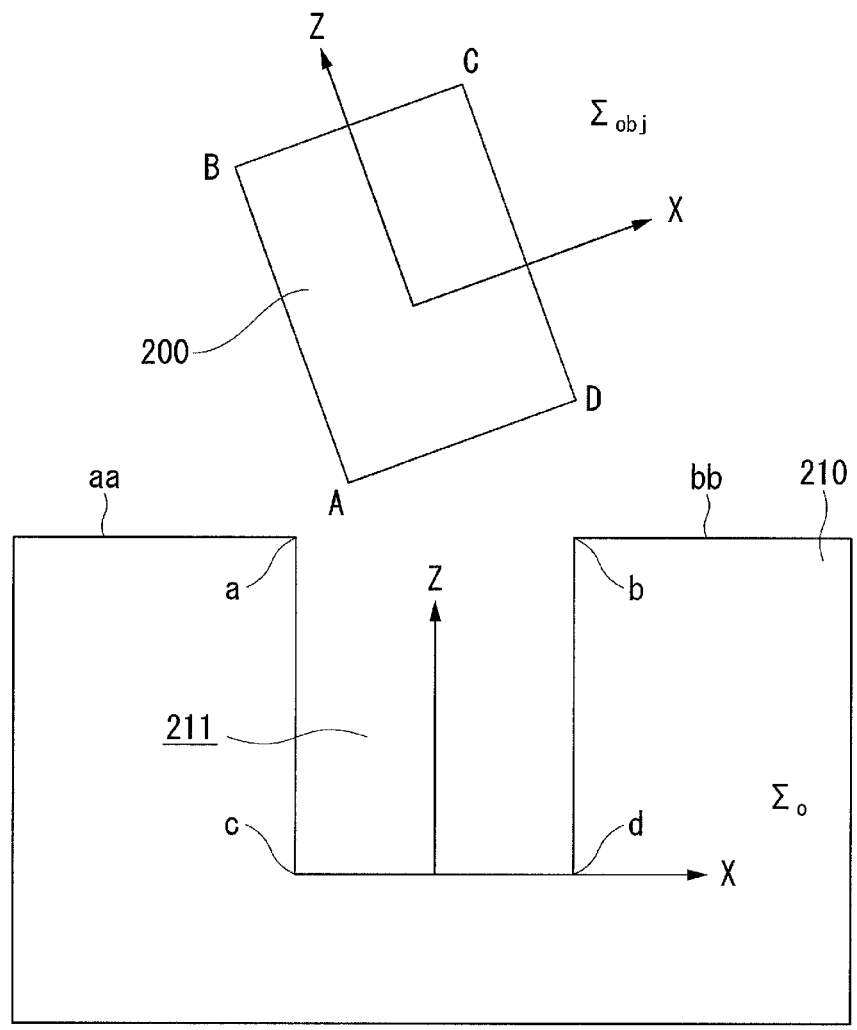
FIG. 4 is a diagram for explaining coordinate systems according to the first embodiment.

FIG. 4 is a diagram for explaining coordinate systems according to this embodiment. In FIG. 4, the first component 200 and the second component 210 are shown with respect to the plane 220 shown in FIG. 1.

In FIG. 4, $\Sigma_o$ represents an absolute coordinate system and $\Sigma_{obj}$ represents an object coordinate. In this embodiment, the absolute coordinate is a coordinate system having the origin in the center of the first component 200. As shown in FIG. 4, the object coordinate is a coordinate system having the origin in the center of a bottom side cd of the hole 211 of the second component 210.

As shown in FIG. 4, vertexes of the first component 200 are respectively represented by A, B, C, and D. Vertexes of the second component 210 are respectively represented by a, b, c, and d. On the front surface of the second component 210, a surface in a negative x-axis direction of the absolute coordinate is represented by aa and a surface in a positive x-axis direction of the absolute coordinate is represented by bb.

In the x-axis direction, the width of the bottom side cd of the hole 211 of the second component 210 is equal to or larger than a bottom side AD of the first component 200.

Conversion of the absolute coordinate $\Sigma_o$ and the object coordinate $\Sigma_{obj}$ is explained.

As explained with reference to FIG. 1, the force sensor 20d is attached to the manipulator unit 20b. The force sensor 20d detects a force (f) and a moment (n) applied to the first component 200.

As shown in FIG. 4, it is assumed that the position and the posture of a base coordinate system $\Sigma_b$ in the absolute coordinate system $\Sigma_o$ are known. In this case, it is possible to calculate the position and the posture of a finger coordinate system $\Sigma_h$ viewed from the absolute coordinate system $\Sigma_o$ according to the forward kinematics. Further, it is assumed that the object coordinate system $\Sigma_{obj}$ in the finger coordinate system $\Sigma_h$ is known. Therefore, a force $^o f$ from the absolute coordinate system $\Sigma_o$ to the object coordinate system $\Sigma_{obj}$ (f is boldface) and the conversion of $^o n$ (n is boldface) is represented by Expressions (1) and (2) below.

$$^o f = {^o R_{obj}} \times {^{obj} f} \quad (1)$$

$$^o n = {^o R_{obj}} \times {^{obj} n} \quad (2)$$

In Expression (1), $^{obj} f$ (f is boldface) is a force in the object coordinate system and is represented by Expression (3) below. In Expression (2), $^{obj} n$ (n is boldface) is a moment in the object coordinate system and is represented by Expression (4) below.

$$^{obj} f = {^{obj} R_{sen}} \times {^{sen} f} \quad (3)$$

$$^{obj} n = [^{obj} P_{sen}] {^{obj} R_{sen}} {^{sen} f} + {^{obj} R_{sen}} {^{sen} n} \quad (4)$$

In Expressions (3) and (4), $^{sen} f$ (f is boldface) is a force applied to the force sensor 20d viewed from the sensor coordinate system $\Sigma_o$. Further, $^{sen} f$ (f is boldface) is a column vector having three elements (real numbers). In Expression (4), $^{sen} n$ (n is boldface) is a moment applied to the force sensor 20d viewed from the sensor coordinate system. $^{obj} P_{sen}$ (P is boldface) is a vector representing an origin position of the sensor coordinate system viewed from the object coordinate system. $^{sen} f$ (f is boldface) is a column vector having three elements (real numbers). In Expressions (3) and (4), $^{obj} R_{sen}$ is a rotating matrix for conversion from the object coordinate system to the sensor coordinate system and is a matrix of three rows and three columns.

In Expressions (1) and (2), $^o R_{obj}$ (R is boldface) is a rotating matrix for conversion from the absolute coordinate system to the object coordinate system and is represented by Expression (5).

$$^o R_{obj} = {^o R_b} {^b R_h} {^h R_{sen}} {^{sen} R_{obj}} \quad (5)$$

In Expression (5), $^o R_b$ is a rotating matrix from an absolute coordinate system o to a base coordinate system b. $^b R_h$ is a rotating matrix from the base coordinate system b to a finger coordinate system h. $^h R_{sen}$ is a rotating matrix from the finger coordinate system h to the force sensor 20d. $^{sen} R_{obj}$ is a rotating matrix from the force sensor 20d to the object coordinate system obj. $^o R_{obj}$, $^o R_b$, $^b R_h$, $^h R_{sen}$, and $^{sen} R_{obj}$ are respectively matrixes of three rows and three columns.

The transition information and detection values and command values of the force sensor 20d stored in the table storing unit 103 are explained.

First, the transition information stored in the table storing unit 103 is explained.

Figure 5:
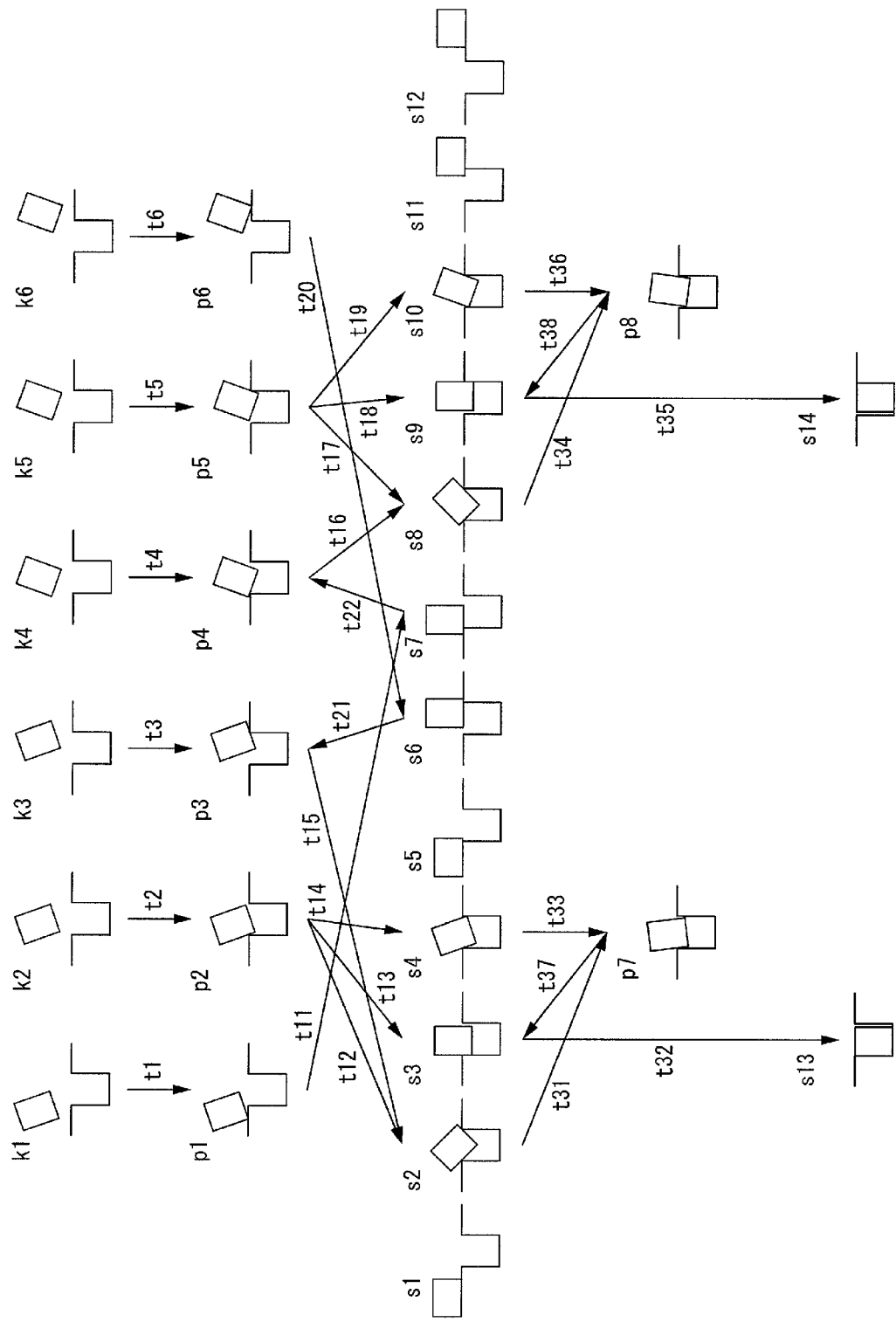
FIG. 5 is a state transition diagram based on transition information stored in a table storing unit according to the first embodiment.

FIG. 5 is a state transition diagram based on the transition information stored in the table storing unit 103 according to this embodiment.

As shown in FIG. 5, in the table storing unit 103, contact states and transition information of the first component 200 and the second component 210 are stored in association with each other for each of state transitions. In the example shown in FIG. 5, signs k1 to k6, p1 to p8, and s1 to s14 represent, in a two-dimension, state of the first component 200 and the second component 210 viewed from a side. Arrows t1 to t6, t11 to t22, and t31 to t38 represent direct transition from the contact states to the next target states. The transition information is, for example, as indicated by arrow t11, information indicating transition from the state p1 to the state s7.

In FIG. 5, it is assumed that the states k1 to k6 are initial postures and a tilt angle of the first component 200 is equal to or smaller than 45 [deg].

As shown in FIG. 5, the initial postures k1 to k6 respectively transition to the states p1 to p6 as indicated by arrows t1 to t6.

As indicated by arrow t11, the next target state of the state p1 is the state s7. As indicated by arrows t12 to t14, the next target state of the state p2 is any one of the states s2 to s4. As indicated by arrow t15, the state p3 transitions to the state s2. As indicated by arrow t16, the next target state of the state p4 is the state s8. As indicated by arrows t17 to t19, the next target state of the state p5 is anyone of the states s8 to s10. As indicated by arrow t20, the next target state of the state p6 is the state s6. As indicated by arrow t21, the next target state of the state s6 is the state p3. As indicated by arrow t22, the next target state of the state s7 is the state p4.

As indicated by arrow t31, the next target state of the state s2 is the state p7. As indicated by arrow t32, the next target state of the state s3 is the state p13. As indicated by arrow t33, the next target state of the state s4 is the state p7. As indicated by arrow t34, the next target state of the state s8 is the state p8. As indicated by arrow t35, the next target state of the state s9 is the state p14. As indicated by arrow t36, the next target state of the state s10 is the state p8. As indicated by arrow t37, the next target state of the state p7 is the state s3. As indicated by arrow t38, the next target state of the state p8 is the state s9.

In FIG. 5, the reason for no state transitions to the states s1, s5, s11, and s12 and the states s1, s5, s11, and s12 transition to no state is, in these states, the first component 200 cannot be combined along a point or a line of the hole 211 of the second component 210. Therefore, transition information of these states may not be stored in the table storing unit 103.

The states p1 to p8 are states in which the first component 200 and the second component 210 are in contact in a point and a line (a first contact form). For example, the state p1 is a state in which a vertex A of the first component is in contact with a line aa of the second component. For example, the state p2 is a state in which a line AB of the first component is in contact with a vertex a of the second component.

When viewed three-dimensionally, the first component 200 and the second component 210 are in contact with in a line and a surface. For example, the state p1 is a state in which a line including the vertex A of the first component is in contact with a surface including the line aa of the second component.

States s1, s3, s5, s6, s7, s9, s11, and s12 are states in which the first component 200 and the second component 210 are in contact in a point and a line (a second contact form). For example, the state s1 is a state in which the line AB of the first component is in contact with the line aa of the second component.

When viewed three-dimensionally, the first component 200 and the second component 210 are in contact in a surface and a surface. For example, the state s1 is a state in which a surface including the vertex AB of the first component is in contact with a surface including the line aa of the second component.

The states s2, s4, s8, and s10 are states in which the first component 200 and the second component 210 are in contact in points and lines in two places (a third contact form). For example, the state s2 is a state in which the line AB of the first component is in contact with the vertex a of the second component and a line AD of the first component is in contact with a vertex b of the second component. For example, the state s8 is a state in which the line AD of the first component is in contact with the vertex a of the second component and a line CD of the first component is in contact with the vertex b of the second component.

When viewed three-dimensionally, the first component 200 and the second component 210 are in contact in lines and surfaces in two places. For example, the state s2 is a state in which the surface including the line AB of the first component is in contact with a line including the vertex a of the second component and a surface including the line AD of the first component is in contact with a line including the vertex b of the second component.

The meaning of the state transition shown in FIG. 5 is explained.

As explained below, the robot control apparatus 10 discriminates, on the basis of detection values detected by the force sensor 20d, in which of the contact states shown in FIG. 5 the first component 200 and the second component 210 are. The robot control apparatus 10 controls the manipulator unit 20b and the gripping unit 20c on the basis of a result of the discrimination using the transition information shown in FIG. 5 stored in the table storing unit 103. At this point, as shown in FIG. 5, the robot control apparatus 10 brings the first component 200 into contact with the second component 210. Thereafter, the robot control apparatus 10 shifts the first component 200 while maintaining the contact state to fit the first component 200 in the hole 211.

Detection values after discretization by the force sensor stored in the table storing unit 103 are explained.

FIG. 6 is a diagram showing detection values after discretization of the states p1 to p8 detected by the force sensor 20d in the absolute coordinate system and stored in the table storing unit 103 according to this embodiment. FIG. 7 is a diagram showing detection values after discretization of the states s2 to p14 detected by the force sensor 20d in the absolute coordinate system or the object coordinate system and stored in the table storing unit 103. The detection values after discretization stored in the table storing unit 103 shown in FIG. 6 are third detection values. The detection values after discretization stored in the table storing unit 103 shown in FIG. 7 are third detection values or fourth detection values.

As shown in FIG. 6, in the table storing unit 103, the detection values (fx, fy, fz, nx, ny, and nz) detected by the force sensor 20d are discretized for each of contact states of the state p1 to p8 and the detection values after the discretization are stored in association with one another in a table format. For example, as shown in a second row, detection values after the discretization of the state p1 is fx=0, fy=0, fz=1, nx=−1, ny=0, and nz=0.

Similarly, as shown in FIG. 7, in the table storing unit 103, the detection values (fx, fy, fz, nx, ny, and nz) detected by the force sensor 20d are discretized for each of contact states of the state s2 to s4, s6 to s10, s13, and s14 and the detection values after the discretization are stored in association with one another in a table format. For example, as shown in a second row, detection values after the discretization of the state s2 is fx=0, fy=0, fz=1, nx=0, ny=0, and nz=0.

FIG. 8 is a diagram showing detection values of the states p1 to p8 detected by the force sensor 20d in the object coordinate system and stored in the table storing unit 103 according to this embodiment. The detection values after discretization stored in the table storing unit 103 shown in FIG. 8 are fourth detection values.

As shown in FIG. 8, in the table storing unit 103, the detection values (fx, fy, fz, nx, ny, and nz) detected by the force sensor 20d are discretized for each of contact states of the state p1 to p8 and the detection values after the discretization are stored in association with one another in a table format. For example, as shown in a second row, detection values after the discretization of the state p1 are fx=1, fy=1, fz=1, nx=−1, ny=0, and nz=0. The values −1, 0, and +1 in FIGS. 6 to 8 represent directions of forces and moments. That is, in FIGS. 6 to 8, when a sign of a detection value is minus, the detection value represents a force in the opposite direction or a moment in the opposite direction with respect to each axis.

Detection values after discretization of the detection values (fx, fy, fz, nx, ny, and nz) of the states s2 to s4, s6 to s10, s13, and s14 of the object coordinate system detected by the force sensor 20d are the same as the detection values after discretization of the states s1 to p14 in the absolute coordinate system shown in FIG. 7. The detection values after discretization are shown in FIGS. 6 to 8. These values may be grouped and stored in the table storing unit 103 or may be collectively stored in the table storing unit 103 without being grouped.

The command values stored in the table storing unit 103 are explained.

FIG. 9 is a diagram for explaining command values stored in the table storing unit 103 according to this embodiment.

As shown in FIG. 9, in the table storing unit 103, angles ($\theta_x$, $\theta_y$, $\theta_z$) and forces ($f_x$, $f_y$, $f_z$) are stored in association with each other in a table format as command values for controlling the manipulator unit 20b and the gripping unit 20c for each of states transitioned from the present contact states to the next target states. As shown in FIG. 9, command values explained below are stored in the table storing unit 103. The stored command values are command values for transitioning a contact state from states to the next states, i.e., from the state p1 to the state s7, from the state p2 to the state s2, from the state p2 to the state s3, from the state p2 to the state s4, from the state p3 to the state s2, from the state p4 to the state s8, from the state p5 to the state s8, from the state p5 to the state s9, from the state p5 to the state s10, from the state p6 to the state s6, from the state s6 to the state p3, from the state s7 to the state p4, from the state s2 to the state s7, from the state s4 to the state p7, from the state p7 to the state s3, from the state s3 to the state s13, from the state s8 to the state p8, from the state s10 to the state p8, from the state p8 to the state s9, and from the state s9 to the state s14.

In FIG. 9, a sign "→" represents a state transition from the present state to the next state. For example, "p1→s7" in a second row represents a command value for transitioning a state from the state p1 to the state s7.

The values of the angles ($\theta_x$, $\theta_y$, $\theta_z$) and the forces ($f_x$, $f_y$, $f_z$) shown in FIG. 9 represent directions for rotation. In the case of "+", the values are command values for rotation in a positive direction in the axis direction of the rotation to be a next target state. In the case of "−", the values are command values for rotation in a negative direction in the axis direction of the rotation to be a next target state. The values of the angles ($\theta_x$, $\theta_y$, $\theta_z$) and the forces ($f_x$, $f_y$, $f_z$) may be set according to the rigidity and the like of the first component 200 and the second component 210 to be fit in each other.

A processing procedure performed by the robot control apparatus 10 according to this embodiment is explained.

Figure 10:
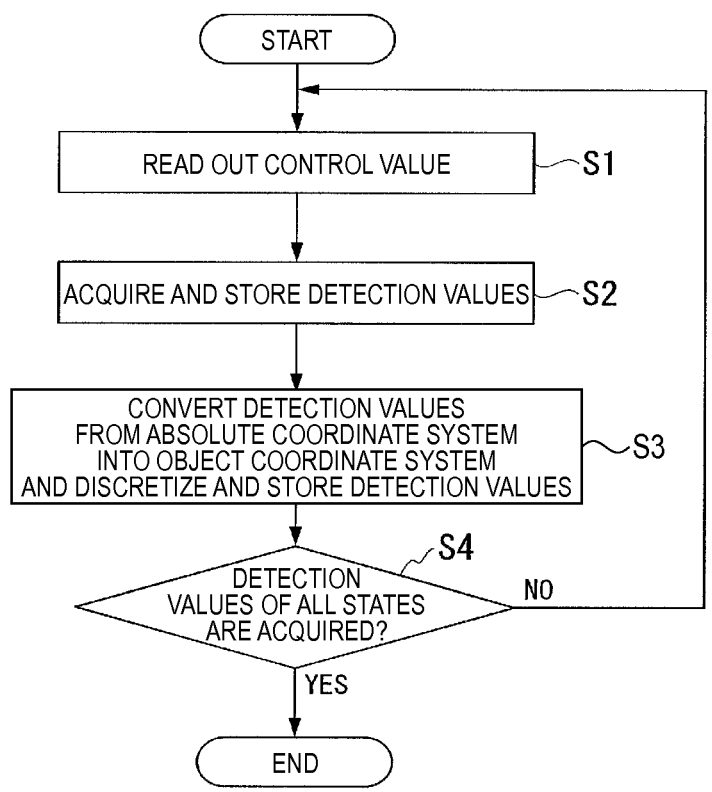
FIG. 10 is a flowchart of a procedure for storing a table in the table storing unit according to the first embodiment.

First, a procedure for storing the tables shown in FIGS. 6 to 8 in the table storing unit 103 is explained. FIG. 10 is a flowchart of the procedure for storing the tables in the table storing unit 103 according to this embodiment.

Step S1

The control unit 105 of the robot control apparatus 10 reads out a control value stored in the control storing unit 106. Subsequently, the control unit 105 controls, on the basis of the read-out control value, the first component 200 and the second component 210 to sequentially change to the contact states of the states p1 to p8 and the states s1 to s14 shown in FIG. 5.

Step S2

The sensor-detection-value acquiring unit 101 acquires detection values detected by the force sensor 20d and causes the table storing unit 103 to store the acquired detection value before discretization as first detection values. The sensor-detection-value acquiring unit 101 outputs the acquired detection value before discretization to the discretizing unit 102.

Step S3

The discretizing unit 102 converts the detection values before discretization output by the sensor-detection-value acquiring unit 101 from the absolute coordinate system into the object coordinate system using Expressions (1) to (5). The discretizing unit 102 discretizes the detection values in the absolute coordinate system and causes the table storing unit 103 to store the detection values after the discretization as third detection values. Subsequently, the discretizing unit 102 discretizes the detection values in the object coordinate system and causes the table storing unit 103 to store the detection values after the discretization as fourth detection values.

Step S4

The control unit 105 discriminates whether detection values of all states set in advance are acquired. When discriminating that the detection values of all the states are acquired (Yes in step S4), the control unit 105 ends the storage processing for the tables. When not discriminating that the detection values of all the states are acquired (No at step S4), the control unit 105 returns to step S1 and repeats steps S1 to S4 concerning unprocessed states.

Figure 11:
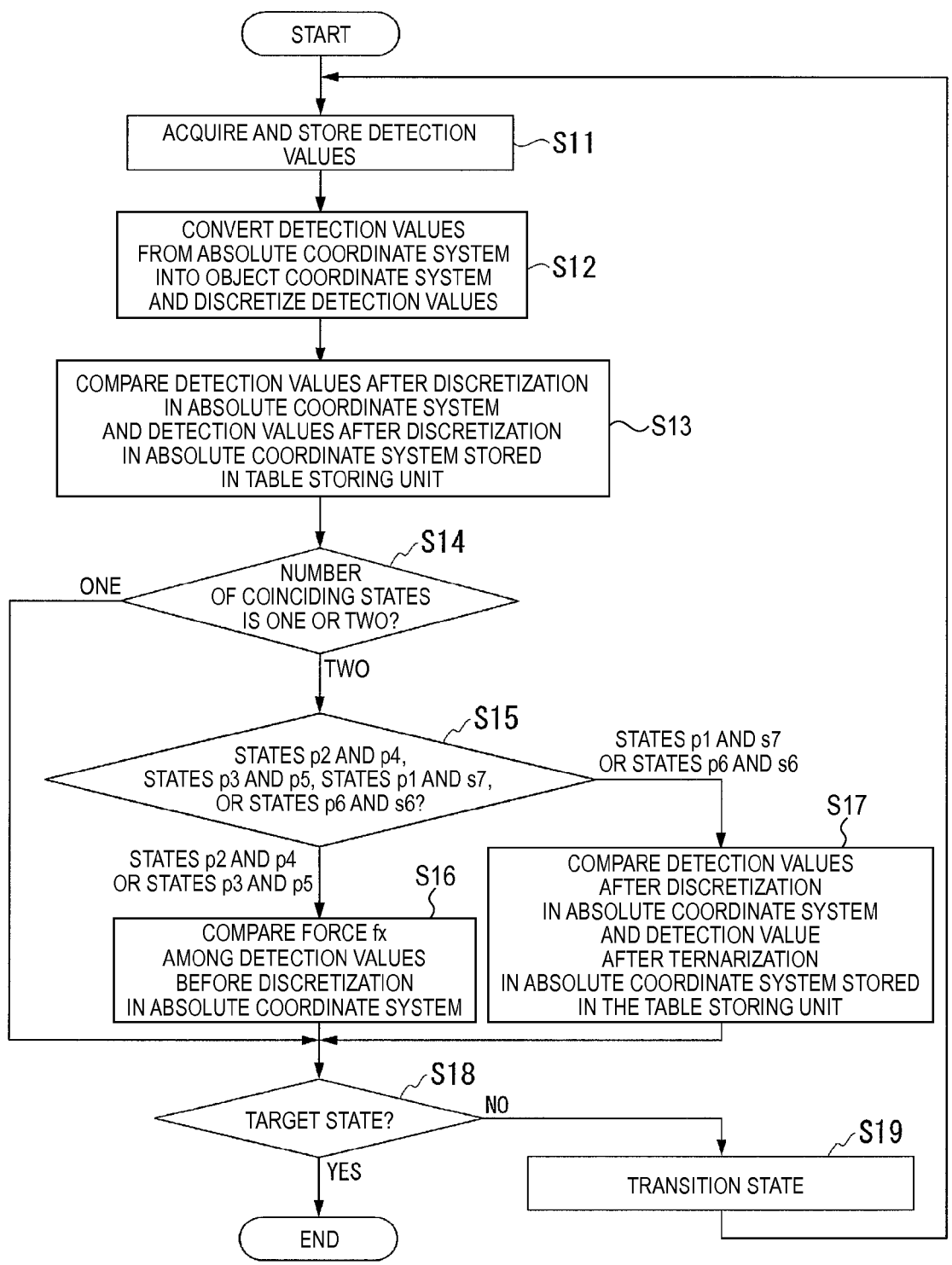
FIG. 11 is a flowchart of a procedure for discriminating a contact state of a first component and a second component and transitioning the contact state of the first component and the second component according to the first embodiment.

A procedure in which the robot control apparatus 10 discriminates the states p1 to p8 and the states s1 to s14 shown in FIG. 5 and transitions a state is explained. FIG. 11 is a flowchart of a procedure for discriminating a contact state of the first component 200 and the second component 210 and transitioning the contact state of the first component 200 and the second component 210 according to this embodiment.

Step S11

The sensor-detection-value acquiring unit 101 acquires detection values before discretization detected by the force sensor 20d and outputs the acquired detection values before discretization to the discretizing unit 102.

Step S12

The discretizing unit 102 converts the detection values before discretization output by the sensor-detection-value acquiring unit 101 from the absolute coordinate system into the object coordinate system using Expressions (1) to (5). Subsequently, the discretizing unit 102 discretizes each of the detection values before discretization in the absolute coordinate system and the detection values before discretization in the object coordinate system. The discretizing unit 102 outputs the detection values before discretization in the absolute coordinate system, the detection values before discretization in the object coordinate system, the detection values after the discretization in the absolute coordinate system, and the detection values after the discretization in the object coordinate system to the selecting unit 104.

Step S13

The selecting unit 104 compares the detection values after the discretization in the absolute coordinate system output by the discretizing unit 102 and the third detection values stored in the table storing unit 103 and discriminates a contact state of the first component 200 and the second component 210 on the basis of a result of the comparison.

Step S14

The selecting unit 104 discriminates whether the number of states coinciding with the detection values after the discretization is one or two among the contact states stored in the table storing unit 103. When discriminating that the number of states coinciding with the detection values after the discretization is one (one in step S14), the selecting unit 104 outputs transition information to the control unit 105 on the basis of a result of the discrimination in step S13 and proceeds to step S18. When discriminating that the number of states coinciding with the detection values after the discretization is two (two in step S14), the selecting unit 104 proceeds to step S15. The two states coinciding with the detection values after the discretization are, as shown in FIG. 6, the states p2 and p4, the states p3 and p5, the states p1 and s7, and the states p6 and s6.

Step S15

When discriminating that the number of states coinciding with the detection values after the discretization is two, the selecting unit 104 discriminates whether the two states are the states p2 and p4, the states p3 and p5, the states p1 and s7, or the states p6 and s6. When discriminating that the two states are the states p2 and p4 or the states p3 and p5 (states p2 and p4 or states p3 and p5 in step S15), the selecting unit 104 proceeds to step S16. When discriminating that the two states are the states p1 and s7 or the states p6 and s6 (states p1 and s7 or states p6 and s6 in step S15), the selecting unit 104 proceeds to step S17.

Step S16

When discriminating that the two states are the states p2 and p4 or the states p3 and p5, the selecting unit 104 compares values of the forces fx and fz included in the detection values before discretization and values of the forces fx and fz included in the first detection values stored in the table storing unit 103. Subsequently, the selecting unit 104 discriminates, on the basis of a result of the comparison, whether the contact state of the first component 200 and the second component 210 is the state p2 or the state p4 or the state p3 or the state p5. The selecting unit 104 outputs transition information to the control unit 105 on the basis of a result of the discrimination.

Step S17

When discriminating that the two states are the states p1 and s7 or the states p6 and s6, the selecting unit 104 compares the detection values after the discretization of the object coordinate system and the fourth detection values of the object coordinate system stored in the table storing unit 103 shown in FIGS. 7 and 8.

Specifically, when discriminating that the two states are the states p1 and s7, the selecting unit 104 compares the force fx among the detection values after the discretization of the object coordinate system with the fourth detection value. When the force fx is 1, the selecting unit 104 discriminates that the contact state is the state p1. When the force fx is 0, the selecting unit 104 discriminates that the contact state is the state s7. The selecting unit 104 may compare the force fy with the fourth detection value. In this case, when the force fy is 1, the selecting unit 104 discriminates that the contact state is the state p1. When the force fy is 0, the selecting unit 104 discriminates that the contact state is the state s7.

When discriminating that the two states are the states p6 and s6, the selecting unit 104 compares the force fx among the detection values after the discretization of the object coordinate system with the fourth detection value. When the force fx is 1, the selecting unit 104 discriminates that the contact state is the state p6. When the force fx is 0, the selecting unit 104 discriminates that the contact state is the state s6. The selecting unit 104 may compare the force fy with the fourth detection value. In this case, when the force fy is −1, the selecting unit 104 discriminates that the contact state is the state p6. When the force fy is 0, the selecting unit 104 discriminates that the contact state is the state s7.

Subsequently, the selecting unit 10 outputs transition information to the control unit 105 on the basis of a result of the discrimination.

Step S18

The control unit 105 discriminates, on the basis of the transition information output by the selecting unit 104, whether the contact state of the first component 200 and the second component 210 is a target state (a final target state). The final target state is the state s13 or the state s14 shown in FIG. 5. When discriminating that the contact state of the first component 200 and the second component 210 is not the target state (No in step S18), the control unit 105 proceeds to step S19. When discriminating that the contact state of the first component 200 and the second component 210 is the target state (Yes in step S18), the control unit 105 ends the processing for transitioning the contact state of the first component 200 and the second component 210.

Step S19

The control unit 105 selects, on the basis of the transition information output by the selecting unit 104, a command value stored in the table storing unit 103. For example, when the transition information is information indicating the transition from the state p1 to the state s7, the control unit 105 selects a command value for the transition from the state p1 to the state s7. The control unit 105 controls the manipulator unit 20b and the gripping unit 20c on the basis of the selected command value. After ending the step S19, the control unit 105 returns to step S11.

The robot control apparatus 10 may discriminate, on the basis of image data picked up by the image pickup apparatus 30, that the contact state is the state s1, s5, s11, or s12 among the states shown in FIG. 5. When discriminating that the contact state is the state s1, s5, s11, or s12, for example, the robot control apparatus 10 may grip the first component 200 again and repeat the fitting of the first component 200 and the second component 210 in steps S1 to S19 from any one state among the initial postures k1 to k6.

An example of control performed by the robot control apparatus 10 is explained.

In FIG. 5, the robot control apparatus 10 performs control to lower the first component 200 from the initial posture k1 in the z-axis direction in the negative direction of the absolute coordinate system until the first component 200 changes to the state p1. After discriminating that the contact state of the first component 200 and the second component 210 is the state p1, the robot control apparatus 10 controls the contact state of the first component 200 and the second component 210 to be the state s7. After discriminating that the contact state of the first component 200 and the second component 210 is the state s7, the robot control apparatus 10 controls the contact state of the first component 200 and the second component 210 to be the state p4. After discriminating that the contact state of the first component 200 and the second component 210 is the state p4, the robot control apparatus 10 controls the contact state of the first component 200 and the second component 210 to be the state s8. After discriminating that the contact state of the first component 200 and the second component 210 is the state s8, the robot control apparatus 10 controls the contact state of the first component 200 and the second component 210 to be the state s9. After discriminating that the contact state of the first component 200 and the second component 210 is the state s9, the robot control apparatus 10 controls the contact state of the first component 200 and the second component 210 to be the state s14.

The robot control apparatus 10 performs the fitting in a state in which a side CD of the first component 200 is set in contact with a side bd of the hole 211, i.e., while keeping the side CD of the first component 200 pressed against the side bd of the hole 211.

As explained above, the robot apparatus 1 according to this embodiment discriminates the contact state of the first component 200 and the second component 210 on the basis of the detection values detected by the force sensor 20d included in the robot apparatus 1. Then, the robot apparatus 1 according to this embodiment selects, according to the discriminated state, the transition information stored in the table storing unit 103 and controls the next target state of the first component 200 and the second component 210. As a result, according to this embodiment, it is possible to fit in the first component 200 and the second component 210 each other even if the hole 211 of the second component 210 is not chamfered.

Further, the robot apparatus 1 according to this embodiment discriminates the contact state of the first component 200 and the second component 210 in the absolute coordinate system on the basis of the detection values after the discretization. Therefore, it is possible to reduce a computation amount for the contact state of the first component 200 and the second component 210. When a plurality of states same as the detection values are stored in the storing unit, the robot apparatus 1 according to this embodiment discriminates the states on the basis of the detection values before discretization in the absolute coordinate system, the detection values after the discretization in the absolute coordinate system, and the detection values after the discretization in the object coordinate system. Therefore, it is possible to appropriately discriminate the contact state of the first component 200 and the second component 210.

In the example explained in this embodiment, when a plurality of contact states coinciding with the detection values are stored in the storing unit 103, the discretizing unit 102 converts the detection values from the absolute coordinate system into the object coordinate system, discretizes the respective detection values of the absolute coordinate system and the object coordinate system, and outputs the detection values to the selecting unit 104. However, the conversion and the discretization of the detection values are not limited to this. When discriminating that the coinciding two states are the states p1 and s7 or the states p6 and s6 as a result of the comparison in step S15, the selecting unit 104 may convert the detection values from the absolute coordinate system into the object coordinate system and discretizes the converted detection values. Consequently, it is possible to reduce the computation amount. In this case, as in the example explained above, the discretizing unit 102 may perform the conversion from the absolute coordinate system into the object coordinate system and the discretization.

Second Embodiment

In the first embodiment, the example in which the first component 200 and the second component 210 in the initial postures k1 to k6 shown in FIG. 5 are fit in each other is explained. In a second embodiment, an example in which the first component 200 and the second component 210 are fit in each other from a state in which the first component 200 and the second component 210 are positioned in the x direction in the absolute coordinate system shown in FIG. 4.

A robot apparatus according to this embodiment changes a contact state of the first component and the second component to a first contact state, changes the contact state to a second contact state after the first contact state, and changes the contact state to a third contact state after the second state to fit in the first component and the second component each other. Further, in the third contact state, the robot apparatus according to this embodiment sequentially transitions the first component to be attached to (fit in) a hole of the second component along a surface of the first component in contact with the hole of the second component.

The contact state of the first component 200 and the second component 210 is a form of the first component 200 and the second component 210. The contact state is a state including a state in which the first component 200 and the second component 210 are in point contact with each other (a first contact state), a state in which the first component 200 and the second component 210 are in line contact with each other (a second contact state), a state in which the first component 200 and the second component 210 are in surface contact with each other (a third contact state), and a state in which the first component 200 is put in the hole 211. In this embodiment, the first contact state is, for example, a state in which a side of the first component 200 and a ridge line of the hole 211 are in contact at one point. The second contact state is, for example, a state in which the surface of the first component 200 and the ridge line of the hole 211 are in contact. The third contact state is, for example, a state in which the surface of the first component 200 and the surface of the hole 211 are in contact.

The configuration of the robot apparatus 1 is the same as the configuration shown in FIG. 1 in the first embodiment. The configuration of the robot control apparatus 10 is the same as the configuration shown in FIG. 3 in the first embodiment. The robot control apparatus 10 may discriminate, for example, on the basis of image data picked up by the image pickup apparatus 30, a state in which the first component 200 and the second component 210 are positioned in the x direction.

Figure 12:
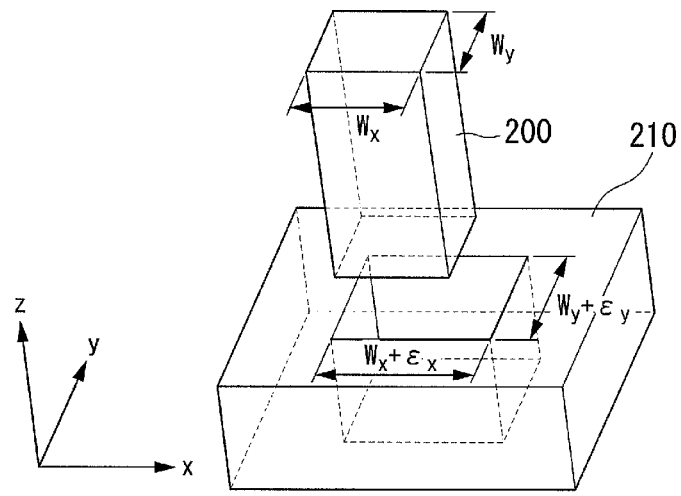
FIG. 12 is a diagram for explaining dimensions of a first component and dimensions of a hole of a second component on an xy plane according to a second embodiment.
Figure 13:
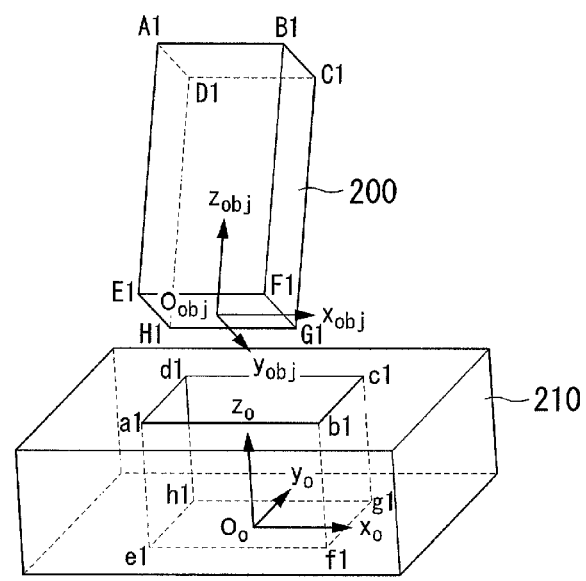
FIG. 13 is a diagram for explaining an absolute coordinate system, an object coordinate system, and vertexes in the first component and the second component according to the second embodiment.

FIG. 12 is a diagram for explaining the dimensions of the first component 200 on an xy plane and the dimensions of the hole 211 of the second component 210 according to this embodiment. FIG. 13 is a diagram for explaining vertexes of an absolute coordinate system and an object coordinate system in the first component 200 and the second component 210 according to this embodiment. In FIG. 12, the left right direction is set as an x-axis direction, the depth direction is set as a y-axis direction, and the vertical direction is set as a z-axis direction.

As shown in FIG. 12, the length in the x-axis direction of the first component 200 is $W_x$, the length in the y-axis direction of the first component 200 is $W_y$, the length in the x-axis direction of the hole 211 of the second component 210 is $W_x+\epsilon_x$, and the length in the y-axis direction of the hole 211 is $W_y+\epsilon_y$. That is, the hole diameter of the second component 210 is larger than the dimensions of the first component 200 by $\epsilon_x$ in the x-axis direction and $\epsilon_y$ in the y-axis direction.

As shown in FIG. 13, the center of a rear surface e1f1g1h1 of the hole 211 of the second component 210 is set as an origin $O_o$ of the absolute coordinate system. The x-axis direction is represented by $x_o$ the y-axis direction is represented by $y_o$, and the z-axis direction is represented by $z_o$. In the hole 211 of the second component 210, vertexes on the rear surface side including the origin $O_o$ are respectively represented by e1, f1, g1, and h1. In the hole 211 of the second component 210, vertexes on the front surface side not including the origin $O_o$ are respectively represented by a1, b1, c1, and d1.

As shown in FIG. 13, the center of the rear surface E1F1H1G1 of the first component 200 is set as an origin $O_{obj}$ of the object coordinate system. The x-axis direction is represented by $x_{obj}$, the y-axis direction is represented by $y_{obj}$, and the z-axis direction is represented by $z_{obj}$. In the first component 200, vertexes on the rear surface side including the origin $O_{obj}$ are respectively represented by E1, F1, G1, and H1. In the first component 200, vertexes on the front surface side not including the origin $O_{obj}$ are respectively represented by A1, B1, C1, and D1.

Preconditions in this embodiment are as explained below.

1. A range of an angle representing an error of a posture of the object coordinate system viewed from the absolute coordinate system is −45 [deg] to +45 [deg] or less.

2. A relation between positions $^o x_{obj}$ and $^o y_{obj}$ of the origin of the object coordinate system and the origin of the absolute coordinate system is an error range represented by Expression (6) below.

$$\left.\begin{array}{l}-\varepsilon_x < {}^o x_{obj} < \varepsilon_x \\ -(W_y + \varepsilon_y) < {}^o y_{obj} < W_y + \varepsilon_y\end{array}\right\} \quad (6)$$

3. As point contact, only ridges and ridge contact are taken into account.

4. Transition to a state clearly away from target position and posture is not taken into account.

5. A compliance (an inverse of rigidity) center is present at the origin of the object coordinate system.

6. In the hole 211 of the second component 210, only contact of a ridge line a1b1 or c1d1 and the first component 200 is taken into account. This is because the contact of the ridge line b1c1 or a1d1 and the first component 200 is the same control if a coordinate system is changed.

Transition information and detection values and command values of the force sensor 20*d* stored in the table storing unit 103 are explained.

First, the transition information stored in the table storing unit 103 is explained.

Figure 14:
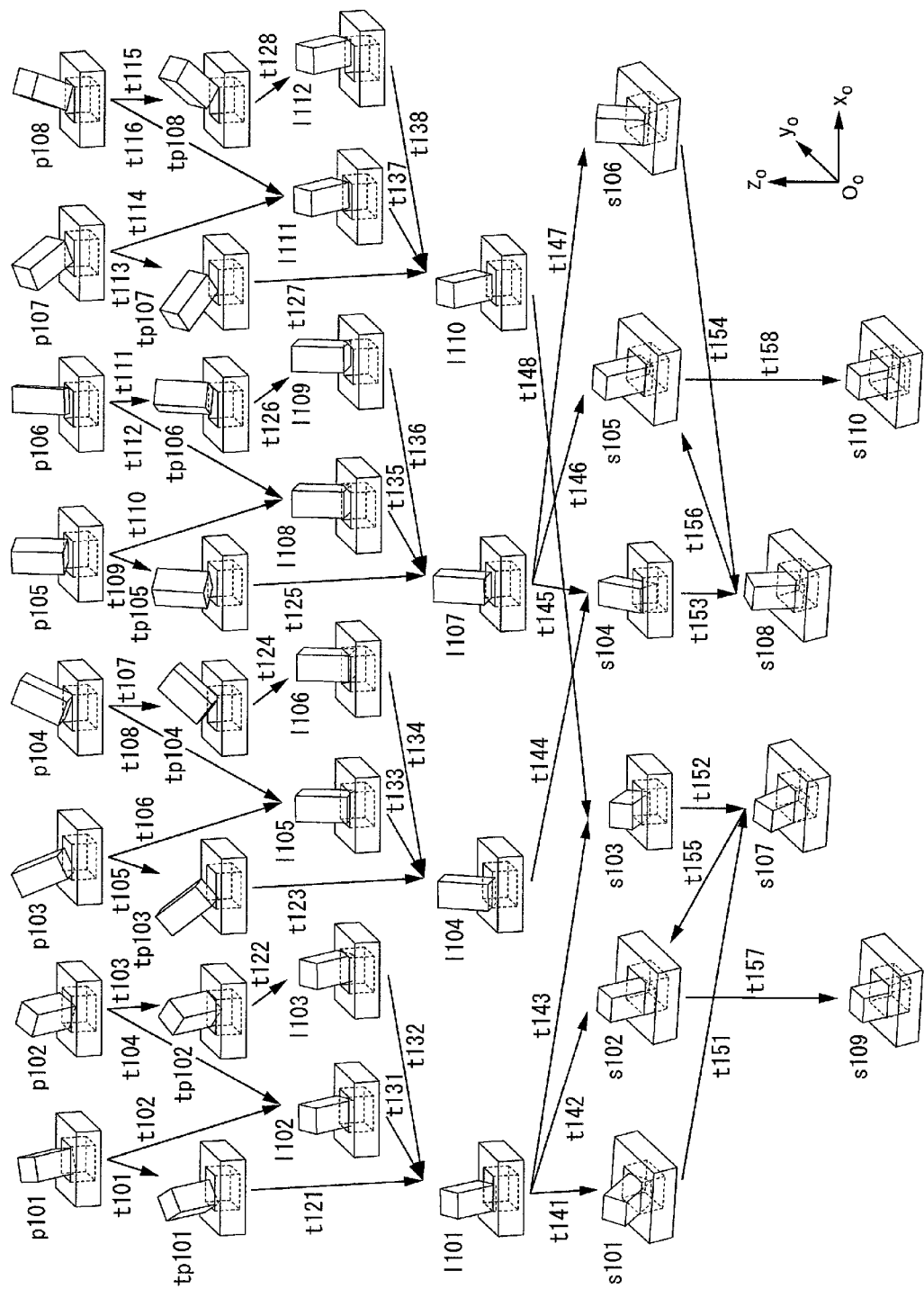
FIG. 14 is a state transition diagram based on transition information stored in a table storing unit according to the second embodiment.

FIG. 14 is a state transition diagram based on the transition information stored in the table storing unit 103 according to this embodiment.

As shown in FIG. 14, in the table storing unit 103, contact states and transition information of the first component 200 and the second component 210 are stored in association with each other for each of contact forms. In FIG. 14, arrows t101 to t116, t121 to t128, t131 to t138, t141 to t148, and t151 to t158 represent that the contact states are directly transitioned to the next target states.

In an example shown in FIG. 14, the transition information stored in the table storing unit 103 is as explained below. As indicated by arrows t101 and t102, the next target state of the state p101 is the state tp101 or 1102. As indicated by arrows t103 and t104, the next target state of the state p102 is the state tp102 or 1102. As indicated by arrows t105 and t106, the next target state of the state p103 is the state tp103 or 1105. As indicated by arrows t107 and t108, the next target state of the state p104 is the state tp104 or 1105. As indicated by arrows t109 and t110, the next target state of the state p105 is the state tp105 or 1108. As indicated by arrows t111 and t112, the next target state of the state p106 is the state tp106 or 1108. As indicated by arrows t113 and t114, the next target state of the state p107 is the state tp107 or 1111. As indicated by arrows t115 and t116, the next target state of the state p108 is the state tp108 or 1111.

As indicated by arrow t121, the next target state of the state tp101 is the state 1101. As indicated by arrow t122, the next target state of the state tp102 is the state 1103. As indicated by arrow t123, the next target state of the state tp103 is the state 1104. As indicated by arrow t124, the next target state of the state tp104 is the state 1106. As indicated by arrow t125, the next target state of the state tp105 is the state 1107. As indicated by arrow t126, the next target state of the state tp106 is the state 1109. As indicated by arrow t127, the next target state of the state tp107 is the state 1110. As indicated by arrow t128, the next target state of the state tp108 is the state 1112.

As indicated by arrows t131 and t132, the next target state of the states 1102 and 1103 is the state 1101. As indicated by arrows t133 and t134, the next target state of the states 1105 and 1106 is the state 1104. As indicated by arrows t135 and t136, the next target state of the states 1108 and 1109 is the state 1107. As indicated by arrows t137 and t138, the next target state of the states 1111 and 1112 is the state 1110.

Arrows t121 to t128 and t131 to t138 indicate transition states controlled by the robot control apparatus 10 to push the first component 200 into the hole 211 of the second component 210.

As indicated by arrows t141 to t143, the next target state of the state 1101 is any one of the states s101, s102, and s103. As indicated by arrow t144, the next target state of the state 1104 is the state s104. As indicated by arrows t145 to t147, the next target state of the state 1107 is any one of the states s104, s105, and s106. As indicated by arrow t148, the next target state of the state 1110 is the state s103.

As indicated by arrow t151, the next target state of the state s101 is the state s107. As indicated by arrow t152, the next target state of the state s103 is the state s107. As indicated by arrow t153, the next target state of the state s104 is the state s108. As indicated by arrow t154, the next target state of the state s106 is the state s108. As indicated by arrow t155, the next target state of the state s107 is the state s102. As indicated by arrow t156, the next target state of the state s108 is the state s105. As indicated by arrow t157, the next target state of the state s102 is the state s109. As indicated by arrow t158, the next target state of the state s105 is the state s110.

In the state p101, a side A1E1 of the first component 200 and the ridge line a1b1 of the hole 211 are in point contact with each other at one point. In the state p102, a side B1F1 of the first component 200 and the ridge line a1b1 of the hole 211 are in point contact with each other at one point. In the state p103, a side E1H1 of the first component 200 and the ridge line a1b1 of the hole 211 are in point contact with each other at one point. In the state p104, a side F1G1 of the first component 200 and the ridge line a1b1 of the hole 211 are in point contact with each other at one point. In the state p105, a side D1H1 of the first component 200 and the ridge line c1d1 of the hole 211 are in point contact with each other at one point. In the state p106, a side C1G1 of the first component 200 and the ridge line c1d1 of the hole 211 are in point contact with each other at one point. In the state p107, a side E1H1 of the first component 200 and the ridge line c1d1 of the hole 211 are in point contact with each other at one point. In the state p108, a side F1G1 of the first component 200 and the ridge line c1d1 of the hole 211 are in point contact with each other at one point.

In the state tp101, the first component 200 and the hole 211 are in contact with each other at two points where the side A1E1 of the first component 200 and the ridge line a1b1 of the hole 211 are in contact and the side E1H1 of the first component 200 and the ridge line a1d1 of the hole 211 are in contact. In the state tp102, the first component 200 and the hole 211 are in contact with each other at two points where the side B1F1 of the first component 200 and the ridge line a1b1 of the hole 211 are in contact and the side F1G1 of the first component 200 and the ridge line b1c1 of the hole 211 are in contact. In the state tp103, the first component 200 and the hole 211 are in contact with each other at two points where the side E1H1 of the first component 200 and the ridge line a1b1 of the hole 211 are in contact and the side D1H1 of the first component 200 and the ridge line a1d1 of the hole 211 are in contact. In the state tp104, the first component 200 and the hole 211 are in contact with each other at two points where the side F1G1 of the first component 200 and the ridge line a1b1 of the hole 211 are in contact and the side C1G1 of the first component 200 and the ridge line b1c1 of the hole 211 are in contact. In the state tp105, the first component 200 and the hole 211 are in contact with each other at two points where the side D1H1 of the first component 200 and the ridge line c1d1 of the hole 211 are in contact and the side E1H1 of the first component 200 and the ridge line a1d1 of the hole 211 are in contact. In the state tp106, the first component 200 and the hole 211 are in contact with each other at two points where the side C1G1 of the first component 200 and the ridge line c1d1 of the hole 211 are in contact and the side F1G1 of the first component 200 and the ridge line b1c1 of the hole 211 are in contact. In the state tp107, the first component 200 and the hole 211 are in contact with each other at two points where the side E1H1 of the first component 200 and the ridge line c1d1 of the hole 211 are in contact and the side A1E1 of the first component 200 and the ridge line a1d1 of the hole 211 are in contact. In the state tp108, the first component 200 and the hole 211 are in contact with each other at two points where the side G1F1 of the first component 200 and the ridge line c1d1 of the hole 211 are in contact and the side B1F1 of the first component 200 and the ridge line b1c1 of the hole 211 are in contact.

In the state 1101, a surface A1B1F1E1 of the first component 200 and the ridge line a1b1 of the hole 211 are in line contact with each other and a surface A1D1H1E1 of the first component 200 and a surface a1d1h1e1 of the hole 211 are in surface contact with each other. In the state 1102, the surface A1B1F1E1 of the first component 200 and the ridge line a1b1 of the hole 211 are in line contact with each other. In the state 1103, the surface A1B1F1E1 of the first component 200 and the ridge line a1b1 of the hole 211 are in line contact with each other and a surface B1C1G1F1 of the first component 200 and a surface b1c1g1f1 of the hole 211 are in surface contact with each other. In the state 1104, a surface E1F1G1H1 of the first component 200 and the ridge line a1b1 of the hole 211 are in line contact with each other and the surface A1D1H1E1 of the first component 200 and the surface a1d1h1e1 of the hole 211 are in surface contact with each other. In the state 1105, a surface E1B1G1H1 of the first component 200 and the ridge line a1b1 of the hole 211 are in line contact with each other. In the state 1106, the surface E1F1G1H1 of the first component 200 and the ridge line a1b1 of the hole 211 are in line contact with each other and the surface B1C1G1F1 of the first component 200 and the surface b1c1g1f1 of the hole 211 are in surface contact with each other. In the state 1107, a surface C1D1H1G1 of the first component 200 and the ridge line c1d1 of the hole 211 are in line contact with each other and the surface A1D1H1E1 of the first component 200 and the surface a1d1h1e1 of the hole 211 are in surface contact with each other. In the state 1108, the surface C1D1H1G1 of the first component 200 and the ridge line c1d1 of the hole 211 are in line contact with each other. In the state 1109, the surface C1D1H1G1 of the first component 200 and the ridge line c1d1 of the hole 211 are in line contact with each other and the surface B1C1G1F1 of the first component 200 and the surface b1c1g1f1 of the hole 211 are in surface contact with each other. In the state 1110, the surface E1F1G1H1 of the first component 200 and the ridge line c1d1 of the hole 211 are in line contact with each other and the surface A1D1H1E1 of the first component 200 and the surface a1d1h1e1 of the hole 211 are in surface contact with each other. In the state 1111, the surface E1F1G1H1 of the first component 200 and the ridge line c1d1 of the hole 211 are in line contact with each other. In the state 1112, the surface E1F1G1H1 of the first component 200 and the ridge line c1d1 of the hole 211 are in line contact with each other and the surface B1C1G1F1 of the first component 200 and the surface b1c1g1f1 of the hole 211 are in surface contact with each other.

In the state s101, the surface A1B1F1E1 of the first component 200 and the ridge line a1b1 of the hole 211 are in line contact with each other and the surface A1D1H1E1 of the first component 200 and the surface a1d1h1e1 of the hole 211 are in surface contact with each other. In the state s102, the surface A1B1F1E1 of the first component 200 and the surface a1b1f1g1 of the hole 211 are in surface contact with each other and the surface A1D1H1E1 of the first component 200 and the surface a1d1h1e1 of the hole 211 are in surface contact with each other. In the state s103, the surface A1B1F1E1 of the first component 200 and the ridge line a1d1 of the hole 211 are in line contact with each other, the surface E1F1G1H1 of the first component 200 and the ridge line c1d1 of the hole 211 are in line contact with each other, and the surface A1D1H1E1 of the first component 200 and the surface a1d1h1e1 of the hole 211 are in surface contact with each other. In the state s104, the surface C1D1H1G1 of the first component 200 and the ridge line c1d1 of the hole 211 are in line contact with each other, the surface E1F1G1H1 of the first component 200 and the ridge line a1b1 of the hole 211 are in line contact with each other, and the surface A1D1H1E1 of the first component 200 and the surface a1d1h1e1 of the hole 211 are in surface contact with each other. In the state s105, the surface A1B1F1E1 of the first component 200 and the surface a1b1f1g1 of the hole 211 are in surface contact with each other and the surface B1C1G1F1 of the first component 200 and the surface b1c1g1f1 of the hole 211 are in surface contact with each other. In the state s106, the surface C1D1H1G1 of the first component 200 and the ridge line c1d1 of the hole 211 are in line contact with each other and the surface A1D1H1E1 of the first component 200 and the surface a1d1h1e1 of the hole 211 are in surface contact with each other. In the state s107, the surface A1B1F1E1 of the first component 200 and the ridge line a1b1 of the hole 211 are in line contact with each other and the surface A1D1H1E1 of the first component 200 and the surface a1d1h1e1 of the hole 211 are in surface contact with each other. In the state s108, the surface C1D1H1G1 of the first component 200 and the ridge line c1d1 of the hole 211 are in line contact with each other and the surface A1D1H1E1 of the first component 200 and the surface a1d1h1e1 of the hole 211 are in surface contact with each other. In the state s109, the surface A1B1F1E1 of the first component 200 and the surface a1b1f1g1 of the hole 211 are in surface contact with each other, the surface A1D1H1E1 of the first component 200 and the surface a1d1h1e1 of the hole 211 are in surface contact with each other, and the surface E1F1G1H1 of the first component 200 and the surface e1f1g1h1 of the hole 211 are in surface contact with each other. In the state s110, the surface A1B1F1E1 of the first component 200 and the surface a1b1f1g1 of the hole 211 are in surface contact with each other, the surface B1C1G1F1 of the first component 200 and the surface b1c1g1f1 of the hole 211 are in surface contact with each other, and the surface E1F1G1H1 of the first component 200 and the surface e1f1g1h1 of the hole 211 are in surface contact with each other.

The detection values after discretization detected by the force sensor and stored in the table storing unit 103 are explained.

FIG. 15 is a diagram showing detection values after discretization of the states p101 to p108 detected by the force sensor 20d and stored in the table storing unit 103 according to this embodiment. FIG. 16 is a diagram showing detection values after discretization of the states tp101 to tp108 detected by the force sensor 20d in the absolute coordinate system and stored in the table storing unit 103 according to this embodiment. FIG. 17 is a diagram showing detection values after discretization of the states 1101 to 1112 detected by the force sensor 20d in the absolute coordinate system and stored in the table storing unit 103 according to this embodiment. FIG. 18 is a diagram showing detection values after discretization of the states s101 to s110 detected by the force sensor 20d in the absolute coordinate system and stored in the table storing unit 103 according to this embodiment.

The command values for transitioning contact states to the next target states stored in the table storing unit 103 are explained.

As shown in FIG. 15, in the table storing unit 103, forces ($^{o}f_x$, $^{o}f_y$, $^{o}f_z$) in the absolute coordinate system and moments ($^{obj}nx$, $^{obj}ny$, $^{obj}nz$) in the object coordinate system of the states p101 to p108 are stored in association with each other. For example, as shown in a second row, detection values after discretization of the state p101 are $^{o}fx=0$, $^{o}fy=1$, $^{o}fz=1$, $^{obj}nx=-1$, $^{obj}ny=0$, and $^{obj}nz=-1$.

Combinations of discretized detection values in the absolute coordinate system and discretized detection values in the object coordinate system are referred to as second detection values in this embodiment.

In the table storing unit 103, the forces ($^{o}f_x$, $^{o}f_y$, $^{o}f_z$) and moments ($^{o}nx$, $^{o}ny$, $^{o}nz$) in the absolute coordinate system may be stored in association with each other and forces ($^{obj}f_x$, $^{obj}f_y$, $^{obj}f_z$) and the moments ($^{obj}nx$, $^{obj}ny$, $^{obj}nz$) in the object coordinate system may be stored in association with each other. In this case, the selecting unit 104 may read out the force ($^{o}f_x$, $^{o}f_y$, $^{o}f_z$) in the absolute coordinate system and the moment ($^{obj}nx$, $^{obj}ny$, $^{obj}nz$) in the object coordinate system stored in the table storing unit 103 and discriminate a contact state of the first component 200 and the second component 210 on the basis of a result of the readout.

As shown in FIG. 16, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states tp101 to tp108 are stored in association with each other. For example, as shown in a second row, detection values after discretization of the state tp101 are $^{o}fx=1$, $^{o}fy=1$, $^{o}fz=1$, $^{o}nx=-1$, $^{o}ny=1$, and $^{o}nz=0$.

As shown in FIG. 17, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states 1101 to 1112 are stored in association with each other. For example, as shown in a second row, detection values after discretization of the state 1101 are $^{o}fx=1$, $^{o}fy=1$, $^{o}fz=1$, $^{o}nx=-1$, $^{o}ny=0$, and $^{o}nz=0$.

As shown in FIG. 18, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states s101 to s110 are stored in association with each other. For example, as shown in a second row, detection values after discretization of the state s101 are $^{o}fx=1$, $^{o}fy=0$, $^{o}fz=1$, $^{o}nx=-1$, $^{o}ny=0$, and $^{o}nz=0$.

The detection values after ternarization are shown in FIGS. 15 to 18. These values may be grouped and stored in the table storing unit 103 or may be collectively stored in the table storing unit 103 without being grouped.

The command values for state transitions from states stored in the table storing unit 103 are explained.

FIG. 19 is a diagram for explaining command values for each of state transitions from the states p101 to p108 stored in the table storing unit 103 according to this embodiment. FIG. 20 is a diagram for explaining command values for each of state transitions from the states tp101 to tp108 stored in the table storing unit 103 according to this embodiment. FIG. 21 is a diagram for explaining command values for each of state transitions from the states 1102, 1103, 1105, 1106, 1108, 1109, 1111, and 1112 stored in the table storing unit 103 according to this embodiment. FIG. 22 is a diagram for explaining command values for each of state transitions from the states 1101, 1104, 1107, and 1110 stored in the table storing unit 103 according to this embodiment. FIG. 23 is a diagram for explaining command values for each of state transitions from states s101, s102, s103, s104, s105, s106, s107, s108, and s109 stored in the table storing unit 103 according to this embodiment.

As shown in FIGS. 19 to 23, in the table storing unit 103, angles ($\theta_x$, $\theta_y$, $\theta_z$) and forces ($f_x$, $f_y$, $f_z$), which are command values to the manipulator unit 20b and the gripping unit 20c, are stored in a table format in association with each other for each of states to which the present states are transitioned next. In FIGS. 19 to 23, positive values are command values for controlling the present states to be target states by moving the present states in the positive direction in the axes and negative values are command values for controlling the present states to be target states by moving the present states in the negative direction in the axes. In examples shown in FIGS. 19 to 23, as angles, values −45 [deg], −20 [deg], 0 [deg], +20 [deg], and +45 [deg] are shown. However, the values are examples. Similarly, as forces, values −1 [N (Newton)], 0 [N], and +1 [N] are shown. The values are also examples. The angles and the forces may be set according to the rigidity and the like of the first component 200 and the second component 210.

In FIGS. 19 to 23, a sign "→" represents state transitions from the present contact states to the next target states.

As shown in FIG. 19, command values explained below are stored in the table storing unit 103. Command values of state transitions from the state p101 to the state tp101 or 1102, from the state p102 to the state tp102 or 1102, from the state p103 to the state tp103 or 1105, from the state p104 to the state tp104 or 1105, from the state p105 to state tp105 or 1108, from the state p106 to the state 1108, from the state p107 to the state tp107 or 1111, and from the state p108 to the state tp108 or tp111 are stored. For example, as shown in a second row, command values ($\theta_x$, $\theta_y$, $\theta_z$, $f_x$, $f_y$, $f_z$) for the state transition from the state p101 to the state tp101 are (0 [deg], 0 [deg], 45 [deg], 0 [N], 0 [N], 0 [N]).

As shown in FIG. 20, in the table storing unit 103, command values for state transitions from the state tp101 to the state 1101, from the state tp102 to the state 1103, from the state tp103 to the state 1104, from the state tp104 to the state 1106, from the state tp105 to the state 1107, from the state tp106 to the state 1109, from the state tp107 to the state 1110, and from the state tp108 to the state 1112 are stored.

For example, as shown in a second row, the command values ($\theta_x$, $\theta_y$, $\theta_z$, $f_x$, $f_y$, $f_z$) for the state transition from the state tp101 to the state 1101 are (0 [deg], 0 [deg], −45 [deg], −1 [N], 0 [N], 0 [N]).

As shown in FIG. 21, in the table storing unit 103, command values for state transitions from the state 1102 to the state 1101, from the state 1103 to the state 1101, from the state 1105 to the state 1104, from the state 1106 to the state 1104, from the state 1108 to the state 1107, from the state 1109 to the state 1107, from the state 1111 to the state 1110, and from the state 1112 to the state 1110 are stored.

For example, as shown in a second row, the command values ($\theta_x$, $\theta_y$, $\theta_z$, $f_x$, $f_y$, $f_z$) for the state transition from the state 1102 to the state 1101 are (0 [deg], 0 [deg], 0 [deg], −1 [N], 0 [N], 0 [N]).

As shown in FIG. 22, in the table storing unit 103, command values for state transitions from the state 1101 to the state s101, s102, or s103, from the state 1104 to the state s104, from the state 1107 to the state s104, s105, or s106, and from the state 1110 to the state s103 are stored.

For example, as shown in a second row, the command values ($\theta_x$, $\theta_y$, $\theta_z$, $f_x$, $f_y$, $f_z$) for the state transition from the state 1101 to the state s101 are (20 [deg], 0 [deg], 0 [deg], 0 [N], 0 [N], 0 [N]).

As shown in FIG. 23, in the table storing unit 103, command values for state transitions from the state s101 to the state s107, from the state s103 to the state s107, from the state s104 to the state s108, from the state s106 to the state s108, from the state s107 to the state s102, from the state s108 to the state s105, from the state s102 to the state s109, and from the state s105 to the state s110 are stored.

For example, as shown in a second row, the command values ($\theta_x$, $\theta_y$, $\theta_z$, $f_x$, $f_y$, $f_z$) for the state transition from the state s101 to the state s107 are (0 [deg], 0 [deg], 0 [deg], 0 [N], 0 [N], 0 [N]).

The command values for each of the state transitions are shown in FIGS. 19 to 23. However, these values may be grouped and stored in the table storing unit 103 or may be collectively stored in the table storing unit 103 without being grouped.

A procedure for storing detection values (before and after discretization) detected by the force sensor 20d for each of contact states in the table storing unit 103 is performed in the same manner as the first embodiment explained with reference to FIG. 10.

A procedure in which the robot control apparatus 10 discriminates the states p101 to p108, tp101 to tp108, 1101 to 1112, and s108 to s110 shown in FIG. 14 and transitions the states is explained.

Figure 24:
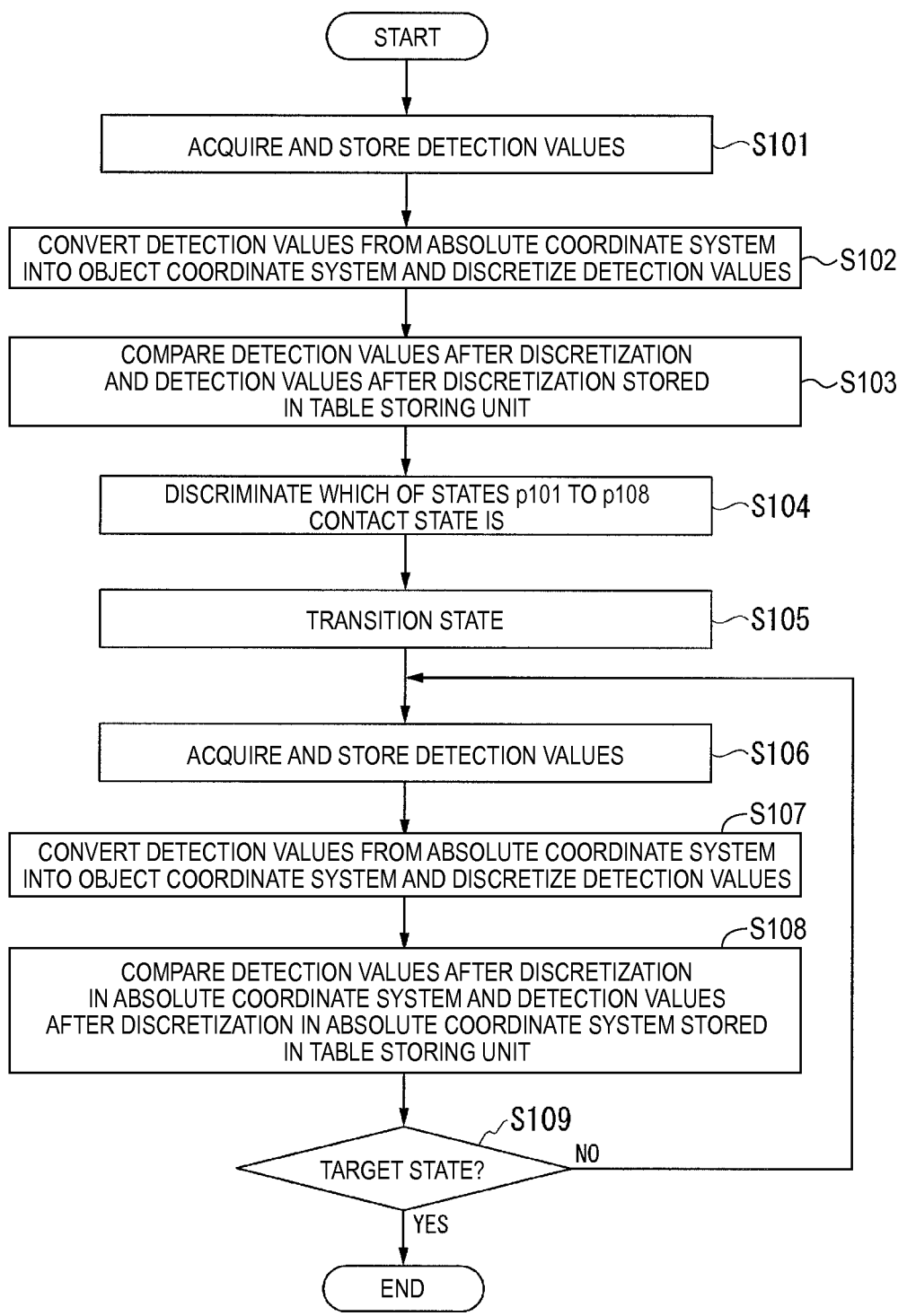
FIG. 24 is a flowchart of a procedure for discriminating a contact state of the first component and the second component and transitioning the contact state of the first component and the second component according to the second embodiment.

FIG. 24 is a flowchart of a procedure for discriminating a contact state of the first component 200 and the second component 210 and transitioning the contact state of the first component 200 and the second component 210 according to this embodiment. The robot control apparatus 10 performs control of the initial postures p101 to p108 by controlling the manipulator unit 20b and the gripping unit 20c using the control values stored in the control storing unit 106.

Steps S101 and S102

Steps S101 and S102 are processed in the same manner as steps S11 and S12 in the first embodiment (FIG. 11).

Step S103

The selecting unit 104 compares detection values after discretization output by the discretizing unit 102 and the second detection values stored in the table storing unit 103. In this case, as shown in FIG. 15, the detection values to be compared are combinations of detection values after discretization of forces in the absolute coordinate system and detection values after discretization of moments in the object coordinate system.

Step S104

The selecting unit 104 discriminates, on the basis of a result of the comparison, which of the states p101 to p108 shown in FIGS. 14 and 15 the contact state is. The selecting unit 104 discriminates, on the basis of a result of the discrimination, the next target state to which the contact state is transitioned out of the transition information stored in the table storing unit 103. In this case, the next target state to which the contact state is transitioned is any one of the states tp101 to tp108, 1102, 1105, 1108, and 1111. Subsequently, the selecting unit 104 outputs transition information to the control unit 105 on the basis of a result of the discrimination.

When the contact state of the first component 200 and the second components 210 is, for example, the state p101, in the table storing unit 103, transition information to the states tp101 and 1102 is stored. In such a case, the selecting unit 104 selects transition information on the basis of the order of priority set in advance. The order of priority set in advance is, for example, state transitions for a shortest control procedure.

Step S105

The control unit 105 selects, on the basis of the transition information output by the selecting unit 104, a command value stored in the table storing unit 103. For example, when the transition information is information indicating the transition from the state p101 to the state tp101, the control unit 105 selects a command value for the transition from the state p101 to the state tp101 from the table storing unit 103. The control unit 105 controls, on the basis of the selected command value, the manipulator unit 20b and the gripping unit 20c, which grip the first component 200, such that the state p101 changes to the state tp101.

Steps S106 to S108

Steps S106 to S108 are processed in the same manner as steps S101 to S103. In step S108, when the selecting unit 104 discriminates the next target state to which the contact state is transitioned, the selecting unit 104 compares the detection values and only detection values of contact states conforming to the state transitions stored in the table storing unit 103 rather than comparing the detection values and detection values of all the stored contact states. Specifically, when the present contact state is the state 1101, the selecting unit 104 compares the detection values after the discretization in the absolute coordinate system and the second detection values of the states s101, s102, and s103 stored in the table storing unit 103 and discriminates the states on the basis of a result of the comparison.

In this case, as shown in FIGS. 16 to 18, the detection values to be compared are combinations of the detection values after the ternarization of the forces and the detection values after the discretization of the moments in the absolute coordinate system.

Step S109

The control unit 105 discriminates, on the basis of the transition information output by the selecting unit 104, whether the contact state of the first component 200 and the second component 210 is a target state (a final target state). The final target state is the state s109 or the state s110 shown in FIG. 14. When discriminating that the contact state of the first component 200 and the second component 210 is not the target state (No in step S109), the control unit 105 returns to step S106 and repeats steps S106 to S109.

When discriminating that the contact state of the first component 200 and the second component 210 is the target state (Yes in step S109), the control unit 105 ends the processing for transitioning the contact state of the first component 200 and the second component 210.

An example of control performed by the robot control apparatus 10 is explained.

In FIG. 14, the robot control apparatus 10 controls a contact state of the first component 200 and the second component 210 to change from the initial posture p101 to the state tp101. After discriminating that the contact state is the state tp101, the robot control apparatus 10 controls the contact state to change from the state tp101 to the state 1101. After discriminating that the contact state is the state 1101, the robot control apparatus 10 controls the contact state to change from the state 1101 to the state s101. After discriminating that the contact state is the state s101, the robot control apparatus 10 controls the contact state to change from the state s101 to the state s107. After discriminating that the contact state is the state s107, the robot control apparatus 10 controls the contact state to change from the state s101 to the state s102. After discriminating that the contact state is the state s102, the robot control apparatus 10 controls the contact state to change from the state s102 to the state s109.

As explained above, when the robot apparatus 1 according to this embodiment performs fitting of the first component 200 and the second component 210 in a state in which the first component 200 and the second component 210 are positioned in the x-axis direction in the absolute coordinate system, the robot apparatus 1 determines a contact state of the first component 200 and the second component 210 on the basis of detection values detected by the force sensor 20d included in the robot apparatus 1. The robot apparatus 1 according to this embodiment selects, according to the determined contact state, transition information stored in the table storing unit 102 and controls the contact state of the first component 200 and the second component 210. As a result, according to this embodiment, it is possible to fit in the first component 200 and the second component 210 each other even if the hole 211 of the second component 210 is not chamfered.

In this case, the robot apparatus 1 causes, on the basis of a contact state of the first component 200 and the ridge line B1C1 of the hole 211 or a contact state of the first component 200 and the ridge line A1D1 of the hole 211, the table storing unit 103 to store the state and state transitions. Therefore, it is possible to reduce a computation amount required for the discrimination of the contact state of the first component 200 and the second component 210.

Third Embodiment

In an example explained in a third embodiment, any one of the vertexes of the first component 200 shown in FIG. 13 is moved from a state in which the vertex is put in the hole 211 of the second component 210 until the vertex comes into contact with each direction of the xy direction to fit in the first component 200 and the second component 210 each other.

The robot apparatus according to this embodiment changes a contact state of the first component and the second component to a first contact state, changes the contact state to a second contact state after the first contact state, and changes the contact state to a third contact state after the second contact state to fit in the first component and the second component each other. Further, in the third contact state, the robot apparatus sequentially transitions the first component to be attached to (fit in) the hole of the second component along a surface of the first component in contact with the hole of the second component.

The contact state of the first component 200 and the second component 210 is a form of the first component 200 and the second component 210. The contact state is a state including a state in which the first component 200 and the second component 210 are in point contact with each other (a first contact state), a state in which the first component 200 and the second component 210 are in line contact with each other (a second contact state), a state in which the first component 200 and the second component 210 are in surface contact with each other (a third contact state), and a state in which the first component 200 is put in the hole 211. The first to third contact states are the same as the first to third contact states in the second embodiment.

The configuration of the robot apparatus 1 is the same as the configuration shown in FIG. 1 in the first embodiment. The configuration of the robot control apparatus 10 is the same as the configuration shown in FIG. 3 in the first embodiment. An absolute coordinate system and an object coordinate system in the first component 200 and the second component 210 and vertexes in the first component 200 and the second component 210 are the same as the absolute coordinate system and the object coordinate system and the vertexes shown in FIG. 13 in the second embodiment.

Preconditions in this embodiment are as explained below.
1. In an initial posture, any one of the vertexes E1, F1, G1, and H1 of the first component 200 is present in the surface a1b1c1d1 representing a region of the hole 211 of the second component 210. That is, only one vertex of the first component is present in the surface a1b1c1d1 of the region of the hole 211.

2. It is assumed that an error of the initial posture of the first component 200 and a posture of a final target state is small. That is, a range of an angle representing an error of a posture of the object coordinate system viewed from the absolute coordinate system is −10 [deg] to +10 [deg] or less.
3. Transition to a contact state clearly away from target position and posture is not taken into account.
4. A compliance center is present at the origin of the object coordinate system and has a damping characteristic.
5. The robot control apparatus 10 performs fixed operation from the initial posture and operates the first component 200 to turn around the vertex a1 of the hole 211 of the second component 210 once. That is, the robot control apparatus 10 controls the first component 200 to move from the initial posture in the negative direction of the x-axis of the absolute coordinate system until the first component 200 is brought into contact with the ridge line a1d1 of the hole 211. Subsequently, after bringing the first component 200 into contact with the ridge line a1d1 of the hole 211, the robot control apparatus 10 controls the first component 200 to move in the negative direction of the y-axis of the absolute coordinate system to be brought into contact with the ridge line a1b1 of the hole 211.

Transition information and detection values and command values of the force sensor 20d stored in the table storing unit 103 are explained.

First, the transition information for each of the vertexes of the first component 200 stored in the table storing unit 103 is explained.

Figure 25:
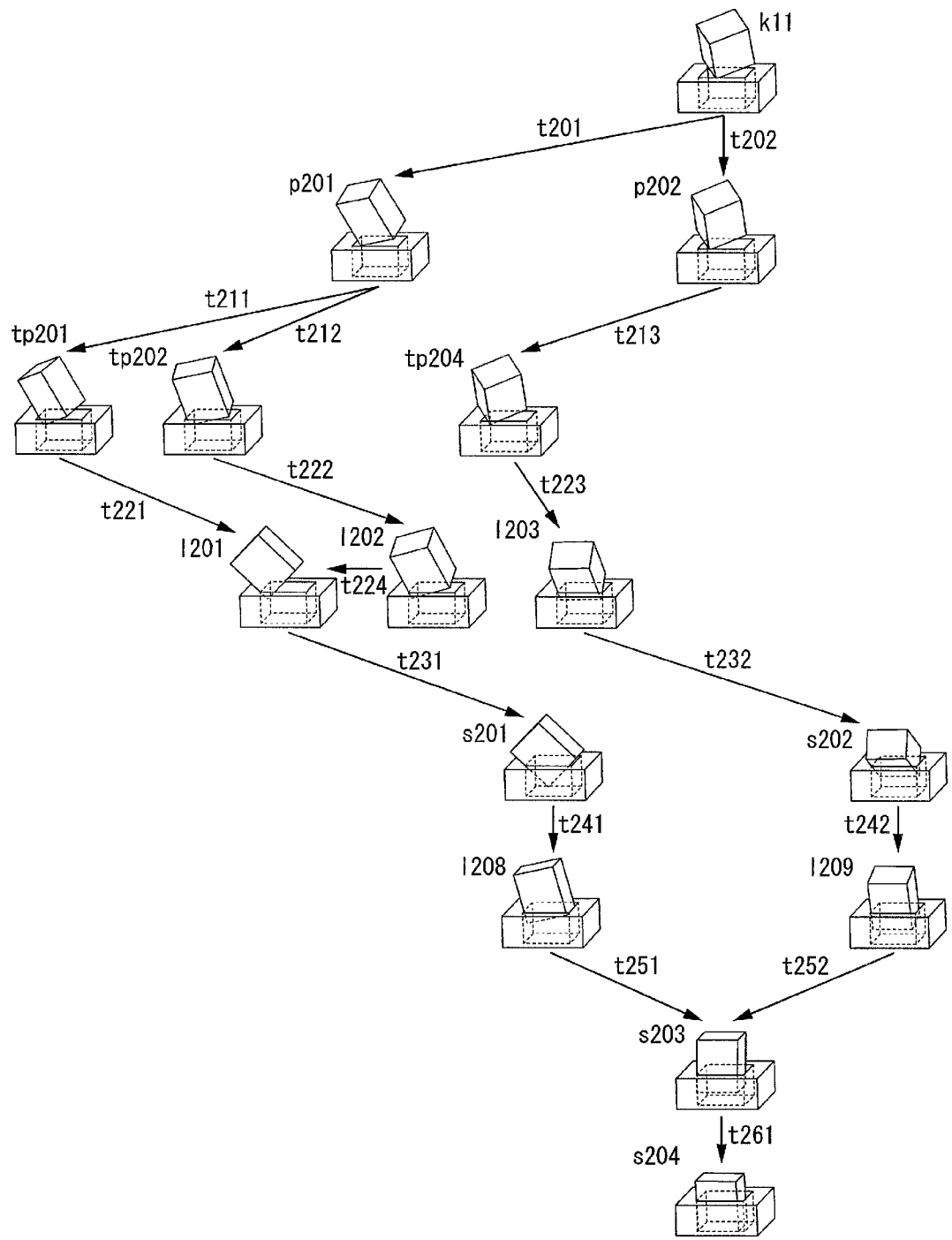
FIG. 25 is a state transition diagram based on transition information after a state in which a vertex E1 of a first component is put in a hole stored in a table storing unit according to a third embodiment.
Figure 26:
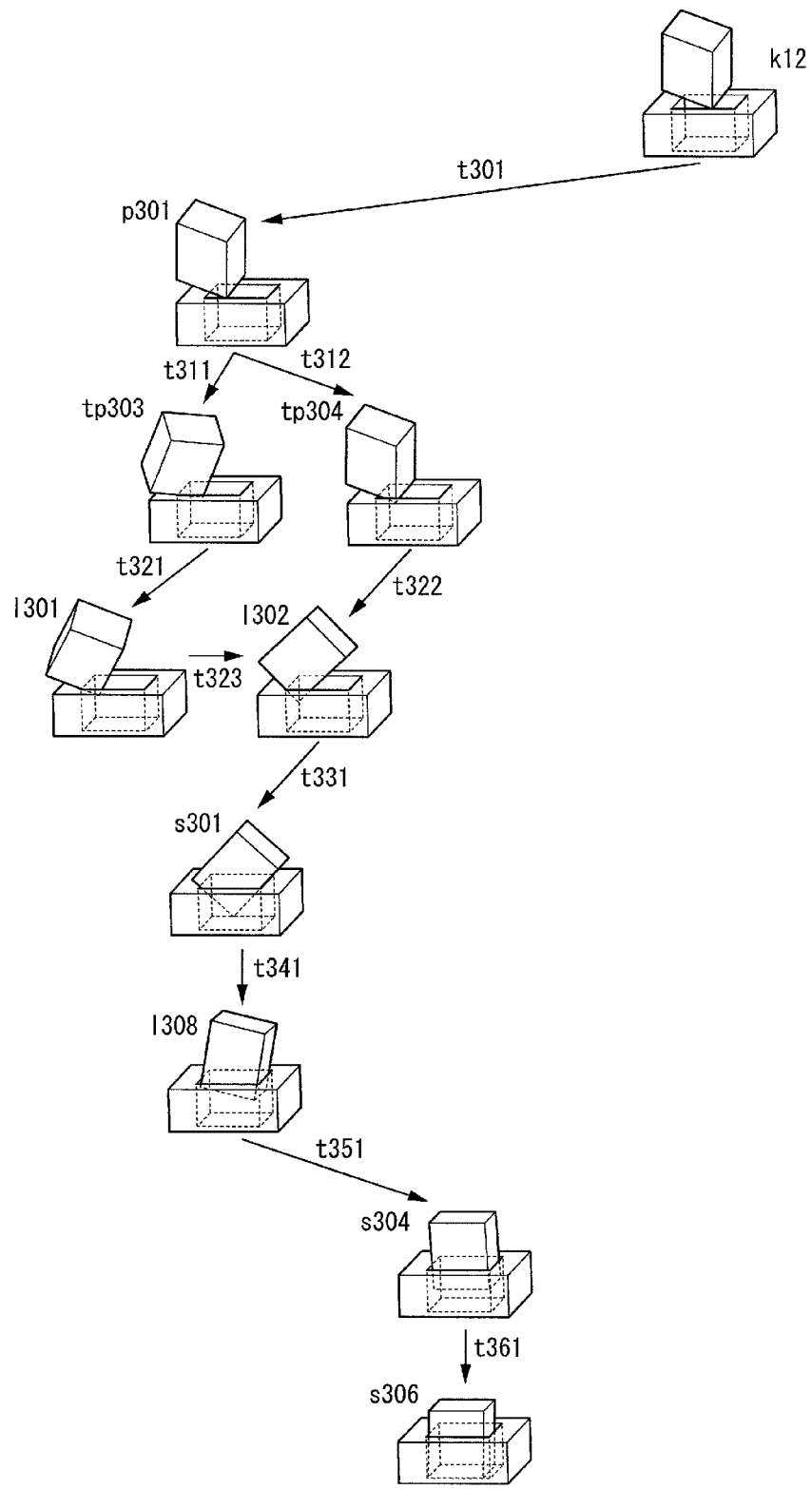
FIG. 26 is a state transition diagram based on transition information after a state in which a vertex F1 of the first component is put in the hole stored in the table storing unit according to the third embodiment.
Figure 27:
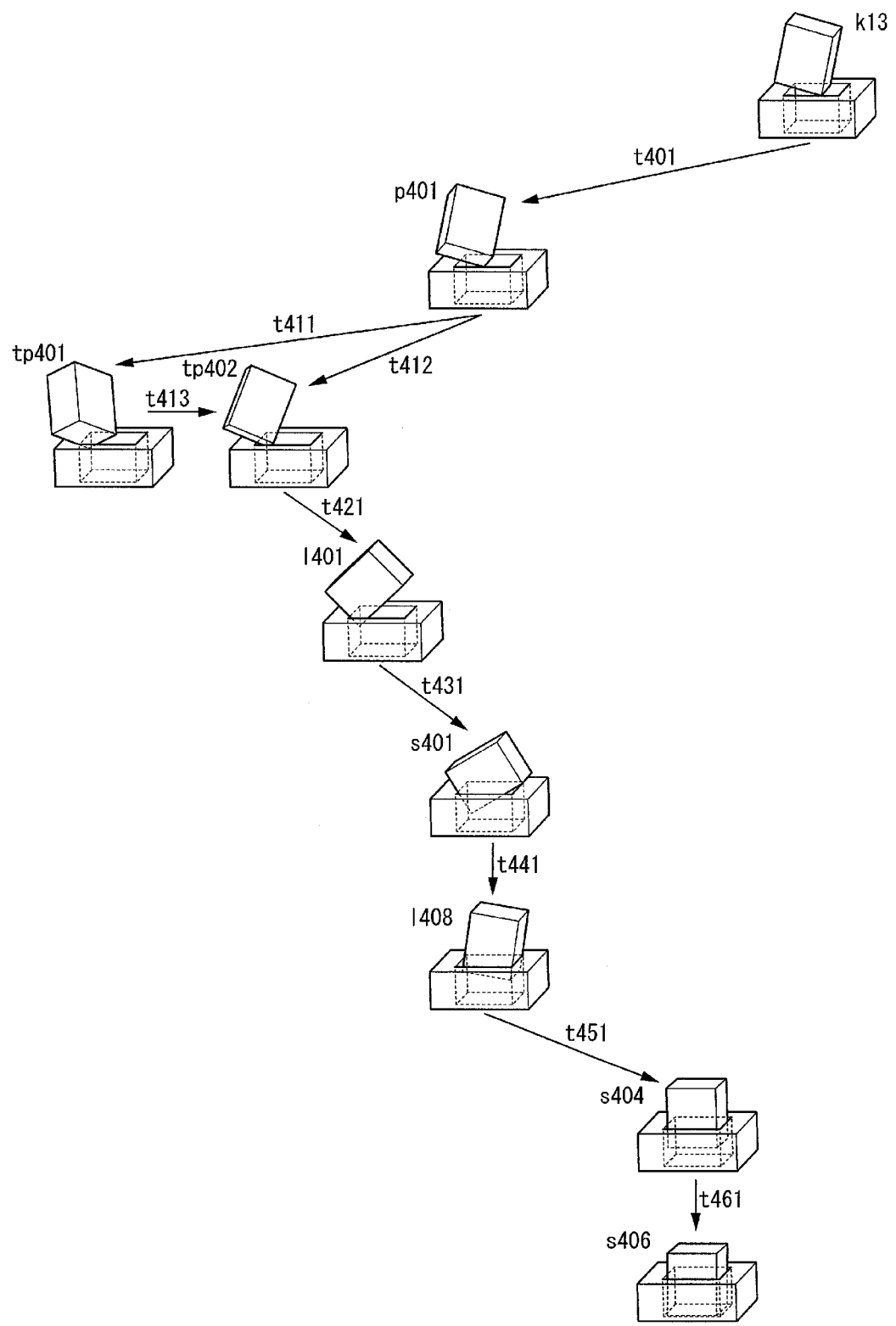
FIG. 27 is a state transition diagram based on transition information after a state in which a vertex G1 of the first component is put in the hole stored in the table storing unit according to the third embodiment.
Figure 28:
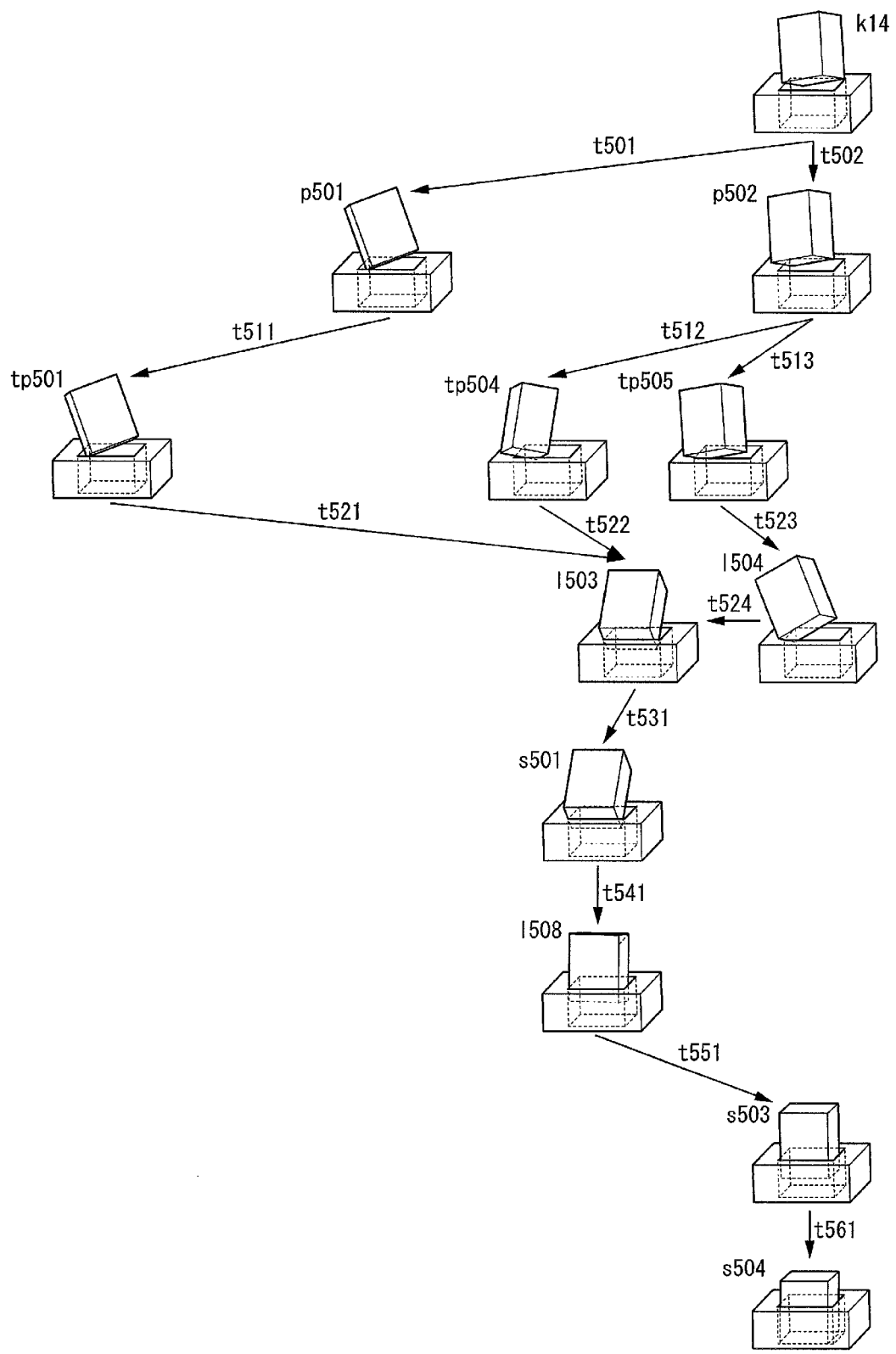
FIG. 28 is a state transition diagram based on transition information after a state in which a vertex H1 of the first component is put in the hole stored in the table storing unit according to the third embodiment.

FIG. 25 is a state transition diagram based on transition information after a state in which the vertex E1 of the first component 200 is put in the hole 211 stored in the table storing unit 103 according to this embodiment. FIG. 26 is a state transition diagram based on transition information of the vertex F1 of the first component 200 stored in the table storing unit 103 according to this embodiment. FIG. 27 is a state transition diagram based on transition information after a state in which the vertex G1 of the first component 200 is put in the hole 211 stored in the table storing unit 103 according to this embodiment. FIG. 28 is a state transition diagram based on transition information after a state in which the vertex H1 of the first component 200 is put in the hole 211 stored in the table storing unit 103 according to this embodiment.

The transition information for each of the vertexes stored in the table storing unit 103 is, for example, information for transitioning the first component 200 as indicated by arrows t201 to t261 from the initial posture k1 to the state p201, from the initial posture k1 to the state p202, and from the state p201 to the state tp201 in FIG. 25. The transition information in the case of the vertex E1 shown in FIG. 25 is stored in association with one another. Similarly, the transition information in the case of the vertex F1 shown in FIG. 26 is stored in association with one another. The transition information in the case of the vertex G1 shown in FIG. 27 is stored in association with one another. The transition information in the case of the vertex H1 shown in FIG. 28 is stored in association with one another.

In the following explanation, FIGS. 25 to 28 are referred to as relations of state transitions at the vertexes.

In an example shown in FIG. 25, transition information stored in the table storing unit 103 is as explained below. As indicated by arrows t201 and t202, the next target state of the initial posture k11 is the state p201 or p202. As indicated by arrows t211 and t212, the next target state of the state p201 is the state tp201 or tp202. As indicated by arrow t223, the next target state of the state p204 is the state 1203. As indicated by arrow t224, the next target state of the state 1202 is the state 1201. As indicated by arrow t231, the next target state of the state 1201 is the state s201. As indicated by arrow t232, the next target state of the state 1203 is the state s202. As indicated by arrow t241, the next target state of the state s201 is the state 1208. As indicated by arrow t242, the next target state of the state s202 is the state 1209. As indicated by arrows t251 and t252, the next target state of the states 1208 and 1209 is the state s203. As indicated by arrow t261, the next target state of the state s203 is the state s204.

The initial posture k11 is a state in which the vertex E1 of the first component 200 is put in the hole 211. The states p201 and p202 represent a contact state of the first component 200 and the hole 211 after the first component 200 is moved from the initial posture k11 in the negative direction of the x-axis direction. In this state, the vertex E1 of the first component 200 is in contact with the ridge line a1b1 of the hole 211.

In the state p201, the side A1E1 of the first component 200 and the ridge line a1d1 of the hole 211 are in point contact with each other at one point. In the state p202, the side E1H1 of the first component 200 and the ridge line a1d1 of the hole 211 are in point contact with each other at one point. In the state tp201, the first component 200 and the hole 211 are in point contact with each other at two points where the side A1E1 of the first component 200 and the ridge line a1d1 of the hole 211 are in contact and the side E1F1 of the first component 200 and the ridge line a1b1 of the hole 211 are in contact. In the state tp202, the side A1E1 of the first component 200 and the ridge line a1 of the hole 211 are in point contact with each other at one point. In the state tp204, the first component 200 and the hole 211 are in point contact with each other at two points where the side E1H1 of the first component 200 and the ridge line a1d1 of the hole 211 are in contact and the side A1E1 of the first component 200 and the ridge line a1b1 of the hole 211 are in contact.

In the state 1201, the surface A1D1H1E1 of the first component 200 and the ridge line a1d1 of the hole 211 are in line contact with each other and a surface A1B1F1E1 of the first component 200 and a surface a1b1f1e1 of the hole 211 are in surface contact with each other. In the state 1202, the surface A1B1F1E1 of the first component 200 and the ridge line a1d1 of the hole 211 are in line contact with each other or the surface A1B1F1E1 of the first component 200 and the vertex a1 of the hole 211 are in point contact with each other. In the state 1203, the surface A1B1F1E1 of the first component 200 and the ridge line a1b1 of the hole 211 are in line contact with each other and the surface A1D1H1E1 of the first component 200 and a surface a1d1h1e1 of the hole 211 are in surface contact with each other. In the state 1208, the surface A1D1H1E1 of the first component 200 and the ridge line a1d1 of the hole 211 are in line contact with each other and the surface A1B1F1E1 of the first component 200 and the surface a1b1f1e1 of the hole 211 are in surface contact with each other. In the state 1209, the surface A1B1F1E1 of the first component 200 and the ridge line a1b1 of the hole 211 are in line contact with each other and the surface A1D1H1E1 of the first component 200 and the surface a1d1h1e1 of the hole 211 are in surface contact with each other.

In the state s201, the surface A1D1H1E1 of the first component 200 and the ridge line a1d1 of the hole 211 are in line contact with each other, the surface E1F1G1H1 of the first component 200 and the ridge line b1c1 of the hole 211 are in line contact with each other, and the surface A1B1F1E1 of the first component 200 and the surface a1b1f1e1 of the hole 211 are in surface contact with each other. In the state s202, the surface A1B1F1E1 of the first component 200 and the ridge line a1d1 of the hole 211 are in line contact with each other, the surface E1F1G1H1 of the first component 200 and the ridge line c1d1 of the hole 211 are in line contact with each other, and the surface A1D1H1E1 of the first component 200 and the surface a1b1f1e1 of the hole 211 are in surface contact with each other. In the state s203, the surface A1B1F1E1 of the first component 200 and the surface a1b1f1e1 of the hole 211 are in surface contact with each other and the surface A1D1H1E1 of the first component 200 and the surface a1d1h1e1 of the hole 211 are in surface contact with each other. In the state s204, the surface A1B1F1E1 of the first component 200 and the surface a1b1f1e1 of the hole 211 are in surface contact with each other, the surface A1D1H1E1 of the first component 200 and the surface a1d1h1e1 of the hole 211 are in surface contact with each other, and the surface E1F1G1H1 of the first component 200 and the surface e1f1g1h1 of the hole 211 are in surface contact with each other.

In an example shown in FIG. 26, transition information stored in the table storing unit 103 is as explained below. As indicated by arrow t301, the next target state of the initial posture k12 is the state p301. As indicated by arrows t311 and t312, the next target state of the state p301 is the state tp303 or tp304. As indicated by arrow t321, the next target state of the state tp303 is the state 1301. As indicated by arrow t322, the next target state of the state tp304 is the state 1302. As indicated by arrow t323, the next target state of the state 1301 is the state 1302. As indicated by arrow t331, the next target state of the state 1302 is the state s201. As indicated by arrow t341, the next target state of the state s301 is the state 1308. As indicated by arrow t351, the next target state of the state 1308 is the state s304. As indicated by arrow t361, the next target state of the state s304 is the state s306.

The initial posture k12 is a state in which the vertex F1 of the first component 200 is put in the hole 211. The state p301 represents a contact state of the first component 200 and the hole 211 after the first component 200 is moved from the initial posture k12 in the negative direction of the x-axis direction. In this state, the vertex F1 of the first component 200 is in contact with the ridge line a1b1 of the hole 211.

In the state p301, the side E1F1 of the first component 200 and the ridge line a1d1 of the hole 211 are in point contact with each other at one point. In the state tp303, the side E1F1 of the first component 200 and the vertex a1 of the hole 211 are in point contact with each other at one point. In the state tp304, the first component 200 and the hole 211 are in point contact with each other at two points where the side E1F1 of the first component 200 and the ridge line a1d1 of the hole 211 are in contact and the side B1F1 of the first component 200 and the ridge line a1b1 of the hole 211 are in contact.

In the state 1301, the side E1F1 of the first component 200 and the ridge line a1b1 of the hole 211 are in line contact with each other and the side E1F1 of the first component 200 and the vertex a1 of the hole 211 are in point contact with each other. In the state 1302, the surface E1F1G1H1 of the first component 200 and the ridge line a1d1 of the hole 211 are in line contact with each other or the surface A1B1F1E1 of the first component 200 and the surface a1d1f1e1 of the hole 211 are in surface contact with each other. In the state 1308, the surface B1C1G1F1 of the first component 200 and the ridge line b1c1 of the hole 211 are in line contact with each other or the surface A1B1F1E1 of the first component 200 and the surface a1b1f1e1 of the hole 211 are in surface contact with each other.

In the state s301, the surface B1C1F1G1 of the first component 200 and the ridge line b1c1 of the hole 211 are in line contact with each other, the surface E1F1G1H1 of the first component 200 and the ridge line a1d1 of the hole 211 are in line contact with each other, and the surface A1B1F1E1 of the first component 200 and the surface a1b1f1e1 of the hole 211 are in surface contact with each other. In the state s302, the surface A1B1F1E1 of the first component 200 and the surface a1b1f1e1 of the hole 211 are in surface contact with each other and the surface B1C1G1F1 of the first component 200 and the surface b1c1g1f1 of the hole 211 are in surface contact with each other. In the state s306, the surface A1B1F1E1 of the first component 200 and the surface a1b1f1e1 of the hole 211 are in surface contact with each other, the surface B1C1G1F1 of the first component 200 and the surface b1c1g1f1 of the hole 211 are in surface contact with each other, and the surface E1F1G1H1 of the first component 200 and the surface e1f1g1h1 of the hole 211 are in surface contact with each other.

In an example shown in FIG. 27, transition information stored in the table storing unit 103 is as explained below. As indicated by arrow t401, the next target state of the initial posture k13 is the state p401. As indicated by arrows t411 and t412, the next target state of the state p401 is the state tp401 or tp402. As indicated by arrow t413, the next target state of the state tp401 is the state tp402. As indicated by arrow t421, the next target state of the state tp402 is the state 1401. As indicated by arrow t431, the next target state of the state 1401 is the state s401. As indicated by arrow t441, the next target state of the state s401 is the state 1408. As indicated by arrow t451, the next target state of the state 1408 is the state s404. As indicated by arrow t461, the next target state of the state s404 is the state s406.

The initial posture k13 is a state in which the vertex G1 of the first component 200 is put in the hole 211. The state p401 represents a contact state of the first component 200 and the hole 211 after the first component 200 is moved from the initial posture k13 in the negative direction of the x-axis direction. In this state, the vertex G1 of the first component 200 is in contact with the ridge line a1b1 of the hole 211.

In the state p401, the side H1G1 of the first component 200 and the ridge line a1d1 of the hole 211 are in point contact with each other at one point. In the state tp401, the side H1G1 of the first component 200 and the vertex a1 of the hole 211 are in point contact with each other at one point. In the state tp402, the first component 200 and the hole 211 are in point contact with each other at two points where the side H1G1 of the first component 200 and the ridge line a1d1 of the hole 211 are in contact and the side F1G1 of the first component 200 and the ridge line a1b1 of the hole 211 are in contact.

In the state 1401, the surface E1F1G1H1 of the first component 200 and the ridge line a1d1 of the hole 211 are in line contact with each other and the surface D1C1G1H1 of the first component 200 and the surface d1c1g1h1 of the hole 211 are in surface contact with each other. In the state 1408, the surface B1C1G1F1 of the first component 200 and the ridge line b1c1 of the hole 211 are in line contact with each other or the surface D1C1G1H1 of the first component 200 and the surface d1c1g1h1 of the hole 211 are in surface contact with each other.

In the state s401, the surface B1C1F1G1 of the first component 200 and the ridge line b1c1 of the hole 211 are in line contact with each other, the surface E1F1G1H1 of the first component 200 and the ridge line a1d1 of the hole 211 are in line contact with each other, and the surface D1C1G1H1 of the first component 200 and the surface d1c1g1h1 of the hole 211 are in surface contact with each other. In the state s404, the surface B1C1G1F1 of the first component 200 and the surface b1c1g1f1 of the hole 211 are in surface contact with each other and the surface D1C1G1H1 of the first component 200 and the surface d1c1g1h1 of the hole 211 are in surface contact with each other. In the state s406, the surface B1C1G1F1 of the first component 200 and the surface b1c1g1f1 of the hole 211 are in surface contact with each other, the surface D1C1G1H1 of the first component 200 and the surface d1c1g1h1 of the hole 211 are in surface contact with each other, and the surface E1F1G1H1 of the first component 200 and the surface e1f1g1h1 of the hole 211 are in surface contact with each other.

In an example shown in FIG. 28, transition information stored in the table storing unit 103 is as explained below. As indicated by arrows t501 and t502, the next target state of the initial posture k14 is the state p501 or p502. As indicated by arrow t511, the next target state of the state p501 is the state tp501. As indicated by arrow t512 or t513, the next target state of the state p502 is the state tp504 or tp505. As indicated by arrow t521, the next target state of the state tp501 is the state 1503. As indicated by arrow t522, the next target state of the state tp504 is the state 1503. As indicated by arrow t523, the next target state of the state tp505 is the state 1504. As indicated by arrow t524, the next target state of the state 1504 is the state 1503. As indicated by arrow t531, the next target state of the state 1503 is the state s501. As indicated by arrow t541, the next target state of the state s501 is the state 1508. As indicated by arrow t551, the next target state of the state 1508 is the state s503. As indicated by arrow t561, the next target state of the state s503 is the state s504.

The initial posture k14 is a state in which the vertex H1 of the first component 200 is put in the hole 211. The states p501 and p502 represent a contact state of the first component 200 and the hole 211 after the first component 200 is moved from the initial posture k14 in the negative direction of the x-axis direction. In this state, the vertex H1 of the first component 200 is in contact with the ridge line a1b1 or the ridge line d1c1 of the hole 211.

In the state p501, the side D1H1 of the first component 200 and the ridge line a1d1 of the hole 211 are in point contact with each other at one point. In the state p502, the side E1H1 of the first component 200 and the ridge line a1d1 of the hole 211 are in point contact with each other at one point. In the state tp501, the first component 200 and the hole 211 are in point contact with each other at two points where the side D1H1 of the first component 200 and the ridge line a1d1 of the hole 211 are in contact and the side E1H1 of the first component 200 and the ridge line a1b1 of the hole 211 are in contact. In the state tp504, the first component 200 and the hole 211 are in point contact with each other at two points where the side E1H1 of the first component 200 and the ridge line a1d1 of the hole 211 are in contact and the side G1H1 of the first component 200 and the ridge line a1b1 of the hole 211 are in contact. In the state tp505, the side E1H1 of the first component 200 and the vertex a1 of the hole 211 are in point contact with each other at one point.

In the state 1503, the surface E1F1G1H1 of the first component 200 and the ridge line a1b1 of the hole 211 are in line contact with each other and a surface A1D1H1E1 of the first component 200 and a surface a1d1h1e1 of the hole 211 are in surface contact with each other. In the state 1504, the surface A1D1H1E1 of the first component 200 and the ridge line a1d1 of the hole 211 are in line contact with each other or the side E1H1 of the first component 200 and the vertex a1 of the hole 211 are in point contact with each other. In the state 1508, the surface D1C1G1H1 of the first component 200 and the ridge line c1d1 of the hole 211 are in line contact with each other and the surface A1D1H1E1 of the first component 200 and a surface a1d1h1e1 of the hole 211 are in surface contact with each other.

In the state s501, the surface E1F1G1H1 of the first component 200 and the ridge line a1b1 of the hole 211 are in line contact with each other, the surface D1C1G1H1 of the first component 200 and the ridge line c1d1 of the hole 211 are in line contact with each other, and the surface A1D1H1E1 of the first component 200 and the surface a1d1h1e1 of the hole 211 are in surface contact with each other. In the state s503, the surface D1C1G1H1 of the first component 200 and the surface d1c1g1h1 of the hole 211 are in surface contact with each other and the surface A1D1H1E1 of the first component 200 and the surface a1d1h1e1 of the hole 211 are in surface contact with each other. In the state s504, the surface D1C1G1H1 of the first component 200 and the surface d1c1g1h1 of the hole 211 are in surface contact with each other, the surface A1D1H1E1 of the first component 200 and the surface a1d1h1e1 of the hole 211 are in surface contact with each other, and the surface E1F1G1H1 of the first component 200 and the surface e1f1g1h1 of the hole 211 are in surface contact with each other.

State and Detection Values of the Force Sensor in the Case of the Vertex E1

Detection values after discretization measured in advance and stored in the table storing unit 103 when an initial posture is a state in which the vertex E1 of the first component 200 is put in the hole 211 are explained.

FIG. 29 is a diagram showing detection values after discretization of the states p201 and p202 detected by the force sensor 20*d* and stored in the table storing unit 103 when the initial posture is the state in which the vertex E1 of the first component 200 is put in the hole 211 according to this embodiment. FIG. 30 is a diagram showing detection values after discretization of the states tp201 to tp204 detected by the force sensor 20*d* and stored in the table storing unit 103 when the initial posture is the state in which the vertex E1 of the first component 200 is put in the hole 211 according to this embodiment. FIG. 31 is a diagram showing detection values after discretization of the states 1201 to 1209 detected by the force sensor 20*d* and stored in the table storing unit 103 when the initial posture is the state in which the vertex E1 of the first component 200 is put in the hole 211 according to this embodiment. FIG. 32 is a diagram showing detection values after discretization of the states s201 to s204 detected by the force sensor 20*d* and stored in the table storing unit 103 when the initial posture is the state in which the vertex E1 of the first component 200 is put in the hole 211 according to this embodiment.

As shown in FIG. 29, in the table storing unit 103, forces ($^o f_x$, $^o f_y$, $^o f_z$) in the absolute coordinate system and moments ($^{obj}nx$, $^{obj}ny$, $^{obj}nz$) in the object coordinate system of the states p201 and p202 are stored in association with each other.

For example, as shown in a second row, detection values after discretization of the state p201 are $^o fx=1$, $^o fy=0$, $^o fz=1$, $^{obj}nx=0$, $^{obj}ny=1$, and $^{obj}nz=1$.

Combinations of discretized detection values in the absolute coordinate system and discretized detection values in the object coordinate system are referred to as second detection values in this embodiment.

As shown in FIG. 30, in the table storing unit 103, the forces ($^o f_x$, $^o f_y$, $^o f_z$) in the absolute coordinate system and the moments ($^{obj}nx$, $^{obj}ny$, $^{obj}nz$) in the object coordinate system of the states tp201, tp202, and tp204 are stored in association with each other.

For example, as shown in a second row, detection values after discretization of the state tp201 are $^o fx=1$, $^o fy=1$, $^o fz=1$, $^{obj}nx=-1$, $^{obj}ny=0$, and $^{obj}nz=0$.

As shown in FIG. 31, in the table storing unit 103, the forces ($^o f_x$, $^o f_y$, $^o f_z$) and moments ($^o nx$, $^o ny$, $^o nz$) in the absolute coordinate system of the states 1201 to 1203, 1208, and 1209 are stored in association with each other.

For example, as shown in a second row, detection values after discretization of the state 1201 are $^o fx=1$, $^o fy=1$, $^o fz=1$, $^o nx=0$, $^o ny=1$, and $^o nz=0$.

As shown in FIG. 32, in the table storing unit 103, the forces ($^o f_x$, $^o f_y$, $^o f_z$) and the moments ($^o nx$, $^o ny$, $^o nz$) in the absolute coordinate system of the states s201, s202, s203, and s204 are stored in association with each other.

For example, as shown in a second row, detection values after discretization of the state s201 are $^o fx=1$, $^o fy=0$, $^o fz=1$, $^o nx=0$, $^o ny=0$, and $^o nz=0$.

State and Detection Values of the Force Sensor in the Case of the Vertex F1

Detection values after discretization measured in advance and stored in the table storing unit 103 when an initial posture is a state in which the vertex F1 of the first component 200 is put in the hole 211 are explained.

FIG. 33 is a diagram showing detection values after discretization of the states p301 to p303 detected by the force sensor 20*d* and stored in the table storing unit 103 when the initial posture is the state in which the vertex F1 of the first component 200 is put in the hole 211 according to this embodiment. FIG. 34 is a diagram showing detection values after discretization of the states tp303 and tp304 detected by the force sensor 20*d* and stored in the table storing unit 103 when the initial posture is the state in which the vertex F1 of the first component 200 is put in the hole 211 according to this embodiment. FIG. 35 is a diagram showing detection values after discretization of the states 1301 to 1308 detected by the force sensor 20*d* and stored in the table storing unit 103 when the initial posture is the state in which the vertex F1 of the first component 200 is put in the hole 211 according to this embodiment. FIG. 36 is a diagram showing detection values after discretization of the state s301 detected by the force sensor 20*d* and stored in the table storing unit 103 when the initial posture is the state in which the vertex F1 of the first component 200 is put in the hole 211 according to this embodiment.

As shown in FIG. 33, in the table storing unit 103, the forces ($^o f_x$, $^o f_y$, $^o f_z$) in the absolute coordinate system and the moments ($^{obj}nx$, $^{obj}ny$, $^{obj}nz$) in the object coordinate system of the state p301 are stored in association with each other.

As shown in a second row, detection values after discretization of the state p301 are $^o fx=1$, $^o fy=0$, $^o fz=1$, $^{obj}nx=-1$, $^{obj}ny=1$, and $^{obj}nz=0$.

As shown in FIG. 34, in the table storing unit 103, the forces ($^o f_x$, $^o f_y$, $^o f_z$) in the absolute coordinate system and the moments ($^{obj}nx$, $^{obj}ny$, $^{obj}nz$) in the object coordinate system of the states tp303 and tp304 are stored in association with each other.

For example, as shown in a second row, detection values after discretization of the state tp303 are $^o fx=1$, $^o fy=1$, $^o fz=1$, $^{obj}nx=0$, $^{obj}ny=0$, and $^{obj}nz=1$.

As shown in FIG. 35, in the table storing unit 103, the forces ($^o f_x$, $^o f_y$, $^o f_z$) and the moments ($^o nx$, $^o ny$, $^o nz$) in the absolute coordinate system of the states 1301, 1302, and 1308 are stored in association with each other.

For example, as shown in a second row, detection values after discretization of the state 1301 are $^o fx=1$, $^o fy=1$, $^o fz=1$, $^o nx=-1$, $^o ny=1$, and $^o nz=0$.

As shown in FIG. 36, in the table storing unit 103, the forces ($^o f_x$, $^o f_y$, $^o f_z$) and the moments ($^o nx$, $^o ny$, $^o nz$) in the absolute coordinate system of the states s301, s304, and s306 are stored in association with each other.

For example, as shown in a second row, detection values after discretization of the state s301 are $^o fx=0$, $^o fy=1$, $^o fz=1$, $^o nx=0$, $^o ny=0$, and $^o nz=0$.

State and Detection Values of the Force Sensor in the Case of the Vertex G1

Detection values after discretization measured in advance and stored in the table storing unit 103 when an initial posture is a state in which the vertex G1 of the first component 200 is put in the hole 211 are explained.

FIG. 37 is a diagram showing detection values after discretization of the states p401 to p403 detected by the force sensor 20*d* and stored in the table storing unit 103 when the initial posture is the state in which the vertex G1 of the first component 200 is put in the hole 211 according to this embodiment.

FIG. 38 is a diagram showing detection values after discretization of the states tp401 and tp402 detected by the force sensor 20*d* and stored in the table storing unit 103 when the initial posture is the state in which the vertex G1 of the first component 200 is put in the hole 211 according to this embodiment. FIG. 39 is a diagram showing detection values after discretization of the states 1401 to 1408 detected by the force sensor 20*d* and stored in the table storing unit 103 when the initial posture is the state in which the vertex G1 of the first component 200 is put in the hole 211 according to this embodiment. FIG. 40 is a diagram showing detection values after discretization of the state s401 detected by the force sensor 20*d* and stored in the table storing unit 103 when the initial posture is the state in which the vertex G1 of the first component 200 is put in the hole 211 according to this embodiment.

As shown in FIG. 37, in the table storing unit 103, the forces ($^{o}f_x$, $^{o}f_y$, $^{o}f_z$) in the absolute coordinate system and the moments ($^{obj}nx$, $^{obj}ny$, $^{obj}nz$) in the object coordinate system of the state p401 are stored in association with each other.

As shown in a second row, detection values after discretization of the state p401 are $^{o}fx=1$, $^{o}fy=0$, $^{o}fz=1$, $^{obj}nx=1$, $^{obj}ny=1$, and $^{obj}nz=-1$.

As shown in FIG. 38, in the table storing unit 103, the forces ($^{o}f_x$, $^{o}f_y$, $^{o}f_z$) in the absolute coordinate system and the moments ($^{obj}nx$, $^{obj}ny$, $^{obj}nz$) in the object coordinate system of the states tp401 and tp402 are stored in association with each other.

For example, as shown in a second row, detection values after discretization of the state tp401 are $^{o}fx=1$, $^{o}fy=1$, $^{o}fz=1$, $^{obj}nx=0$, $^{obj}ny=1$, and $^{obj}nz=0$.

As shown in FIG. 39, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states 1401 and 1408 are stored in association with each other.

For example, as shown in a second row, detection values after discretization of the state 1401 are $^{o}fx=1$, $^{o}fy=-1$, $^{o}fz=1$, $^{o}nx=0$, $^{o}ny=-1$, and $^{o}nz=0$.

As shown in FIG. 40, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states s401, s404, and s406 are stored in association with each other.

For example, as shown in a second row, detection values after discretization of the state s401 are $^{o}fx=0$, $^{o}fy=-1$, $^{o}fz=1$, $^{o}nx=0$, $^{o}ny=0$, and $^{o}nz=0$.

State and Detection Values of the Force Sensor in the Case of the Vertex H1

Detection values after discretization measured in advance and stored in the table storing unit 103 when an initial posture is a state in which the vertex H1 of the first component 200 is put in the hole 211 are explained.

FIG. 41 is a diagram showing detection values after discretization of the states p501 to p503 detected by the force sensor 20*d* and stored in the table storing unit 103 when the initial posture is the state in which the vertex H1 of the first component 200 is put in the hole 211 according to this embodiment. FIG. 42 is a diagram showing detection values after discretization of the states tp501 to tp505 detected by the force sensor 20*d* and stored in the table storing unit 103 when the initial posture is the state in which the vertex H1 of the first component 200 is put in the hole 211 according to this embodiment. FIG. 43 is a diagram showing detection values after discretization of the states 1503 to 1508 detected by the force sensor 20*d* and stored in the table storing unit 103 when the initial posture is the state in which the vertex H1 of the first component 200 is put in the hole 211 according to this embodiment. FIG. 44 is a diagram showing detection values after discretization of the state s501 detected by the force sensor 20*d* and stored in the table storing unit 103 when the initial posture is the state in which the vertex H1 of the first component 200 is put in the hole 211 according to this embodiment.

As shown in FIG. 41, in the table storing unit 103, the forces ($^{o}f_x$, $^{o}f_y$, $^{o}f_z$) in the absolute coordinate system and the moments ($^{obj}nx$, $^{obj}ny$, $^{obj}nz$) in the object coordinate system of the states p501 and p502 are stored in association with each other.

For example, as shown in a second row, detection values after discretization of the state p501 are $^{o}fx=1$, $^{o}fy=0$, $^{o}fz=1$, $^{obj}nx=0$, $^{obj}ny=1$, and $^{obj}nz=-1$.

As shown in FIG. 42, in the table storing unit 103, the forces ($^{o}f_x$, $^{o}f_y$, $^{o}f_z$) in the absolute coordinate system and the moments ($^{obj}nx$, $^{obj}ny$, $^{obj}nz$) in the object coordinate system of the states tp501, tp504, and tp505 are stored in association with each other.

For example, as shown in a second row, detection values after discretization of the state tp501 are $^{o}fx=1$, $^{o}fy=1$, $^{o}fz=1$, $^{obj}nx=0$, $^{obj}ny=1$, and $^{obj}nz=0$.

As shown in FIG. 43, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states 1503, 1504, and 1508 are stored in association with each other.

For example, as shown in a second row, detection values after discretization of the state 1503 are $^{o}fx=1$, $^{o}fy=1$, $^{o}fz=1$, $^{o}nx=1$, $^{o}ny=0$, and $^{o}nz=0$.

As shown in FIG. 44, in the table storing unit 103, the forces ($^{o}f_x$, $^{o}f_y$, $^{o}f_z$) and the moments ($^{o}nx$, $^{o}ny$, $^{o}nz$) in the absolute coordinate system of the states s501, s503, and s504 are stored in association with each other.

For example, as shown in a second row, detection values after discretization of the state s501 are $^{o}fx=1$, $^{o}fy=0$, $^{o}fz=1$, $^{o}nx=0$, $^{o}ny=0$, and $^{o}nz=0$.

In the examples explained with reference to FIGS. 29, 30, 33, 34, 37, 38, 41, and 42, in the table storing unit 103, the forces ($^{o}f_x$, $^{o}f_y$, $^{o}f_z$) in the absolute coordinate system and the moments ($^{obj}nx$, $^{obj}ny$, $^{obj}nz$) in the object coordinate system are stored in association with each other. However, forces and moments stored in the table storing unit 103 are not limited to this. In the table storing unit 103, the forces ($^{o}f_x$, $^{o}f_y$, $^{o}f_z$) and the moments ($^{o}nx$, $^{o}ny$, $^{o}nz$) in the absolute coordinate system may be stored in association with each other and the forces ($^{obj}f_x$, $^{obj}f_y$, $^{obj}f_z$) and the moment ($^{obj}nx$, $^{obj}ny$, $^{obj}nz$) in the object coordinate system may be stored in association with each other. In this case, the selecting unit 104 may read out the forces ($^{o}f_x$, $^{o}f_y$, $^{o}f_z$) in the absolute coordinate system and the moment ($^{obj}nx$, $^{obj}ny$, $^{obj}nz$) in the object coordinate system stored in the table storing unit 103 and discriminate a contact state of the first component 200 and the second component 210 on the basis of a result of the readout.

The command values stored in the table storing unit 103 are explained with reference to FIGS. 45 to 60.

As shown in FIGS. 45 to 60, in the table storing unit 103, angles ($\theta_x$, $\theta e_y$, $\theta_z$) and forces ($f_x$, $f_y$, $f_z$), which are command values for controlling the manipulator unit 20b and the gripping unit 20c, are stored in association with each other in a table format for each of contact states transitioned from the present contact states to the next target states. In FIGS. 45 to 60, a sign "→" represents a state transition from the present state to the next state. The command values shown in FIGS. 45 to 60 are values of examples as in the second embodiment.

Command Values in the Case of the Vertex E1

Command values stored in the table storing unit 103 when the initial posture is the state in which the vertex E1 of the first component 200 is put in the hole 211 are explained.

FIG. 45 is a diagram for explaining command values for each of state transitions from the states p201 and p202 stored in the table storing unit 103 when the initial posture is the state in which the vertex E1 of the first component 200 is put in the hole 211 according to this embodiment. FIG. 46 is a diagram for explaining command values for each of state transitions from the states tp201, tp202, and tp204 stored in the table storing unit 103 when the initial posture is the state in which the vertex E1 of the first component 200 is put in the hole 211 according to this embodiment. FIG. 47 is a diagram for explaining command values for each of state transitions from the states 1201, 1202, 1204, 1208, and 1209 stored in the table storing unit 103 when the initial posture is the state in which the vertex E1 of the first component 200 is put in the hole 211 according to this embodiment. FIG. 48 is a diagram for explaining command values for each of state transitions from the states s201, s202, and s203 stored in the table storing unit 103 when the initial posture is the state in which the vertex E1 of the first component 200 is put in the hole 211 according to this embodiment.

As shown in FIG. 45, in the table storing unit 103, command values for state transitions from the state p201 to the state tp201, from the state p201 to the state tp202, and from the state p202 to the state tp204 are stored.

For example, as shown in a second row, command values ($\theta_x$, $\theta_y$, $\theta_z$, $f_x$, $f_y$, $f_z$) for the state transition from the state p201 to the state tp201 are (0 [deg], 0 [deg], 0 [deg], 0 [N], −1 [N], 0 [N]).

As shown in FIG. 46, in the table storing unit 103, command values for state transitions from the state tp201 to the state 1201, from the state tp202 to the state 1202, and from the state tp204 to the state 1203 are stored.

For example, as shown in a second row, the command values ($\theta_x$, $\theta_y$, $\theta_z$, $f_x$, $f_y$, $f_z$) for the state transition from the state tp201 to the state 1201 are (0 [deg], 0 [deg], −45 [deg], −1 [N], −1 [N], 0 [N]).

As shown in FIG. 47, in the table storing unit 103, command values for state transitions from the state 1201 to the state s201, from the state 1202 to the state 1201, from the state 1203 to the state s202, from the state 1208 to the state s203, and from the state 1209 to the state s203 are stored.

For example, as shown in a second row, the command values ($\theta_x$, $\theta_y$, $\theta_z$, $f_x$, $f_y$, $f_z$) for the state transition from the state 1201 to the state s201 are (0 [deg], 0 [deg], −45 [deg], −1 [N], −1 [N], 0 [N]).

As shown in FIG. 48, in the table storing unit 103, command values for state transitions from the state s201 to the state 1208, from the state s202 to the state 1209, and from the state s203 to the state s204 are stored.

For example, as shown in a second row, the command values ($\theta_x$, $\theta_y$, $\theta_z$, $f_x$, $f_y$, $f_z$) for the state transition from the state s201 to the state 1208 are (0 [deg], 0 [deg], −45 [deg], −1 [N], −1 [N], 0 [N]).

Command Values in the Case of the Vertex F1

Command values stored in the table storing unit 103 when the initial posture is the state in which the vertex F1 of the first component 200 is put in the hole 211 are explained.

FIG. 49 is a diagram for explaining command values for each of state transitions from the states p301, p302, and p303 stored in the table storing unit 103 when the initial posture is the state in which the vertex F1 of the first component 200 is put in the hole 211 according to this embodiment. FIG. 50 is a diagram for explaining command values for each of state transitions from the states tp303 and tp304 stored in the table storing unit 103 when the initial posture is the state in which the vertex F1 of the first component 200 is put in the hole 211 according to this embodiment. FIG. 51 is a diagram for explaining command values for each of state transitions from the states 1301, 1302, and 1308 stored in the table storing unit 103 when the initial posture is the state in which the vertex F1 of the first component 200 is put in the hole 211 according to this embodiment. FIG. 52 is a diagram for explaining command values for each of state transitions from the states s301, s302, and s303 stored in the table storing unit 103 when the initial posture is the state in which the vertex F1 of the first component 200 is put in the hole 211 according to this embodiment.

As shown in FIG. 49, in the table storing unit 103, command values for state transitions from the state p301 to the state tp303 and from the state p301 to the state tp304 are stored.

For example, as shown in a second row, the command values ($\theta_x$, $\theta_y$, $\theta_z$, $f_x$, $f_y$, $f_z$) for the state transition from the state p301 to the state tp303 are (0 [deg], 0 [deg], 0 [deg], 0 [N], −1 [N], 0 [N]).

As shown in FIG. 50, in the table storing unit 103, command values for state transitions from the state tp303 to the state 1301 and from the state tp304 to the state 1302 are stored.

For example, as shown in a second row, the command values ($\theta_x$, $\theta_y$, $\theta_z$, $f_x$, $f_y$, $f_z$) for the state transition from the state tp303 to the state 1301 are (0 [deg], 0 [deg], −45 [deg], 0 [N], −1 [N], 0 [N]).

As shown in FIG. 51, in the table storing unit 103, command values for state transitions from the state 1301 to the state 1302, from the state 1302 to the state s301, and from the state 1308 to the state s304 are stored.

For example, as shown in a second row, the command values ($\theta_x$, $\theta_y$, $\theta_z$, $f_x$, $f_y$, $f_z$) for the state transition from the state 1301 to the state 1302 are (0 [deg], 0 [deg], −45 [deg], 0 [N], −1 [N], 0 [N]).

As shown in FIG. 52, in the table storing unit 103, command values for state transitions from the state s301 to the state 1308, from the state 1308 to the state s304, and from the state s304 to the state s306 are stored.

For example, as shown in a second row, the command values ($\theta_x$, $\theta_y$, $\theta_z$, $f_x$, $f_y$, $f_z$) for the state transition from the state s301 to the state 1308 are (0 [deg], 45 [deg], 0 [deg], 1 [N], −1 [N], 0 [N]).

Command Values in the Case of the Vertex G1

Command values stored in the table storing unit 103 when the initial posture is the state in which the vertex G1 of the first component 200 is put in the hole 211 are explained.

FIG. 53 is a diagram for explaining command values for each of state transitions from the states p401 and p402 stored in the table storing unit 103 when the initial posture is the state in which the vertex G1 of the first component 200 is put in the hole 211 according to this embodiment. FIG. 54 is a diagram for explaining command values for each of state transitions from the states tp401 and tp402 stored in the table storing unit

103 when the initial posture is the state in which the vertex G1 of the first component 200 is put in the hole 211 according to this embodiment. FIG. 55 is a diagram for explaining command values for each of state transitions from the states 1401 and 1408 stored in the table storing unit 103 when the initial posture is the state in which the vertex G1 of the first component 200 is put in the hole 211 according to this embodiment. FIG. 56 is a diagram for explaining command values for each of state transitions from the states s401 and s404 stored in the table storing unit 103 when the initial posture is the state in which the vertex G1 of the first component 200 is put in the hole 211 according to this embodiment.

As shown in FIG. 53, in the table storing unit 103, command values for state transitions from the state p401 to the state tp401 and from the state p401 to the state tp402 are stored.

For example, as shown in a second row, the command values ($\theta_x$, $\theta_y$, $\theta_z$, $f_x$, $f_y$, $f_z$) for the state transition from the state p401 to the state tp401 are (0 [deg], 0 [deg], 0 [deg], 0 [N], −1 [N], 0 [N]).

As shown in FIG. 54, in the table storing unit 103, command values for state transitions from the state tp401 to the state tp402 and from the state tp402 to the state 1401 are stored.

For example, as shown in a second row, the command values ($\theta_x$, $\theta_y$, $\theta_z$, $f_x$, $f_y$, $f_z$) for the state transition from the state tp401 to the state tp402 are (0 [deg], 0 [deg], −45 [deg], 0 [N], 0 [N], 0 [N]).

As shown in FIG. 55, in the table storing unit 103, command values for state transitions from the state 1401 to the state s401 and from the state 1408 to the state s404 are stored.

For example, as shown in a second row, the command values ($\theta_x$, $\theta_y$, $\theta_z$, $f_x$, $f_y$, $f_z$) for the state transition from the state 1401 to the state s401 are (0 [deg], 45 [deg], 0 [deg], 0 [N], 1 [N], 0 [N]).

As shown in FIG. 56, in the table storing unit 103, command values for state transitions from the state s401 to the state 1408, from the state 1408 to the state s404, and from the state s404 to the state s406 are stored.

For example, as shown in a second row, the command values ($\theta_x$, $\theta_y$, $\theta_z$, $f_x$, $f_y$, $f_z$) for the state transition from the state s401 to the state 1408 are (0 [deg], −45 [deg], 0 [deg], 1 [N], 1 [N], 0 [N]).

Command Values in the Case of the Vertex H1

Command values stored in the table storing unit 103 when the initial posture is the state in which the vertex H1 of the first component 200 is put in the hole 211 are explained.

FIG. 57 is a diagram for explaining command values for each of state transitions from the states p501 and p502 stored in the table storing unit 103 when the initial posture is the state in which the vertex H1 of the first component 200 is put in the hole 211 according to this embodiment. FIG. 58 is a diagram for explaining command values for each of state transitions from the states tp501, tp504, and tp505 stored in the table storing unit 103 when the initial posture is the state in which the vertex H1 of the first component 200 is put in the hole 211 according to this embodiment. FIG. 59 is a diagram for explaining command values for each of state transitions from the states 1503, 1504, and 1508 stored in the table storing unit 103 when the initial posture is the state in which the vertex H1 of the first component 200 is put in the hole 211 according to this embodiment. FIG. 60 is a diagram for explaining command values for each of state transitions from the states s501 and s503 stored in the table storing unit 103 when the initial posture is the state in which the vertex H1 of the first component 200 is put in the hole 211 according to this embodiment.

As shown in FIG. 57, in the table storing unit 103, command values for state transitions from the state p501 to the state tp501, from the state p502 to the state tp504, and from the state p502 to the state tp505 are stored.

For example, as shown in a second row, the command values ($\theta_x$, $\theta_y$, $\theta_z$, $f_x$, $f_y$, $f_z$) for the state transition from the state p501 to the state tp501 are (0 [deg], 0 [deg], 0 [deg], 0 [N], −1 [N], 0 [N]).

As shown in FIG. 58, in the table storing unit 103, command values for state transitions from the state tp501 to the state 1503, from the state tp504 to the state 1503, and from the state tp505 to the state 1504 are stored.

For example, as shown in a second row, the command values ($\theta_x$, $\theta_y$, $\theta_z$, $f_x$, $f_y$, $f_z$) for the state transition from the state tp501 to the state tp503 are (0 [deg], 45 [deg], 45 [deg], −1 [N], −1 [N], 0 [N]).

As shown in FIG. 59, in the table storing unit 103, command values for state transitions from the state 1503 to the state s501, from the state 1504 to the state 1503, and from the state 1508 to the state s503 are stored.

For example, as shown in a second row, the command values ($\theta_x$, $\theta_y$, $\theta_z$, $f_x$, $f_y$, $f_z$) for the state transition from the state 1503 to the state s501 are (−45 [deg], 0 [deg], 0 [deg], −1 [N], −1 [N], 0 [N]).

As shown in FIG. 60, in the table storing unit 103, command values for state transitions from the state s501 to the state 1508 and from the state s503 to the state s504 are stored.

For example, as shown in a second row, the command values ($\theta_x$, $\theta_y$, $\theta_z$, $f_x$, $f_y$, $f_z$) for the state transition from the state s501 to the state 1508 are (45 [deg], 0 [deg], 0 [deg], −1 [N], 1 [N], −1 [N]).

The command values for each of the state transitions are shown in FIGS. 45 to 60. However, these values may be grouped and stored in the table storing unit 103 or may be collectively stored in the table storing unit 103 without being grouped.

A procedure for storing detection values (before and after discretization) detected by the force sensor 20d for each of contact states detected in advance is performed in the same manner as the first embodiment explained with reference to FIG. 10.

A procedure in which the robot control apparatus 10 discriminates the states shown in FIGS. 25 to 28 and transitions the states is explained.

Figure 61:
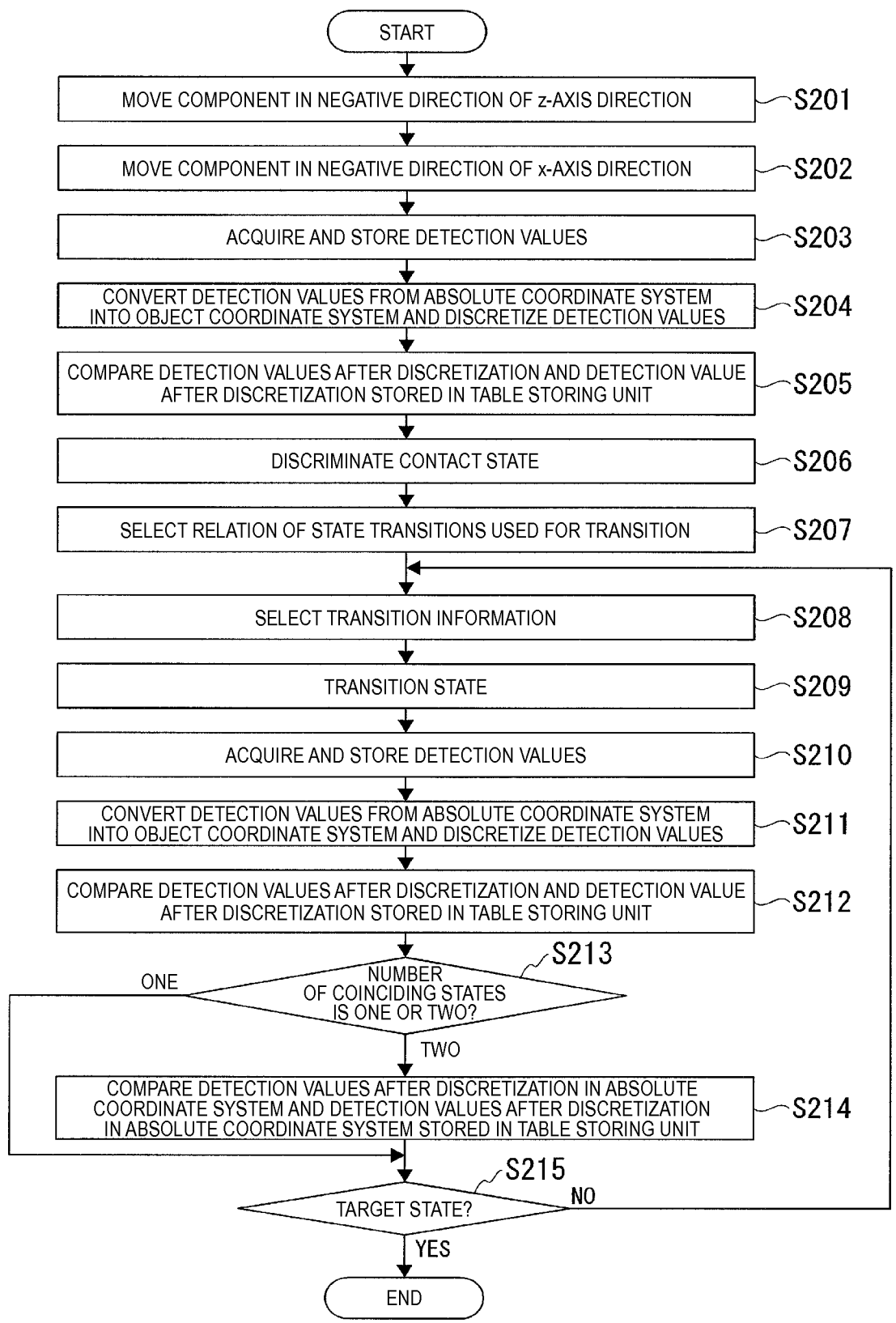
FIG. 61 is a flowchart of a procedure for discriminating a contact state of the first component and the second component and transitioning the contact state of the first component and the second component according to the third embodiment.

FIG. 61 is a flowchart of a procedure for discriminating a contact state of the first component 200 and the second component 210 and transitioning the contact state of the first component 200 and the second component 210 according to this embodiment.

Step S201

The control unit 105 causes the manipulator unit 20b and the gripping unit 20c to grip the first component 200 on the basis of control values stored in the control storing unit 106. Subsequently, the control unit 105 controls, on the basis of the control values, the manipulator unit 20b and the gripping unit 20c to move the gripped first component 200 in the negative direction of the z-axis direction in the absolute coordinate system shown in FIG. 13 with respect to the hole 211 of the second component 210. The control unit 105 controls, on the basis of the control values, any one of the vertexes (E1, F1, G1, and H1) of the first component 200 to be put in the hole 211. For example, the selecting unit 104 discriminates, using image data picked up by the image pickup apparatus 30, whether any one of the vertexes of the first component 200 is put in the hole 211. A state in which any one of the vertexes of the first component 200 is put in the hole 211 is a state of any one of the initial postures k11 to k14 shown in FIGS. 25 to 28.

Step S202

The control unit 105 controls the manipulator unit 20b and the gripping unit 20c to move the gripped first component 200 in the negative direction of the x-axis direction in the absolute coordinate system shown in FIG. 13. This transition is the transition indicated by arrows t201 and t202 in FIG. 25, arrows t301 in FIG. 26, arrow t401 in FIG. 27, and arrows t501 and t502 in FIG. 28.

Steps S203 and S204

Steps S203 and S204 are processed in the same manner as steps S11 and S12 in the first embodiment (FIG. 11).

Step S205

The selecting unit 104 compares detection values after discretization output by the discretizing unit 102 and the second detection values stored in the table storing unit 103. In this case, the detection values after discretization to be compared are combinations of detection values after discretization of forces in the absolute coordinate system and detection values after discretization of moments in the object coordinate system.

Step S206

The selecting unit 104 discriminates, on the basis of a result of the comparison, which of the states p201, p202, p301, p401, p501, and p502 the contact state is.

Step S207

The selecting unit 104 discriminates, on the basis of a result of the discrimination, a relation of which state transition among the state transitions stored in the table storing unit 103 (FIGS. 25 to 28) is used.

For example, when discriminating that the contact state is the state p201, the selecting unit 104 selects a relation of the state transitions at the vertex E1 stored in the table storing unit 103.

Step S208

The selecting unit 104 selects a state to which the contact state is transitioned using the selected relation of the state transitions and selects transition information on the basis of the selected state. Subsequently, the selecting unit 104 outputs the selected transition information to the control unit 105.

For example, when determining in step S206 that the contact state is the state p201, the selecting unit 104 selects the state tp201 or tp202 as the state to which the contact state is transitioned. When there are a plurality of selectable states, the selecting unit 104 selects command values on the basis of the order of priority set in advance. The order of priority set in advance is, for example, state transitions for a shortest control procedure. For example, when the state tp201 is selected as the state to which the contact state is transitioned, the selecting unit 104 outputs, to the control unit 105, transition information indicating that the contact state is transitioned from the step P201 to the step tp201.

Step S209

The control unit 105 selects, on the basis of the transition information output by the selecting unit 104, a command value stored in the table storing unit 103 and controls, on the basis of the selected command value, the manipulator unit 20b and the gripping unit 20c that grip the first component 200.

Steps S210 to S212

Steps S210 to S212 are processed in the same manner as steps S203 to S205.

In step S212, the detection values detected in advance and stored in the table storing unit 103, which are compared with the detection values after discretization to be compared, are any one of combinations explained below. The combinations of the detection values used for comparison are combinations of detection values after discretization of forces in the absolute coordinate system and detection values after discretization of moments in the object coordinate system and combinations of detection values after discretization of forces and detection values after discretization of moments in the absolute coordinate system. It is determined on the basis of the state transitions stored in the table storing unit 103 which of the combinations is used to compare the detection values.

Specifically, in the case of the vertex E1, when the contact state is the state p201, p202, tp201, tp202, or tp204, the selecting unit 104 compares the detection values using the combination of the detection values after discretization of the forces in the absolute coordinate system and the detection values after ternarization of the moments in the object coordinate system. When the contact state is the state 1201, 1202, 1203, 1208, 1209, or s201 to s204, the selecting unit 104 compares the detection values after discretization using the combinations of the detection values after discretization of the forces in the absolute coordinate system and the detection values after ternarization of the moments in the object coordinate system.

Step S213

The selecting unit 104 discriminates whether the number of states coinciding with the detection values after discretization is one or two among the contact states stored in the table storing unit 103. When discriminating that the number of the states coinciding with the detection values is one (one in step S213), the selecting unit 104 proceeds to step S215. When discriminating that the number of the states coinciding with the detection values is two (two in step S213), the selecting unit 104 proceeds to step S214.

Step S214

When discriminating that the number of the states coinciding with the detection values is two, the selecting unit 104 compares the detection values after discretization of the object coordinate system and the detection values after discretization of the object coordinate system measured in advance and stored in the table storing unit 103. Subsequently, the selecting unit 104 selects transition information on the basis of a result of the discrimination and outputs the selected transition information to the control unit 105.

Step S215

The control unit 105 discriminates, on the basis of the transition information output by the selecting unit 104, whether the contact state of the first component 200 and the second component 210 is a target state (a final target state). The final target state is the state s204 shown in FIG. 25, the state s306 shown in FIG. 26, the state s406 shown in FIG. 27, or the state s504 shown in FIG. 28. When discriminating that the contact state of the first component 200 and the second component 210 is not the target state (No in step S215), the control unit 105 returns to step S208 and repeats the steps S208 to S215. When discriminating that the contact state of the first component 200 and the second component 210 is the target state (Yes in step S215), the control unit 105 ends the processing for transitioning the contact state of the first component 200 and the second component 210.

As explained above, when the robot apparatus 1 according to this embodiment moves the first component 200 from a state in which any one of the vertexes of the first component 200 is put in the hole 211 of the second component 210 until the vertex comes into contact with each of the directions of the xy direction and fits in the first component 200 and the second component 210 each other, the robot apparatus 1 determines a contact state of the first component 200 and the second component 210 on the basis of the detection values detected by the force sensor 20d included in the robot apparatus 1. The robot apparatus 1 according to this embodiment selects, according to the determined contact state, transition information stored in the table storing unit 103 and controls the contact state of the first component 200 and the second component 210. As a result, according to this embodiment, it is possible to fit in the first component 200 and the second component 210 each other even if the hole 211 of the second component 210 is not chamfered.

In the explanation in this embodiment, the vertexes are the vertexes E1, F1, G1, and H1. However, the vertexes are not limited to this. The vertexes may be combinations of the vertexes A1, B1, C1, and D1, the vertexes B1, C1, G1, and F1, and the like according to the surface of the first component 200 inserted into the hole 211.

Fourth Embodiment

In the first to third embodiments, the robot including one arm (manipulator unit) is explained. In a fourth embodiment, an example of a robot including two arms is explained.

Figure 62:
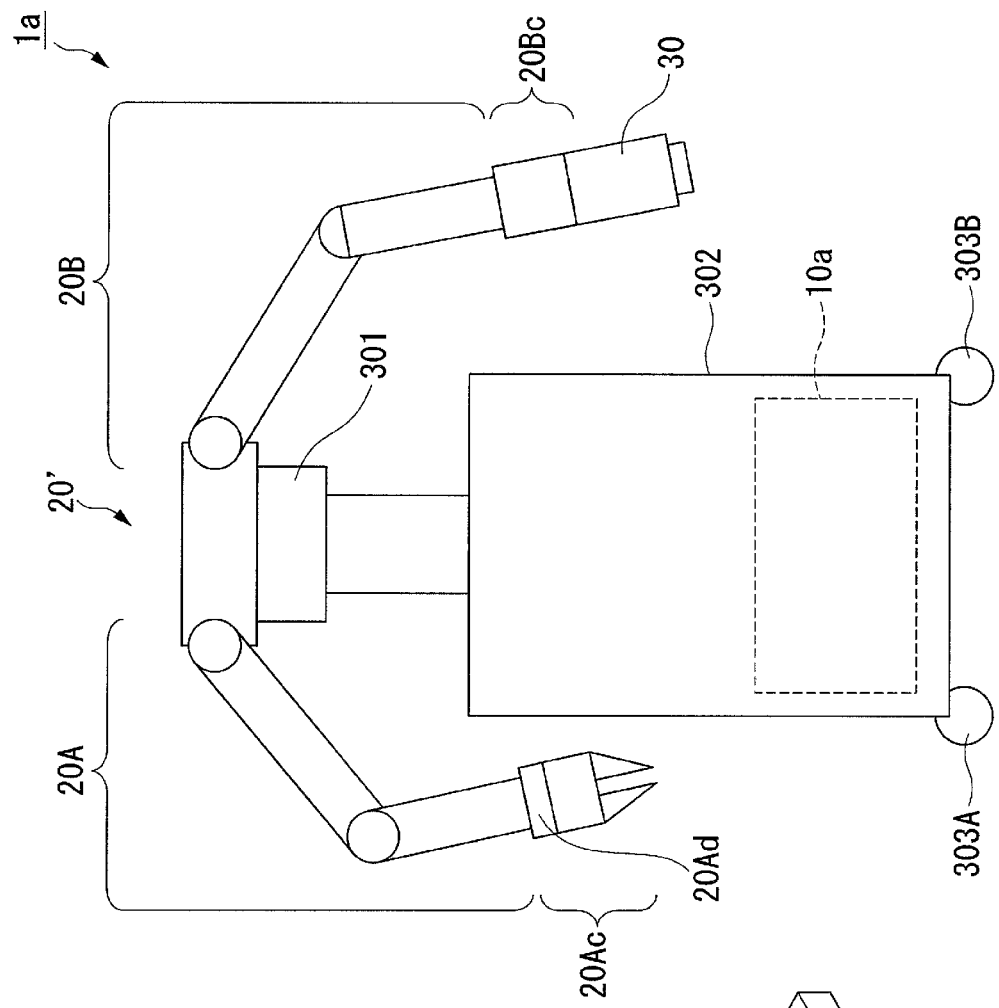
FIG. 62 is a schematic perspective view of a robot according to a fourth embodiment.
Figure 62:
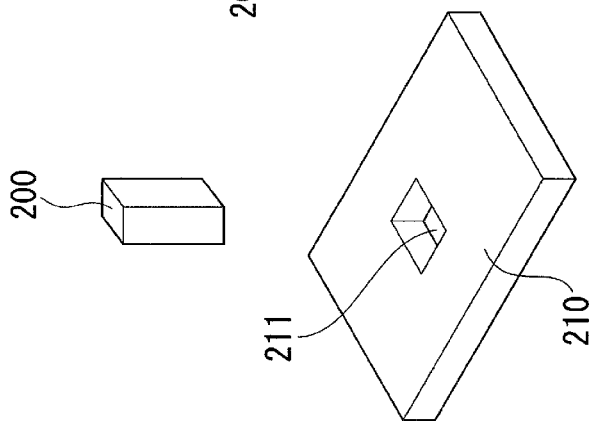

FIG. 62 is a schematic perspective view of a robot apparatus 1a according to this embodiment. As shown in FIG. 62, the robot apparatus 1a includes a multi-joint robot 20' and a main body 302.

Components same as the components in the first to third embodiments are denoted by the same reference numerals and signs and explanation of the components is omitted.

A robot control apparatus 10a controls a manipulator unit (a first arm) 20A and a manipulator unit (a second arm) 20B, a gripping unit 20ac, and a hand 20Bc. The configuration of the robot control apparatus 10a is the same as the configuration of the robot control apparatus 10 explained in the third embodiment. In this embodiment, the robot control apparatus 10a is arranged on the inside of the main body 302. However, the robot control apparatus 10a may be arranged on the outside of the main body 302.

The multi-joint robot 20' includes the two manipulator units 20A and 20B, the gripping unit 20ac, the hand 20Bc, a force sensor 20Ad, and a movable unit 301. The two manipulator units 20A and 20B are attached to the movable unit 301. The movable unit 301 is attached to the main body 302. The image pickup apparatus 30 is attached to the distal end of the hand 20Bc.

As in the first to third embodiments, the force sensor 20Ad detects forces and moments applied to the gripping unit 20ac.

The image pickup device 30 outputs picked-up image data to the robot control apparatus 10a.

The main body 302 includes conveying sections 303A and 303B to enable the robot apparatus 1a to move. The main body 302 includes the robot control apparatus 10a.

The conveying sections 303A and 303B are, for example, wheels or caterpillars.

In this embodiment, the robot control apparatus 10a controls the image pickup apparatus 30, which is attached to the hand 20Bc, to move to a position where the image pickup apparatus 30 can pick up a contact state of the first component 200 and the second component 210 explained in the first to third embodiments.

Subsequently, the robot control apparatus 10a discriminates the contact state of the first component 200 and the second component 210 using detection values (after and before discretization) detected by the force sensor 20Ad and the image data picked up by the image pickup apparatus 30.

As in the first to third embodiments, the robot control apparatus 10a controls the contact state of the first component 200 and the second component 210 on the basis of a result of the discrimination and controls the first component 200 to be fit in the hole 211 of the second component 210.

As explained above, as in the first to third embodiments, the robot apparatus 1a according to this embodiment determines the contact state of the first component 200 and the second component 210 on the basis of the detection values detected by the force sensor 20Ad. The robot apparatus 1a according to this embodiment selects, according to the determined contact state, transition information stored in the table storing unit 103 and controls the contact state of the first component 200 and the second component 210. As a result, according to this embodiment, it is possible to fit in the first component 200 and the second component 210 each other even if the hole 211 of the second component 210 is not chamfered.

In the example explained in the fourth embodiment, the image pickup apparatus 30 is attached to the hand 20Bc of the manipulator unit 20B. However, an attachment position of the image pickup apparatus 30 is not limited to this. As in the first to third embodiments, the image pickup apparatus 30 may be provided in a position where the image pickup apparatus 30 can pick up an image of the contact state of the first component 200 and the second component 210. In this case, the hand 20Bc may be a gripping unit.

In the example explained in the first to third embodiments, the gripping unit 20c (including the gripping unit 20ac) grips the first component 200 and fits the first component 200 in the hole 211 of the second component 210. However, the gripping and the fitting of the first component 200 are not limited to this. The gripping unit 20c (including the gripping unit 20ac) may grip the second component 210 and control the second component 210 to be fit in the first component 200. In this case, likewise, detection values and transition information of the force sensor for each of contact states of the first component 200 and the second component 210 may be stored in the table storing unit 103 in advance. The robot control apparatus 10 may control a contact state of the first component 200 and the second component 210 using the stored information to control the first component 200 to be inserted into the hole 211 of the second component 210.

In the example explained in the first to fourth embodiments, the detection values (before and after ternarization) detected by the force sensor 20d for each of the contact states stored in the table storing unit 103 are measured and stored. However, the detection values are not limited to this. The detection values (before and after discretization) detected by the force sensor 20d for each of the contact states stored in the table storing unit 103 may be calculated by numerical calculation or analytical calculation using a physical model and stored.

In the first to fourth embodiments, the robot apparatus 1 (including the robot apparatus 1a) may be, for example, a scalar robot.

A part of the functions of the robot control apparatuses 10 and 10a according to the embodiments may be realized by a computer. In this case, the functions may be realized by recording a position detecting program for realizing the control functions in a computer-readable recording medium, causing a computer system to read the position detecting program recorded in the recording medium, and executing the position detecting program. The "computer system" includes an OS (Operating System) and hardware of peripheral apparatuses. The "computer-readable recording medium" refers to a portable recording medium such as a flexible disk, a magneto-optical disk, an optical disk, or a memory card or a storage device such as a magnetic hard disk incorporated in the computer system. Further, the "computer-readable recording medium" may include a recording medium that dynamically retains a computer program for a short time like a communication line for transmitting the computer program via a network such as the Internet or a communication line such as a telephone line or a recording medium that retains the computer program for a fixed time like a volatile memory provided on the inside of a server apparatus or the computer system functioning as a client in the case of the transmission of the computer program. The computer program may be a computer program for realizing a part of the functions or may be a computer program for realizing the functions while being combined with a computer program already recorded in the computer system.

What is claimed is:

1. A robot for assembling a first component with a second component, the robot comprising:
a manipulator unit capable of turning and bending;
a gripping unit coupled to the manipulator unit; and
a force sensor configured to detect, as detection values, a force and a moment acting on the gripping unit, wherein:
the gripping unit is controlled by a control unit based on the detection values and a transition information, and the transition information includes information for transitioning the gripping unit from a present contact state to a next target state.

2. The robot according to claim 1, further comprising:
a main body;
a first arm attached to the main body and to the gripping unit;
a second arm attached to the main body and to the gripping unit wherein the manipulator unit includes the first arm and the second arm; and
a conveying unit attached to the main body.

3. The robot according to claim 1, further comprising:
an image pickup apparatus configured to capture an image of a contact state of the first component and the second component;
a main body;
a first arm attached to the main body and to the gripping unit;
a second arm attached to the main body and the image pickup apparatus, wherein the manipulator unit includes the first arm and the second arm; and
a conveying unit attached to the main body.

4. The robot according to claim 1 further comprising:
a robot control apparatus including the control unit configured to control the gripping unit based on the detection values and a transition information.

5. The robot according to claim 4, wherein the robot control apparatus includes:
a storage unit that stores multiple transition information in association with multiple contact states of the first component and the second component; and
a selecting unit that is configured to discriminate, based on the detection values, a contact state of the first component and the second component and to select the transition information stored in the storing unit based on the contact state of the first component and the second component, wherein
the control unit controls the gripping unit based on the transition information selected.

6. The robot according to claim 5, wherein the transition information includes information for sequentially transitioning the first component to:
set the first component in a first contact state with the second component, set the first component in a second contact state with the second component after the first contact state,
set the first component in a third contact state with a surface of a hole of the second component after the second contact state, and
attach the first component to the hole of the second component along a surface on which the hole of the second component is provided after the third contact state.

7. The robot according to claim 5, wherein:
the storage unit stores the contact states and a plurality of sets of first detection values in association with each other, the plurality of sets of first detection values are the detection values detected in advance, and stores a plurality of sets of the transition information and control values for controlling the gripping unit in association with each other, and
the control unit selects a given control value based on the transition information selected by the selecting unit and controls the gripping unit based on the given control value selected.

8. The robot according to claim 7, wherein the selecting unit compares the detection values from the force sensor with the first detection values stored in the storage unit and discriminates the contact state of the first component and the second component.

9. The robot according to claim 8, wherein the robot apparatus further includes:
a discretizing unit configured to discretize the detection values from the force sensor, the discretizing unit discretizes the first detection values for each of the contact states of the first component and the second component in advance, wherein
the storage unit stores the first detection values as second detection values, after the discretization by the discretizing unit,
the discretizing unit outputs the detection values after the discretization during control of the contact states of the first component and the second component, and
the selecting unit compares the detection values after the discretization with the second detection values stored in the storage unit and discriminates the contact state of the first component and the second component based on a result of the comparison.

10. The robot according to claim 9, wherein the discretizing unit ternarizes the detection values in an object coordinate system with respect the first component and ternarizes the detection values in an absolute coordinate system with respect to the second component.

11. The robot according to claim 10, wherein:
the storage unit stores third detection values that are detection values after discretization of the first detection values in the absolute coordinate system, fourth detection values that are detection values after discretization of the first values in the object coordinate system,
the storage unit stores the first detection values, a plurality of kinds of the transition information, and a plurality of the control values in association with one another for each of the contact states, and
in the absolute coordinate system, when the detection values after the discretization and the third detection values are compared, when there are a plurality of the third detection values coinciding with the detection values after the discretization, the selecting unit compares the detection values after the discretization in the object coordinate system with the fourth detection values and discriminates the contact state of the first component and the second component.

12. The robot according to claim 9, wherein, when there are a plurality of the second detection values coinciding with the detection values after the discretization, the selecting unit compares the detection values with the first detection values and discriminates the contact state of the first component and the second component.

13. The robot according to claim 5, further comprising:
- an image pickup apparatus configured to capture an image of the contact state of the first component and the second component, wherein
- the selecting unit identifies states of the first component and the second component based on the image captured by the image pickup apparatus.

14. An assembling method for a robot assembling a first component with a second component, the method comprising:
- discriminating a contact state of the first component and the second component based on detection values detected by a force sensor, wherein the detection values include a force and a moment acting on a gripping unit of the robot, the gripping unit is configured to grip the first component,
- selecting, based on a result of the discrimination, transition information from a storage unit, wherein the storage unit stores multiple transition information in association with multiple contact states of the first component and the second component, and a given transition information includes information for transitioning the gripping unit from a present contact state to a next target state; and
- controlling the gripping unit of the robot based on the transition information selected.

\* \* \* \* \*